United States Patent Office

3,551,120
Patented Dec. 29, 1970

3,551,120
SUBSTITUTED DODECABORATES
Henry C. Miller, Wilmington, Del., and Earl L. Muetterties, West Chester, Pa., assignors to E. I. du Pont de Nemours and Company, Wilmington, Del., a corporation of Delaware
No Drawing. Continuation-in-part of applications Ser. No. 15,042, Mar. 15, 1960, Ser. No. 30,443, May 20, 1960, and Ser. No. 141,248, Sept. 25, 1961. This application Dec. 21, 1962, Ser. No. 246,636
Int. Cl. C01b 6/22
U.S. Cl. 23—358      35 Claims This application is a continuation-in-part of our applications, Ser. No. 15,042, filed Mar. 15, 1960, and Ser. No. 30,443, filed May 20, 1960, both now abandoned and of our copending application, Ser. No. 141,248, filed Sept. 25, 1961, now abandoned.

This invention relates to new compounds containing boron and to methods for preparing the compounds.

Boron compounds, particularly boron hydrides, have achieved technical importance in recent years. However, there are many potential applications for which boron compounds including boron hydrides, halides and alkyls, cannot be used because of hydrolytic, oxidative and other types of instability. To illustrate, diborane, chlorodiborane, pentaborane(9) and trialkylboron compounds are spontaneously flammable in air. Diborane, pentaborane(9), chlorodiborane, boron trichloride, iododecaborane(14) and most other boron halides are hydrolyzed rapidly in water or alcohol. Even the most stable known borohydride, i.e., decaborane(14), is hydrolyzed at a moderate rate in water. Known ionic borohydrides, e.g., tetrahydroborates ($NaBH_4$ and the like), are hydrolyzed at a rapid rate at 100° C.

This invention is directed to a broad class of boron compounds which have stability characteristics that are unusual for boron compounds. The compounds of the invention generally show hydrolytic, oxidative and chemical stabilities normally associated with aromatic organic compounds.

The novel boron compounds are ionic in character and they are represented generically by the following formula:

(1)      $M_a(B_{12}H_{12-y}X_y)_b$

M is a cation, i.e., an atom or group of atoms which forms a positively charged ion in aqueous solution, which cation has a positive ionic charge or valence of 1–4; ($B_{12}H_{12-y}X_y$) is a group which forms a divalent anion in aqueous solution, i.e., an ion which carries a negative charge of 2; X is a monovalent group capable of bonding to carbon of a benzene nucleus by replacement of hydrogen bonded to said carbon; y is an integer, i.e., a positive whole number, of 1 through 12; a and b are positive whole numbers of 1 through 3 whose respective values are determined by the valence of M, i.e., a multiplied by the valence of M is equal to 2b. The X groups, when more than one is present, can be alike or different.

The novel compounds of this invention may also be defined as derivatives of the acid $H_2B_{12}H_{12}$ and its salts wherein at least one hydrogen of the $B_{12}H_{12}^{-2}$ anion is replaced by an X substituent. The component X comprises a broad group of substituents for which representative illustrations are given in the examples in later paragraphs.

In the compounds of Formula 1 the novel and characterizing component is the boron-containing group shown in parentheses, i.e., ($B_{12}H_{12-y}X_y$)$^{-2}$. This group behaves as a stable chemical entity in conventional reactions and it will be discussed more fully in later paragraphs with particular reference to the substituent X.

The group M

In generic Formula 1 M is a group which can be composed of one or more than one element and which is ionically bonded to the boron-containing group. The groups represented by M bear a positive ionic charge and they have in common the property of forming positively charged groups or cations in water.

The principal function of the group M is to provide an element or group of elements which bear the necessary positive charges to combine with the novel anion, i.e., ($B_{12}H_{12-y}X_y$)$^{-2}$, and thus permit its isolation as part of a stable compound.

The properties of the group M are not critical and the group therefore represents a broad range of elements or combinations of elements. To illustrate, M can be hydrogen, hydronium ($H_3O^+$), a metal, ammonium ($NH_4^+$), hydrazonium ($NH_2NH_3^+$) (also called hydrazinium), N-substituted ammonium, N-substituted hydrazinium ($CH_3NHNH_3^+$), aryldiazonium ($ArN_2^+$), sulfonium, phosphonium, metal-ammine, 2,2'-bipyridinium, quinolinium, phenazonium, N-alkylpyridinium, and the like.

The group M can be derived from any metal. The metals according to the Periodic Table in Deming's "General Chemistry," 5th ed., chap. II, John Wiley & Sons, Inc., and in Lange's "Handbook of Chemistry," 9th ed., pp. 56–57, Handbook Publishers, Inc. (1956) are the elements of Groups I, II, VIII, III–B, IV–B, V–B, VI–B, VII–B, and the elements of Groups III–A, IV–A, V–A and VI–A which have atomic numbers above 5, 14, 33 and 52, respectively. The metals can be light or heavy metals. To illustrate, M can be lithium, sodium, potassium, cesium, beryllium, barium, lanthanum, zirconium, vanadium, manganese, iron, cobalt, copper, zinc, mercury aluminum, thallium, tin, lead, antimony, bismuth silver or any other metal. Preferred metals are those whose valences are 1–3, inclusive.

An especially preferred group of metals from which M can be derived consists of elements of Groups I–A, II–A, I–B and II–B having atomic numbers up to and including 80. Most preferred metals are the alkali and alkaline earth metals, i.e., lithium, sodium, potassium, rubidium, cesium, beryllium, magnesium, calcium, strontium and barium.

The group M can be a combination of a metal and ammonia or a metal and an amine, i.e., a Werner-type coordination complex referred to as a metal-ammine group. To illustrate M can be $[Ni(NH_3)_6]^{+2}$, $[Zn(NH_3)_4]^{+2}$, $[Co(NH_2C_2H_4NH_2)_3]^{+2}$ $[Ni(pyridine)_6]^{+2}$, $[Co(NH_3)_6]^{+3}$, $[Cu(NH_3)_4]^{+2}$ and the like. The group can be a metal with water of hydration, e.g., $[Cu(H_2O)_4]^{+2}$, $[Ni(H_2O)_6]^{+2}$, and the like.

The group M can be aryldiazonium, i.e., a group of the formula $ArN_2^+$, where Ar represents an aryl group. To illustrate, Ar can be phenyl, tolyl, xylyl, naphthyl, and the like.

The group M can be an N-substituted ammonium radical, an S-substituted sulfonium group and a P-substituted phosphonium group of the formula $RNH_3^+$, $R_2NH_2^+$, $R_3NH^+$, $R_4N^+$, $R_3S^+$, and $R_4P^+$. R represents an organic group bonded to the nitrogen, sulfur or phosphorus. The R groups are not critical features of these cation groups; thus, R can be open-chain, closed-chain, saturated or unsaturated hydrocarbon or substituted hydrocarbon groups. R can be a reterocyclic ring of which the nitrogen, sulfur or phosphorus atom is a component part. Thus, when M is a substituted ammonium group, R can be derived from pyridine, quinoline, morpholine, hexamethyleneimine, and the like. Preferably R, for reasons of availability of reactants, contains at most 18 carbon atoms. For example, R can be methyl, 2-ethylhexyl, octadecyl, allyl, cyclohexyl, cyclohexenyl, phenyl, naphthyl, anthryl, cyclohexylphenyl, diphenylyl, benzyl, chloroethyl, ω-cyanoamyl, β-hydroxyethyl, p-hydroxyphenyl, and the like.

The group M can be N-substituted hydrazonium (also called hydrazinium) radicals having the formulas $(RNHNH_3)^+$, $(R_2NNH_3)^+$, and the like, wherein R has the same definition as given in the preceding paragraph. To illustrate, the hydrazonium cation can be derived from phenylhydrazine, methylhydrazine, 1,1-dimethylhydrazine, 1,2-dimethylhydrazine, ethylhydrazine, 1,1-diethylhydrazine, and similar compounds.

The valence of the cation M will be between 1 and 4, i.e., M can have a valence of 1, 2, 3, or 4. In most cases the valence of M will be 1 or 2 and this group of compounds in which the valence of M is at most 2 are readily preparable and so form a preferred group of compounds in this invention.

The group $(B_{12}H_{12-y}X_y)^{-2}$

The novel feature of the compounds of Formula 1 is the polyhydropolyborate group, $B_{12}H_{12-y}X_y$, which carries an ionic charge of −2 and which forms a divalent anion in aqueous solution. The values of $a$ and $b$ in generic Formula 1 are, therefore, determined by the valence of M and they are the smallest whole numbers which satisfy the following equation:

$$b = \frac{a \times \text{valence of M}}{2}$$

The pertinent feature in the novel group, $$(B_{12}H_{12-y}X_y)^{-2}$$

is the substituent X, which is bonded to boron. The number of substituents which can be present in the group is not less than 1 or more than 12 and the substituents can be alike or different.

In its broadest aspects, X is a monovalent group which has the characterizing property of forming X—C bonds where C represents a carbon which is a nuclear member of a benzene ring and where the X—C bond is formed in place of an H—C bond. The property of forming X—C bonds, where C is nuclear carbon as defined above, is common to all the groups which are represented by X.

The group X can represent a substituent introduced into the $B_{12}H_{12}^{-2}$ anion by direct reaction or it can represent a substituent obtained by subsequent chemical modification of a group which has been introduced by direct reaction, e.g., a substituent obtained by reduction, esterification, hydrolysis or amidation of directly introduced groups.

Compounds of the invention are obtained by processes which employ as a principal reactant a salt or acid having the $B_{12}H_{12}^{-2}$ anion, i.e., a compound of the formula $M_a(B_{12}H_{12})_b$, where M, $a$ and $b$ have the meanings given in previous paragraphs.

The salts or acid having the $B_{12}H_{12}^{-2}$ anion (called dodecahydrododecaborates) are compounds whose infrared spectra consistently include strong absorption bands at 4.0μ±0.1 and 9.35μ±0.1. These bands are an identifying characteristic of dodecahydrododecaborate anions in which the absorption at 4.0μ±0.1 is due to B—H stretching and at 9.35μ±0.1 is due to the dodecaborate cage.

The dodecaborate anion is referred to above as a dodecaborate cage. The $B^{11}$ nuclear magnetic resonance spectra of dodecahydrododecaborate salts have been determined and the data indicate that the dodecahydrododecaborate anion contains one and only one type of boron atom, i.e., all the borons are chemically equivalent. The data further indicate that each boron atom is bonded to only one hydrogen atom and that all the hydrogen atoms are chemically equivalent. These data are best explained by assigning to the dodecahydrododecaborate anion a spatial configuration wherein the boron atoms form an icosahedron in which all the boron atoms are equal (in the same sense that all carbon atoms in benzene are equal) and each boron is bonded to one hydrogen. A complete analysis of infrared and Raman spectra show the dodecahydrododecaborate anion to have, in fact, $I_h$ symmetry. The spatial configuration of this dodecahydrododecaborate anion can be described most aptly as an icosahedron of boron atoms.

One or more hydrogens in the $B_{12}H_{12}^{-2}$ anion can be replaced with groups or substituents to whatever degree desired. Substitution in the $B_{12}H_{12}^{-2=}$ anion can, of course, lead to a shift in the absorption bands and the characteristic bands for the substituted $B_{12}$ anion may vary from the wavelengths given earlier for the unsubstituted $B_{12}H_{12}^{-2}$ anion. Complete substitution of all 12 hydrogen atoms will, of course, result in the disappearance of the band at about 4.0μ which is due to B—H stretching.

The substituent X can be introduced directly or indirectly into the $B_{12}H_{12}^{-2}$ anion. One or more groups can be introduced by direct reaction and these groups can be modified by subsequent chemical reactions. Groups which can be introduced by conventional processes and which employ readily available reactants form a preferred class. In this preferred group of compounds of Formula 1, the group X represents one or more of the following substituents: halogens (F, Cl, Br, I), hydrocarbon, carboxyl $$(-\overset{O}{\underset{\|}{C}}-OH)$$

carbamyl and N-substituted carbamyl $$(-\overset{O}{\underset{\|}{C}}=NH_2, \quad -\overset{O}{\underset{\|}{C}}NHR', \quad -\overset{O}{\underset{\|}{C}}-NR_2')$$

halocarbonyl $$(-\overset{O}{\underset{\|}{C}}-Y)$$

where Y is F, Cl, Br, I), halomethyl ($-CH_2Y'$, $-CHY'_2$ and $CY'_3$, where Y' is F, Cl, Br, I), hydroxy (—OH), hydrocarbonoxy (—OR'), monooxahydrocarbonoxy $$(R'OR''O-)$$

acetal [—CH(OR')$_2$], ketal [—CR'(OR')$_2$], hydrocarboncarbonyloxy [—OC(O)R'], hydrocarbonoxycarbonyl [—C(O)OR'], isocyanate (—NCO), thiocyanate $$(-SCN)$$

isothiocyanate (—NCS), hydrocarbonmercapto (—SR'), hydroxymethyl (—CH$_2$OH), hydrocarbonoxymethyl $$(-CH_2OR')$$

aminomethyl (—CH$_2$NH$_2$, —CH$_2$NHR' and —CH$_2$NR$'_2$), cyano (—CH), amino (—NH$_2$), substituted amino (—NHR', —NR$'_2$), thiol (—SH), azido —N$_3$), acyl $$(\overset{O}{\underset{\|}{C}}-R')$$

formyl $$(-\overset{O}{\underset{\|}{C}}-H)$$

nitro (—NO$_2$) nitroso (—NO), azo (—N=N—Ar), where Ar is an aromatic hydrocarbon group of up to 10 carbons), sulfo (—SO$_3$H), sulfonyl (—SO$_2$R'), and acetoxymercury $$(-HgO\overset{O}{\underset{\|}{C}}CH_3)$$

R', where used in the above substituents, is a monovalent organic group which is preferably a hydrocarbon group (alkyl, cycloalkyl, alkenyl, cycloalkenyl, aryl, alkaryl, aralkyl, and the like) of at most 18 carbons, and R'' is a divalent hydrocarbon group of at most 18 carbons.

Many of the compounds of the invention are obtained by reacting the dodecahydrododecaborate(2−), i.e., the $B_{12}H_{12}^{-2}$ salt or acid, with an electrophilic reagent. Substituents introduced by this process into the anion are called hereinafter "electrophilic groups." Compounds of Formula 1 obtained by a process of electrophilic attack form a second preferred class of products of the invention. In this preferred group of compounds of Formula 1, X is defined as a monovalent group which is capable of bonding to carbon of a benzene nucleus by reaction of benzene or a substituted benzene with an electrophilic reagent.

An electrophilic group is a group which is deficient in electrons and which has a point of low electron density. Electrophilic groups and reagents which are employed to effect substitution of such groups for hydrogen on carbon of a benzene nucleus are described in conventional textbooks, of which the following are examples:

Remick, "Electronic Interpretations of Organic Chemistry," pp. 89–110, Wiley (1943).
Ingold, "Structure and Mechanism in Organic Chemistry," pp. 198–200, 269–304 (especially pp. 202, 211), Cornell University Press (1953).
Fuson, "Advanced Organic Chemistry," chap. 1, Wiley (1953).
Wheland, "Advanced Organic Chemistry," 2nd ed., p. 83, Wiley (1949).

Examples of electrophilic groups or substituents, represented by X in Formula 1, which are included in this preferred group are as follows: halogens (F, Cl, Br, I), hydrocarbon (—R′), carboxyl $$(-\overset{O}{\underset{\|}{C}}-OH)$$

N,N-disubstituted carbamyl $$(-\overset{O}{\underset{\|}{C}}-NR_2')$$

haloformyl

where Y is F, Cl, Br, I), cyano (—CN), trihalomethyl (—CCl₃, —CF₃, etc.), acyl

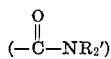

formyl

nitro (—NO₂), nitroso (—NO), azo (—N=N—R′), sulfo (—SO₃H), sulfonyl (—SO₂R′), hydrocarbonoxy (OR′), hydrocarbonmercapto (—SR′), and mercuric acetyl

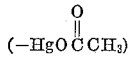

R′, where used in the above substituents is a monovalent organic group which is preferably a hydrocarbon group (alkyl, cycloalkyl, alkenyl, cycloalkenyl, aryl, alkaryl, aralkyl) of at most 18 carbons.

The number of substituents which can be present on the dodecahydrododecarborate(2−) anion is not less than 1 or more than 12. Thus, the anion $(B_{12}H_{12-y}X_y)^{-2}$, in the generic formula $M_a(B_{12}H_{12-y}X_y)_b$, can range from $(B_{12}H_{11}X)^{-2}$ through successively decreasing hydrogen content to $(B_{12}X_{12})^{-2}$.

Examples of the new compounds of the invention, illustrated by formulas, are as follows:

[(C₂H₅)₄N]₂B₁₂H₁₁OH, [(C₂H₅)₂NH₂]₂B₁₂H₁₀(OH)₂
HgB₁₂H₁₀(OH)₂, (H₃O)₂B₁₂H₁₁COOH, [(CH₃)₂NNH₃]₂B₁₂H₁₀Cl₂
CaB₁₂H₈Cl₄, Na₂B₁₂H₁₀(CH₃)₂, K₂B₁₂H₁₁C₂H₅, Na₂B₁₂H₉(C₃H₇)₃

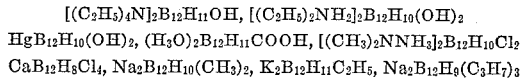

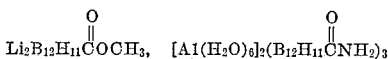

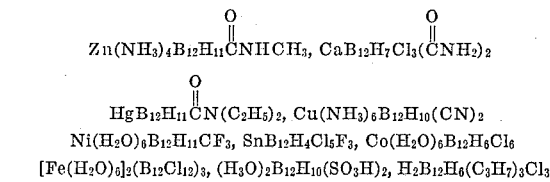

Ni(H₂O)₆B₁₂H₁₁CF₃, SnB₁₂H₄Cl₅F₃, Co(H₂O)₆B₁₂H₆Cl₆
[Fe(H₂O)₆]₂(B₁₂Cl₁₂)₃, (H₃O)₂B₁₂H₁₀(SO₃H)₂, H₂B₁₂H₆(C₃H₇)₃Cl₃

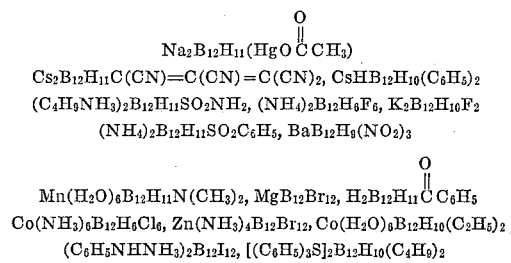

Cs₂B₁₂H₁₁C(CN)=C(CN)=C(CN)₂, CsHB₁₂H₁₀(C₆H₅)₂
(C₄H₉NH₃)₂B₁₂H₁₁SO₂NH₂, (NH₄)₂B₁₂H₆F₆, K₂B₁₂H₁₀F₂
(NH₄)₂B₁₂H₁₁SO₂C₆H₅, BaB₁₂H₉(NO₂)₃

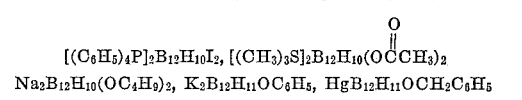

Co(NH₃)₆B₁₂H₆Cl₆, Zn(NH₃)₄B₁₂Br₁₂, Co(H₂O)₆B₁₂H₁₀(C₂H₅)₂
(C₆H₅NHNH₃)₂B₁₂I₁₂, [(C₆H₅)₃S]₂B₁₂H₁₀(C₄H₉)₂

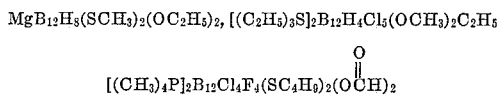

Na₂B₁₂H₁₀(OC₄H₉)₂, K₂B₁₂H₁₁OC₆H₅, HgB₁₂H₁₁OCH₂C₆H₅
MgB₁₂H₁₁SC₄H₉, BaB₁₂H₁₀(SCH₂C₆H₅)₂, ZnB₁₂H₁₁OCH₂CH₂OCH₃
SrB₁₂H₁₀(C₂H₅)(OCH₂CH₂OCH₃), and Ag₂B₁₂H₁₁OCH₂CH₂OCH₃

The invention includes within its scope compounds with two or more X groups which are unlike, e.g., MgB₁₂H₈(SCH₃)₂(OC₂H₅)₂, [(C₂H₅)₃S]₂B₁₂H₄Cl₅(OCH₃)₂C₂H₅

$$[(CH_3)_4P]_2B_{12}Cl_4F_4(SC_4H_9)_2(O\overset{O}{\underset{\|}{C}}H)_2$$

and the like.

The new compounds are usually solid products which are salt-like in character. Many of the compounds dissolve in water. The color of the compounds is dependent on the nature of the M group and of the electrophilic group bonded to boron. For example, the cupric ammonium salts are bright blue, alkali metal salts are usually white.

Most of the compounds are stable and usually can be handled in a conventional manner. Thus, compounds having halogen, alkyl or acyl substituents are stable and they can be kept in storage for prolonged periods in ordinary containers. However, the precautions usually followed in handling new compositions should be employed.

The scope of the monovalent groups encompassed by X in generic Formula 1 for the compounds of the invention can be understood more clearly by describing methods for obtaining the compounds.

The ionic charge of −2 on the boron-containing anion, which was discussed previously, refers to a charge which is inherent in the boron-hydrogen cage structure. The value of the ionic charge is independently of and does not take into consideration any ionic charge which may reside in the X substituents by virtue of ionizable functional groups. The ions which are formed by ionizable substituents are considered to be part of the X groups and are included within the scope of these groups. For example, carboxyl, sulfo, amino, thiol and like substituents will function as groups which possess acidic or basic properties which are independent of the boron cage structure.

Preparation of compounds

*Electrophilic substitution.*—In this method, which involves the direct substitution of hydrogen, two reactants are employed which are defined as follows:

(a) a boron-containing compound of the general formula $M_a(BH_{12}H_{12})_b$, wherein M, a and b have the meanings given earlier in generic Formula 1 for the novel compounds.

(b) a reagent capable of introducing an electrophilic group into a benzene nucleus by replacement of hydrogen bonded to a carbon of said nucleus. This second reactant is referred to as an electrophilic reagent.

The characteristics of each group of reactants are discussed in more detail in the following paragraphs.

The boron-containing reactant, $M_a(B_{12}H_{12})_b$, is a dibasic acid or a salt of a dibasic acid which has, as a characterizing group, a divalent anion, $(B_{12}H_{12})^{-2}$. This anion will be refererred to as the "dodecahydrododecaborate(2—) anion" or, for simplicity, as "dodecahydrodecaborate(2−)."

At this point, it should be noted that the novelty of the compounds of the invention is such that no officially approved system of nomenclature has yet been established. The name "dodecahydrododecaborate(2−)" follows the lines recommended for naming other boron compounds and its use here permits the logical naming of a derivative of the $(B_{12}H_{12})^{-2}$ anion as a substituted "dodecaborate(2−)."

Dodecahydrododecaborate(−2) is an unusual species of divalent anion which has remarkable and unexpected chemical properties. In many respects it shows much greater chemical stability than any previous reported boron hydrides, whether neutral or bearing a charge. For example, the anion is inert to sodium methoxide in refluxing methanol and it does not hydrolyze in water. The anion forms salts with basic materials, e.g., amines and metals, and from these salts there can be obtained a strongly acidic hydronium compound by treatment with an ion exchange resin. Solutions of silver nitrate are not reduced by aqueous solutions containing the $B_{12}H_{12}^{-2}$ anion, a behavior which is in marked contrast to the behavior of other boron hydrides. The stability of the $B_{12}H_{12}^{-2}$ anion to strong bases, strong acids, and oxidizing agents is unique for boron hydride structures.

It is surprising, in view of the chemical stability described above, to find that the dodecahydrododecaborate(2−) anion undergoes a wide range of substitution reactions in a manner which resembles the behavior of a carbocyclic aromatic compound, e.g., benzene or naphthalene. More specifically, the hydrogens bonded to boron in the $B_{12}H_{12}^{-2}$ group are replaceable by substituents which can also replace hydrogen bonded to nuclear carbon in benzene or a substituted benzene such as toluene. This behavior of the dodecahydrododecaborate(2−) anion is particularly surprising in view of the completely inorganic composition of the anion. It is the previously unknown "aromatic character" of the dodecahydrododecaborate(2−) anion which forms the basis of the present invention leading to a broad range of novel substituted dodecaborates(2−).

It is evident from the above description of the chemistry of the dodecahydrododecaborate(2−) anion that the second reactant, i.e., the electrophilic reagent, employed in preparing the novel compounds is a reagent which can effect a substitution reaction in a benzene nucleus. These reagents, in view of the extensive work which has been done on substitution reactions in the benzene nucleus, form a well-known group of compounds.

Electrophilic reagents which are broadly operable in the process are reagents which will effect direct substitution of hydrogen bonded to carbon of a benzene nucleus, i.e., the hydrogen is replaced by a group derived from the electrophilic reagent. Electrophilic reagents are compounds which react by acquiring electrons or acquiring a share in electrons which previously belonged to a foreign molecule (see Ingold, vide supra, p. 201). Examples of electrophilic reagents which are within the scope of the above definition and which are operable in the process of the invention are given below, together with the substituent group which in the process is bonded to boron in the final product.

| Electrophilic reagent | Electrophilic group bonded to boron |
|---|---|
| Halogens ($F_2$, $Cl_2$, $Br_2$, $I_2$) | Halogen (F, Cl, Br, I) |
| Cyanogen halides (CNF, CNCl) | Nitrile (CN) |
| Sulfuric acid | $-SO_3H$ |
| Nitric acid | $-NO_2$ |
| $H_2NOSO_3H$ | $-NH_2$ |
| Olefins | $-$alkyl [e.g., $-C_2H_5$, $-CH(CH_3)_2$] |
| Acetylenes | Alkenyl (e.g., $-CH=CH_2$, $-CH=CHR''$) |
| $Hg(O\overset{O}{\overset{\|}{C}}CH_3)_2$ | $-HgO\overset{O}{\overset{\|}{C}}CH_3$ |
| $(CN)_2C=C(CN)_2$ | $-(CN)C=C(CN)_2$ |
| $HNO_2$ | $-NO$ |
| CO/HCl | $-\overset{O}{\overset{\|}{C}}H$ |
| $R''SO_2Cl$ | $-SO_2-R''$ |
| $R_2''N\overset{O}{\overset{\|}{C}}Cl$ | $-\overset{O}{\overset{\|}{C}}NR_2''$ |
| $(R''OR'H)^+Cl^-$ (oxonium salt) | $-OR''$ |
| $(R''OH_2)^+Cl^-$ (oxonium salt) | $-OH$ |
| $(H_3O)^+Cl^-$ (hydronium salt) | $-OH$ |
| $R''SSR''$ | $-SR''$ |

In the above groups, R″ is a monovalent organic radical, preferably hydrocarbon of at most 18 carbons, which can be alkyl, alkyenl, cycloalkyl, cycloalkenyl, aryl, alkaryl, aralkyl, and the like.

In the reactions employing some of the above electrophilic reagents, a catalyst may be used, e.g., aluminium trichloride, boron trifluoride and polyphosphoric acid. These catalysts are employed in the same manner as in the well-known procedures in organic chemistry. In some cases the boron compounds themselves function as catalysts, e.g., in alkylation of $(H_3O)_2B_{12}H_{12}$.

The electrophilic reagents employed in the process are materials which are usually readily available of which are obtained by conventional methods.

It is evident from the above discussion that a wide range of processes is available for the preparation of compounds of the invention. These processes are illustrated more fully in the examples which are given later in the discussion of the invention.

Processes which are employed to introduce one or more X groups on the boron cage are not necessarily identical with the processes employed to introduce the X groups on a benzene nucleus. Consideration must be given to differences in reactivity or in reaction mechanism between a completely inorganic system, as represented by the $B_{12}H_{12}^{-2}$ anion and an organic aromatic system represented by the benzene ring.

It is further noted that in the preparation of compounds of the invention by methods discussed earlier the substituent which ultimately is bonded to boron in the final product is not necessarily the substituent which would be obtained with a process employing a conventional carbocyclic aromatic reactant. To illustrate, reaction of formaldehyde with a dodecahydrododecaborate(2−) yields a compound of Formula 1 in which X is —OCH₃ instead of —CH₂OH which might be obtained. Variations of this nature from conventional results are, as mentioned earlier, not unexpected in view of the completely inorganic character of the dodecahydrododecaborate(2−) anion. Such variations do not change the view of the basic aromatic character of the boron sphere or cage in the dodecaborate anion.

Differences in preparative procedures or variations in the types of substituents which may be obtained do not change in any way the common characteristics or property of all the X groups, i.e., the property of bonding to a nuclear carbon of a benzene ring.

It is surprising that, despite the inorganic nature of the boron-containing reactant, so many of the processes employed in aromatic chemistry are, in fact, operable in the present invention, e.g., the processes of halogenation, alkylation, acylation, amination and the like. Even more surprising and unexpected is the fact that the X groups bonded to boron in the dodecaborate(2−) anion exhibit a chemical behavior in subsequent reactions which resembles closely the behavior of the same X groups bonded to a nuclear carbon of an aromatic ring. This similarity in behavior permits the preparation of a broad range of X substituents bonded to the boron cage.

The boron hydride reactants of the formula $$M_a(B_{12}H_{12})_b$$

are materials which can be obtained by relatively simple methods from an alkali metal borohydride, e.g., $NaBH_4$, and diborane ($B_2H_6$). The preparation of representative dodecahydrododecaborates employed as reactants is illustrated in examples given in later paragraphs.

Reaction of the dodecahydrododecaborate(2−) salts to obtain the compounds of the invention is conducted in conventional vessels with corrosion-resistant inner surfaces, e.g., glass, platinum, poly(tetrafluoroethylene)resin, and the like. The dodecahydrododecaborate salt $$M_a(B_{12}H_{12})_b$$

and, optionally, an inert liquid solvent is charged into the reaction vessel. The electrophilic reactant is then supplied to the reaction vessel at a temperature and at a rate which will provide a controllable reaction and which will bring the reaction to completion within a reasonable time. When electrophilic reagents are employed which are hydrolytically stable, water or alcohols (methanol, ethanol) can be used conveniently as a solvent for the reaction. Other solvents can be used, for example, diethyl ether, benzene, heptane, carbon tetrachloride, carbon disulfide and the like.

The temperature at which the reaction is conducted will be determined largely by the reactivity of the electrophilic reagent. In general, the temperature will be between about −20° C. and 150° C. Preferably, the temperature will be between about 0° C. and about 100° C.

The time of reaction in a batch process will also depend to a considerable extent on the reactivity of the electrophilic reagent. The reaction generally proceeds rapidly and, with thorough mixing of the reactants, the time may be as low as 5 minutes or even less. Generally a reaction time between about 10 minutes and 5 hours is sufficient. It is desirable and advantageous to mix the reactants by any suitable means although mixing is not essential for operability. In some cases, e.g., with alkyl halides as the electrophilic reagent, catalysts are used in the process employing the technology of well-known organic aromatic chemistry.

The reaction can be conducted under pressure, if desired, but it is not essential to use pressure. In many cases, the reaction proceeds satisfactorily at atmospheric pressure.

The proportions in which the reactants are used are not critical. It is preferable, in order to obtain maximum yield of desired product, to use at least one mole of the electrophilic reagent for each hydrogen which is to be replaced on the dodecarborate(2−) anion. It is not essential, however, that this ratio be used.

The compounds are purified by well-known and recognized procedures. For the majority of products, conventional crystallization procedures are used, employing water or alcohol as solvents. For products of limited solubility, solutions of the compounds can be treated with adsorptive agents, e.g., activated carbon or silica gel, to remove the impurities.

Indirect substitution.—The compounds of the invention can be obtained by processes which are conducted in two or more steps. These processes are generally employed to obtain compounds of Formula 1 in which X is hydroxyl, amine or substituted amine.

In one method of operation, a dodecahydrododecaborate salt, an amide of a carboxylic acid and an aqueous solution of a hydrogen halide, e.g., hydrogen chloride, are reacted, generally with heating. The product of the reaction is isolated as a metal salt and it is then reacted in a second step with an aqueous solution of an alkali metal hydroxide to obtain a compound of formula 1 in which X is —OH.

In a second method of operation, hydrates of metal salts of dodecahydrododecaborates are heated under reduced pressure over drying agents to obtain compounds of Formula 1 in which X is —OH. This method is especially useful for obtaining compounds which have a plurality of —OH groups.

Compounds of Formula 1 in which X is amine or a substituted amine are obtained by several methods. In one method a dodecarborate (2−), either as the acid or metal salts of the acid, is reacted with an hydroxylamine-O-sulfonic acid, generally in a neutral aqueous solution. The reaction proceeds readily at moderate temperatures and the amine-substituted compound is isolated by conventional procedures.

A second method of preparing compounds bearing amine groups consists in mixing a dodecaborate(2−) acid, e.g., $H_2B_{12}H_{12}$ or, in its hydronium form, $(H_3O)_2B_{12}H_{12}$, and an amide in aqueous solution. The solution is heated until water is removed completely and it is then refluxed. Dilution of the solution with an alcohol, e.g., $CH_3OH$, followed by addition of a salt having an appropriate cation leads to the isolation of a compound of generic Formula 1 in which X is —NH₂, —NHR′ or —NR₂′.

A second group of products is obtained in this reaction which are compounds of Formula 1 in which X is formyloxy or hydrocarboncarbonyloxy, i.e., —OC(O)H or —OC(O)R′. To illustrate, with dimethylformamide as the reactant, compounds of Formula 1 are obtained in which X is —OC(O)H; with dimethylacetamide, compounds in which X is —OC(O)CH₃ are obtained. This group of compounds is also obtained readily by esterification of the hydroxyl-bearing compounds as described below.

The hydroxyl- and amine-substituted compounds can be used as intermediates for the preparation of compounds of the invention in which X is bonded to boron through oxygen or nitrogen. To illustrate, the hydroxyl-bearing compound is reacted with acids, acid halides or acid anhydrides to obtain compounds in which X represents an ester group [—OC(O)R′, or —OC(O)H]; with isocyanates to obtain compounds in which X is —OC(O)NHR′; with olefins to obtain compounds in which X is —OR′; with acetylenic compounds to obtain products in which X is —OCH=CHR′; with sulfonyl halides to obtain products in which X is —OSO₂R′, and the like. As a further illustration, the amine-bearing compounds can be acylated to give products having groups such as —NHC(O)R′ and they can be reacted with isocyanates to obtain compounds having groups such as —NHC(O)NHR′. Amine-substituted (—NH₂) compounds can also be alkylated, e.g., with dialkyl sulfates, to obtain compounds bearing —NHR′ and —NR₂′ groups.

In the above description, R′ has the meaning defined in an earlier paragraph. To illustrate, by using the appropriate amino-substituted polyborate and acid halide, there can be obtained

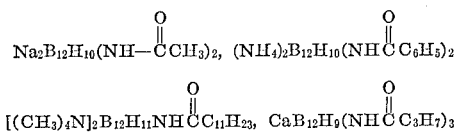

and the like.

Compounds bearing carboxy groups or esters and amides thereof are obtained by reacting the acid $H_2B_{12}H_{12}$, generally as a hydrate $[(H_3O)_2B_{12}H_{12} \cdot nH_2O$, where $n$ has a value of up to 13] with carbon monoxide under superatmospheric pressure. The product thus obtained is dissolved in water or in alcohols to obtain compounds bearing carboxyl groups or esterified carboxyl groups. The product of the carbon monoxide reaction can be reacted with ammonia or amines to obtain compounds bearing amide groups. The compounds are most conveniently isolated in the form of salts, e.g., metal or nitrogen base salts. Products bearing carbacyl halide groups (e.g., —COCl), can be obtained by reacting carboxy-substituted compounds with a halogenating agent, e.g., $PCl_5$, $AsCl_5$ and the like.

X groups which are not alike.—The processes which have been described can be employed to obtain compounds having one or more X groups. These groups, if more than one is present, can be alike or different. To obtain compounds having two or more X groups which are unlike, the dodecahydrododecaborate is reacted with one electrophilic reagent until the desired number of substituents are introduced and the partially substituted product is then reacted with a second electrophilic reagent. The intermediate partially substituted product can, if desired, be isolated prior to reaction with the second electrophilic reagent. The process can be repeated with a third electrophilic reagent, or even further, until all hydrogens bonded to borons have been replaced. Further modification of various substituent groups can be accomplished by conventional methods to obtain compounds having a broad range of X groups.

To illustrate, compounds of the following formulas can be obtained by the methods described above:

$MgB_{12}H_4Cl_6(NH_2)_2$
$SrB_{12}Cl_8(OH)_4$
$K_2B_{12}H_8(CO_2H)_2(SCH_3)_2$
$[(CH_3)_3S]_2B_{12}H_{10}(SCH_3)NO_2$
$Zn(H_2O)_4B_{12}H_8(CH_3)_2(OH)_2$
$Co(NH_3)_6B_{12}H_8(C_2H_5)_2(OH)_2$
$H_2B_{12}H_{10}[C(O)CH_3](OC_3H_7)$
$(C_{10}H_7NH_3)_2B_{12}H_2Cl_6(OH)_2(SC_4H_9)_2$
$[(C_4H_9)_4P]_2B_{12}Cl_5Br_3F_2(SCH_3)_2$
$(C_5H_5NH)_2B_{12}H_2Cl_8(N_3)_2$
$[C_5H_5N(C_{16}H_{33})]_2B_{12}H_4Cl_5(OC_2H_5)_2(SCH_3)$
$Ag_2B_{12}Cl_5Br_7$
$Ag_2B_{12}Cl_{10}(OCH_2CH_2OCH_3)_2$ and the like.

In the processes described above, direct replacement of hydrogen bonded to boron by another element or group of elements can occur, i.e., substitution, or the substituent atom or group can be replaced wholly or in part by some other atom or group, i.e., displacement. Whether the reaction is substitution, replacement or displacement, there is no change in the geometry of the dodecaborate cage or dodecaborate moiety.

Metathetic reactions.—Compounds of Formula 1 wherein M covers a wide range of cations are obtained by simple metathetic reactions. To illustrate, an aqueous solution of a compound of Formula 1 where M is $NH_4^+$ is contacted with a strong acid or with a strongly acidic cation exchange resin to obtain the free acid, i.e., a compound of Formula 1 in which M is H. The acid, generally in solution, is reacted with metals, oxides of metals, hydroxides of metals, salts of metals (both organic and inorganic), nitrogen bases, sulfonium hydroxides or halides, phosphonium hydroxides or halides, aryldiazonium hydroxides or halides, and similar types of compounds to obtain products of Formula 1 which have the desired cation M. In a process employing an ion-exchange resin, strongly acidic resins of the sulfonic acid variety are preferred because of availability, e.g., "Amberlite IR–120H" and "Dowex" 50. The acid, so obtained in aqueous solution, can be reacted with nitrates, chlorides, bromides, acetates, benzoates and similar salts of metals or other bases to obtain salts of Formula 1.

To illustrate, an aqueous solution of $Cs_2B_{12}H_2Cl_{10}$ is passed through a column packed with "Amberlite IR–120–H" to obtain in aqueous solution the acid $H_2B_{12}H_2Cl_{10}$. The aqueous solution is evaporated under reduced pressure to obtain the concentrated acid, either as a hydrate of the formula $(H_3O)_2B_{12}H_2Cl_{10}$ or as the free acid $H_2B_{12}H_2Cl_{10}$. Examples of other acids which can be obtained and the salts from which they can be derived are as follows:

| Compound | Acid obtained |
| --- | --- |
| $Na_2B_{12}H_4Cl_8$ | $H_2(B_{12}H_4Cl_8)$ |
| $[(CH_3)_4N]_2B_{12}H_{10}Br_2$ | $H_2(B_{12}H_{10}Br_2)$ |
| $K_2B_{12}H_2Cl_{10}$ | $H_2(B_{12}H_2Cl_{10})$ |
| $Li_2B_{12}Cl_{12}$ | $H_2B_{12}Cl_{12}$ |
| $[(CH_3)_4N]_2B_{12}H_{10}I_2$ | $H_2B_{12}H_{10}I_2$ |
| $Na_2B_{12}H_{10}(NO_2)_2$ | $H_2B_{12}H_{10}(NO_2)_2$ |
| $K_2B_{12}H_{11}CN$ | $H_2B_{12}H_{11}CN$ |

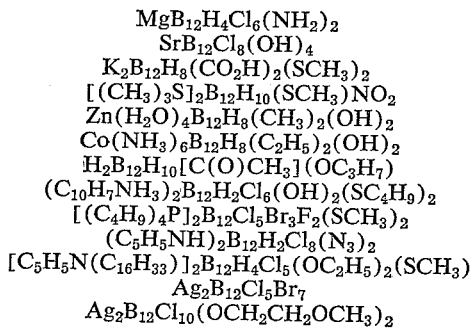

Compounds of Formula 1 where M is an alkali or alkaline earth metal, e.g., Na, K, Cs, Ca, Ba, Mg, and Sr, can undergo simple metathetic reactions with other salts to effect an exchange of cations. Thus, $Na_2B_{12}H_{10}Cl_2$ or $K_2B_{12}H_8(OH)_4$ can be reacted in aqueous solution with ammonium sulfate, benzenediazonium hydroxide, pyridinium chloride, morpholinium sulfate, polyethyleneimine hydrochloride, and the like, to form compounds of Formula 1 having ammonium, benzenediazonium, pyridinium, morpholinium, and the like, as cations. These illustrations are not limiting and they demonstrate the breadth of metathetic reactions which can be used.

Compounds of the invention in which the group M is a metal, particularly a transition metal, or a Werner-type complex, frequently contain solvent of crystallization when isolated by conventional methods. The solvent, e.g., water, can be bound loosely in the lattices of the crystals or it can be associated by stronger bonds with the metal cation or Werner-type complex cation. Solvent of crystallization, entrapped in crystal lattices, is removed easily by well-known procedures, e.g., heating under reduced pressure. Solvent of crystallization which is associated with the cation is more difficult to remove, and for most applications, it is not necessary to remove completely this type of bound solvent.

The products of the invention and processes for obtaining them are illustrated in the following examples.

Preparations of representative dodecahydrododecaborates, and a bis(carbonyl)dodecaborane(10), are illustrated in Examples A, B, C, D and E. The products as obtained, are used as reactants to prepare the compounds of the invention.

EXAMPLE A

A pressure vessel of 400 ml. capacity is charged with 9.5 g. of sodium hydroborate and 75 ml. of 1,2-dimethoxyethane, also called "glyme." The vessel is closed, cooled to $-80°$ C. and evacuated to a pressure of about 0.001 mm. of mercury. Diborane (14.0 g.) is charged into the vessel which is then sealed and heated with agitation under autogenous pressure for 10 hours at 120° C. The molar ratio of $NaBH_4$ to $B_2H_6$ in this reaction is 1:2. The reactor is cooled, the volatile products are released by venting and the contents of the tube are washed into a receiver with glyme. A suspension of a white solid in a yellow liquid is formed from which the solid is separated by filtration. The solid is dissolved in hot tetrahydrofuran and the solution is filtered to remove a trace of unreacted sodium hydroborate. The hot filtrate is diluted with glyme and chilled to yield 14.0 g. of disodium polyhydropolyborate(2−) as long, glistening white needles. The compound crystallizes with 1,2-dimethoxyethane and water. The compound has the following infrared absorption frequencies: $2.8\mu$, sharp, medium; $3.9\mu$ with $4.02\mu$ shoulder, sharp, strong; 6.2, 7.8 and $8.4\mu$, sharp, medium; $9.3\mu$, medium, sharp, strong; $10.9\mu$, sharp, strong; and $13.9\mu$, broad, weak. The compound shows the absorption bands which are characteristic of the dodecahydrododecaborate anion. It has the following elemental analysis: Analysis found—C, 14.33; H, 7.09; B, 45.08; Na, 16.1.

The compound therefore is a solvate of disodium dodecahydrododecaborate having the following composition: $Na_2B_{12}H_{12} \cdot 0.86 C_4H_{10}O_2 \cdot 1.25 H_2O$.

The compound can be obtained as its hydrate, free of ether of solvation, by recrystallization from a large quantity of diethyl ether or tetrahydrofuran/diethyl ether mixtures, followed by drying under reduced pressure. The ether-free hydrate has infrared absorption characteristics as follows: $2.8\mu$, sharp, medium; $3.9\mu$, sharp, strong; $6.2\mu$, sharp, medium; $9.25\mu$, sharp, medium; and $13.9\mu$, broad, medium. The elemental analysis is as follows: Found— H, 6.56; B, 62.02; Na, 20.5.

The compound is therefore a monohydrate of disodium dodecahydrododecaborate, i.e., $Na_2B_{12}H_{12} \cdot H_2O$ (calculated analysis: H, 6.85; B, 63.05; Na, 22.32).

The dihydrate, $Na_2B_{12}H_{12} \cdot 2H_2O$, is obtained in the above process by less intensive drying of the crystals.

EXAMPLE B

An aqueous solution of 3.2 g. of $Na_2B_{12}H_{12}$ (with water and 1,2-dimethoxyethane as solvents of crystallization), obtained as described in Example A, is mixed with an aqueous solution of 12 g. of cesium fluoride. A heavy white precipitate forms which dissolves in the reaction mixture on warming. On cooling, fine white crystals form which are separated by filtration and dried. There is obtained 3.2 g. of cesium dodecahydrododecaborate(2−) with 1,2-dimethoxyethane as solvent of crystallization.

EXAMPLE C

An aqueous solution containing 0.43 g. of the hydrate of disodium dodecahydrododecaborate(2−) is passed through a 0.5″ diameter chromatography column containing 80 ml. of the ion-exchange resin of the crosslinked polystyrenesulfonic acid type. The strongly acid effluent from the column is evaporated to remove all materials volatile at less than 0.001 mm. at 45° C. There remains 0.38 g. of a very white, crystalline, very hygroscopic solid which is a hydrate of dihydrogen dodecahydrododecaborate(2−). The acid titrates as a very strong acid, having an equivalence point at a pH of 7. The infrared absorption spectrum of the acid, which has the formula $H_2B_{12}H_{12}$, shows strong absorption at $3.98\mu$ and $9.3\mu$. The crystalline acid, as normally obtained, contains from 2 to 10 or more moles of water of hydration. Two moles of water of hydration are considered to be associated with the hydrogen ions and the various hydrates can, therefore, be written as $(H_3O)_2B_{12}H_{12}$, $(H_3O)_2B_{12}H_{12} \cdot 8H_2O$, and the like.

EXAMPLE D (A) An aqueous solution containing 0.3 g. of the hydrate of disodium dodecahydrododecaborate is mixed with an aqueous solution containing an equal weight of tetramethylammonium chloride. A white precipitate forms immediately. The mixture is heated to boiling and sufficient methanol is added to form a clear solution. The solution is chilled and white crystals from which are separated by filtration, washed and dried at very low pressure at 90° C. There is obtained 0.14 g. of bis(tetramethylammonium) dodecahydrododecaborate(2−). The compound can be purified by recrystallization from water.

The infrared absorption spectrum of the compound is as follows, using a Nujol mull: $3.95\mu$, sharp, strong; fine structure at $4.9$–$6.5\mu$, weak; $7.8\mu$, sharp, medium; $9.4\mu$, sharp, strong; and [for the $(CH_3)_4N^+$ cation], $10.5\mu$, sharp, strong.

(B) An aqueous solution of the free acid ($H_2B_{12}H_{12}$) obtained from $Na_2B_{12}H_{12}$ is neutralized by treatment with cesium hydroxide. A white solid precipitates which is separated by filtration and dried as described above. The product, which is $Cs_2B_{12}H_{12}$, is sparingly soluble in water and it is characterized by the following infrared absorption bands: $3.9\mu$, $9.35\mu$, sharp, strong; $14.0\mu$, sharp, medium; $13.3\mu$, medium broad, weak.

(C) An aqueous solution of $H_2B_{12}H_{12}$, obtained from $Na_2B_{12}H_{12}$, is stirred with an excess of nickelous carbonate ($NiCO_3$) until no further solution of the carbonate is observed. The excess reagent is removed by filtration and the filtrate is evaporated by gentle warming at 25 mm. pressure. The residual solid is dried at about 25° C. and at a final pressure of 25 microns. There is obtained a pale green, very water-soluble hydrated nickel dodecahydrododecaborate(2−).

Analysis.—Calc'd for $NiB_{12}H_{12} \cdot 6¼ H_2O$ (percent): Ni, 18.74; B, 41.45; H, 7.88. Found (percent): Ni, 18.72, 18.68; B, 41.18, 41.44; H, 8.05, 9.01.

(D) An aqueous solution of $H_2B_{12}H_{12}$ is neutralized with an aqueous solution of KOH. The solution is evaporated to dryness under reduced pressure to obtain a hydrate of $K_2B_{12}H_{12}$ as a solid crystalline product. The degree of hydration is not critical and the compound is employed in reactions as obtained above.

EXAMPLE E

Preparation of $B_{12}H_{10} \cdot 2CO$

A silver-lined shaker tube (capacity, 400 ml.) is charged with 20 g. of a hydrate of $H_2B_{12}H_{12}$ containing 4–6 moles of water per mole of acid. The tube is sealed and evacuated to a low pressure. The tube is attached to a shaker, heated cautiously and carbon monoxide is admitted under pressure in several stages until a temperature of 80° C. and a pressure of 1000 atmospheres is reached. The tube is shaken for 5 hours at 80° C. and 975–1000 atmospheres with repressuring with CO as necessary. At the end of this time the tube is cooled to atmospheric temperature (ca. 25° C.) and it is vented to remove unreacted carbon monoxide.

A portion of the semisolid reaction product is dried under reduced pressure is a sublimation apparatus and the dried material is heated at 100° C. C./1 mm. Hg pressure. The compound $B_{12}H_{10} \cdot 2CO$, which can also be written as $B_{12}H_{10}(CO)_2$, is collected as a crystalline sublimate.

Analysis.—Calc'd for $B_{12}H_{10} \cdot 2CO$ (percent): C, 12.2; H, 5.1; B, 66.1. Found (percent): C, 13.0; H, 5.5; B, 65.4.

A second portion of the product from the shaker tube is dried at 25° C./1 mm. pressure in the presence of $P_2O_5$ and extracted with hot benzene. The benzene extract is cooled and $B_{12}H_{10} \cdot 2CO$ precipitates as a crystalline solid. It is separated by filtration and dried.

The infrared absorption spectrum of the compound in a mineral oil mull shows strong bands at $3.9\mu$ and $4.55\mu$; somewhat weaker bands at $9.3\mu$ and $13.8\mu$; and weaker bands at $9.1\mu$, $9.8\mu$, $11.7\mu$ and $13.5\mu$.

The procedures described in Example D are generic for the preparation of salts of the $B_{12}H_{12}^{-2}$ anion. The procedures described in Parts B and C are particularly useful, employing as one reactant, a base with the desired cation, i.e., group M, to neutralize the acid $H_2B_{12}H_{12}$. The solution can be evaporated to dryness in the event the salt is soluble and does not precipitate. Any salt which is desired for use as a reactant in substitution reactions can, therefore, be prepared by the above process.

The compounds of the invention are further illustrated by reference to the following examples:

EXAMPLE 1

(A) A corrosion-resistant reaction vessel is charged with 1 g. of $Cs_2B_{12}H_{11}OH$, prepared as described in Example 8, Part A. The vessel is cooled to 0° C. and 15 ml. of anhydrous HF is added. The mixture is agitated for 1 hour at 0° C. and it is then warmed to about 25° C. to volatilize unreacted HF. The solid crystalline product which remains is principally $Cs_2B_{12}H_{11}F$. It contains 5.98% fluorine and the infrared spectrum shows substantially no absorption bands for the hydroxyl group.

(B) A corrosion-resistant pressure vessel is cooled in solid carbon dioxide and it is flushed with nitrogen. The vessel is charged with 25 g. of anhydrous HF and 5.0 g. of hydrated $H_2B_{12}H_{12}$. It is closed and the mixture is heated with agitation under autogenous pressure for 4 hours at 85–100° C. The mixture is cooled to about 25° C., vented into a corrosion-resistant container, and flushed with nitrogen to remove all unreacted hydrogen fluoride. The resilue is removed and it is neutralized with aqueous 50% cesium hydroxide solution. The precipitate is separated by filtration and it is crystallized from water to obtain a white crystalline product which is a mixture of about 80% $Cs_2B_{12}H_8F_4$ and 20% $Cs_2B_{12}H_7F_5$.

Analysis.—Calc'd for the above mixture (percent): B, 25.1; F, 16.5. Found (percent): B, 25.1, 25.0; F, 16.5, 16.3.

The process is repeated, using twice the quantities given above. There is obtained a white crystalline solid which is a mixture of about 30% $Cs_2B_{12}H_9F_3$ and 70%

$$Cs_2B_{12}H_8F^4.$$

Analysis.—Calc'd for the above mixture (percent): F, 14.8. Found (percent): F, 14.87.

(C) The process of Part B is repeated again and there is obtained in pure form the tetrafluoro derivative.

Analysis.—Calc'd for $Cs_2B_{12}H_8F_4$ (percent): B, 27.0; F, 15.7. Found (percent): B, 27.0; F, 15.7.

(D) A mixture of 10 g. of the monohydrate of $Na_2B_{12}H_{12}$ and 40 g. of anhydrous HF is heated in a corrosion-resistant pressure vessel at 90° C. for 5 hours under autogenous pressure. The vessel is cooled, vented and nitrogen gas is bubbled through it vigorously for 4 hours at about 25° C. to remove unreacted HF. The residual reaction mixture is removed and it is neutralized with aqueous 50% CsOH solution. The cesium salt which precipitates is separated and recrystallized three times from water to obtain 16 g. of a mixture of about 80% $Cs_2B_{12}H_8F_4$ and 20% $Cs_2B_{12}H_7F_5$.

Analysis.—Calc'd for $Cs_2B_{12}H_{7.8}F_{4.2}$ (percent): B, 25.1; F, 16.5; Cs, 55.0. Found (percent): B, 24.34; F, 16.4; Cs, 57.5.

(E) The process of Part D is repeated except that the temperature of the reaction is increased to 150° C. The compound obtained is $Cs_2B_{12}H_6F_6$. The infrared spectrum of the compound shows absorption at the following wavelengths: 4.0, 8.5 (strong), 9.4 (weak), 10.2 (strong), 10.7, 11.6, 12.1 and 13.8μ.

Analysis.—Calc'd for $Cs_2B_{12}H_6F_6$ (percent): B, 25.0; F, 22.1. Found (percent): B, 24.3; F, 21.6.

(F) Anhydrous $K_2B_{12}H_{12}$ and HF are reacted at 150° C. under the conditions described for Part D. The product, isolated as the cesium salt, is the pentafluoro derivative.

Analysis.—Calc'd for $Cs_2B_{12}H_7F_5$ (percent): B, 25.9; F, 19.1. Found (percent): B, 25.3; F, 18.6.

(G) The process of Part D is repeated employing 21.5 g. of $Na_2B_{12}H_{12} \cdot 6H_2O$ and 30 g. of anhydrous HF. The mixture is heated 5 hours at 90° C. The product, isolated as the cesium salt, is a mixture of $Cs_2B_{12}H_{10}F_2$ and $Cs_2B_{12}H_9F_3$. The analysis is as follows: F, 10.33%; B, 25.21%.

(H) A reaction vessel is charged with 40 ml. of water and 2.5 g. of hydrated $NiB_{12}H_{12}$, prepared as described in Example D, Part C. A stream of gas containing one part fluorine to ten parts of nitrogen is passed into the reaction mixture for 7 hours. Passage of the gas mixture is stopped and the reaction mixture is neutralized with $NH_4OH$. Incipient precipitation of $Ni(NH_3)_4B_{12}F_{11}OH$ occurs. At this point addition of $NH_4OH$ is stopped and the solution is filtered. Traces of the $BF_4^-$ ion are removed as the cesium and rubidium salts and the solution which remains is mixed with $(CH_3)_4NCl$ to precipitate tetramethylammonium cesium undecafluorohydroxydodecaborate(2−). The infrared spectrum shows absorption bands as follows (expressed as cm.$^{-1}$): 1215, strong; 725, strong, broad; 1080, 770 and 705, weak. Absorption bands, characteristic of the B—H bonding, are absent.

Analysis.—Calc'd for $(CH_3)_4NCsB_{12}F_{11}OH$ (percent): C, 8.53; H, 2.31; B, 23.0; F, 37.1. Found (percent): C, 8.72; H, 2.33; B, 22.5; F, 35.6.

(I) A reaction vessel of poly(tetrafluoroethylene) resin is charged with 200 ml. of water and 8.8 g. of crystalline hydrated $K_2B_{12}H_{12}$. The mixture is stirred to form a solution and it is cooled to about 0° C. Fluorine diluted with nitrogen (about 5 parts nitrogen to 1 part fluorine) is bubbled into the solution at a rate of 90 ml./min. for 50 hours. The temperature is maintained at about 0° C. during the operation. Flow of fluorine is stopped and the reaction mixture is filtered. The filtrate is evaporated in a platinum vessel at 90–100° C. (steam bath temperatures) to obtain 11.9 g. of a viscous mass which solidifies on cooling. The mass is neutralized with 8 ml. of 7 N aqueous KOH and the mixture is filtered. An aqueous solution of 6 g. of CsF in 6 ml. of water is added to the filtrate with stirring to precipitate $Cs_2B_{12}F_{11}OH$. The precipitate is separated by filtration and the filtrate is partially concentrated to obtain an additional quantity of product. Total yield of $Cs_2B_{12}F_{11}OH$ is 9.8 g. The product is recrystallized three times from slightly more than its weight in water and dried under reduced pressure at 100° C. The infrared spectrum of the compounds shows a band at 2.71–2.73μ (doublet).

Anlaysis.—Calc'd for $Cs_2B_{12}F_{11}OH$ (percent): Cs, 42.8; B, 20.9; F, 33.6. Found (percent): Cs, 42.4; B, 21.3; F, 33.5.

EXAMPLE 2

(A) A corrosion-resistant pressure vessel is cooled in solid carbon dioxide and flushed with nitrogen gas. It is charged with 20 g. of anhydrous HCl and 11 g. of hydrated $H_2B_{12}H_{12}$ prepared as described in Example C. The vessel is closed and the mixture is heated with agitation for 4 hours at 85° C. The vessel and contents are cooled to about 25° C. and volatile products are removed by venting. These products include unreacted HCl. The crude product remaining in the vessel is removed by washing with ice water and the aqueous solution is neutralized with aqueous $(CH_3)_4NOH$. The solid which forms is separated by filtration and it is purified by recrystallization from water. The compound is bis(tetramethylammonium) monochloroundecahydrododecaborate(2−). It is a white, crystalline product whose infrared spectrum, taken in a Nujol mull, shows absorption at the following wavelengths (express as microns, exclusive of bands coincident with Nujol): strong at 4.0, 9.6, 10.6 and 12.0; weaker at 7.8 and 12.4. The identity of the compound is confirmed by elemental analyses.

Analysis.—Calc'd for $[(CH_3)_4N]_2B_{12}H_{11}Cl$ (percent): N, 8.6; Cl, 11.1. Found (percent): N, 8.22; Cl, 11.56.

(B) A mixture of 5.0 g. of $NaB_{12}H_{12} \cdot H_2O$ and 36.5 g. of anhydrous HCl is heated in a pressure vessel with agitation at 90° C. for 5 hours under autogenous pressure. The reaction mixture is processed as described in Example 1, Part D, for the preparation of the fluorinated derivative, except that $(CH_3)_4NOH$ is employed in place of CsOH. The product obtained is $[(CH_3)_4N]_2B_{12}H_{11}Cl$. Elemental analyses are as follows: N, 7.4; Cl, 11.8.

(C) A reaction vessel is charged with 100 ml. of water and 10 g. of the hydrate of $H_2B_{12}H_{12}$. The mixture is cooled to about 0° C. and chlorine gas is bubbled through the solution until the color of chlorine persists. Passage of gas is stopped, the solution is evaporated to a small volume and it is neutralized with $NH_4OH$. An aqueous solution of $(CH_3)_4NCl$ is added to the neutral solution and the precipitate which forms is separated by filtration. The compound, which is bis(tetramethylammonium) hexachlorohexahydrododecaborate(2−), is purified by crystallization from water. It is a white crystalline solid which, in a Nujol mull, shows the following principal characterizing absorption bands in the infrared spectrum (expressed as cm.$^{-1}$): 1060, strong; 1025, shoulder; 950, strong; 885, strong; 850–790, strong, broad; 715, strong, broad.

*Analysis.*—Calc'd for $[(CH_3)_4N]_2B_{12}H_6Cl_6$ (percent): H, 6.1; C, 19.25; B, 26.1; Cl, 42.7. Found (percent): H, 5.70; C, 18.60; B, 25.7; Cl, 43.16.

(D) A reaction vessel is charged with 100 ml. of water and 1.9 g. of $Cs_2B_{12}H_{12}\cdot C_4H_{10}O_2$, prepared as described in Example B. Chlorine gas is passed into the solution at prevailing atmospheric temperature (about 25° C.) until the solution is saturated and passage of chlorine is continued for 2.5 hours. The resulting clear solution is evaporated under reduced pressure to obtain a white crystalline solid as a residue. The infrared absorption spectrum of the product shows that it is free of solvent, i.e., no dimethoxyethane (glyme) is present. The infrared spectrum further shows strong absorption at $9.5\mu$ and at $11.7\mu$.

The solid is recrystallized from aqueous solution to give fine white crystals whose infrared absorption spectrum shows a greatly reduced B—H absorption band at $4.0\mu$. The compound is again crystallized from water and the fine white crystals are dried at 65° C. at 0.02 mm. pressure for 3 hours. Elemental analysis of the product and the infrared absorption spectrum show that the compound is dicesium decachlorodihydrododecaborate(2−), i.e., $Cs_2B_{12}H_2Cl_{10}$.

*Analysis.*—Calc'd for $Cs_2B_{12}H_2Cl_{10}$ (percent): Cs, 35.4; B, 17.3; Cl, 47.2. Found (percent): Cs, 35.6; B, 17.69; Cl, 45.15.

(E) A glass reaction vessel is charged with 40 g. of $Na_2B_{12}H_{12}\cdot 2H_2O$ and 320 ml. of water. The mixture is stirred, cooled to 13–20° C. and chlorine gas is passed into it at this temperature for 2–3 hours. The cooling bath is removed and passage of chlorine gas is continued for 2 hours at 20–63° C. The mixture is now warmed to steam bath temperature and chlorine gas is passed through it for 2 hours. An aliquot portion of the reaction mixture is removed and mixed with an aqueous solution of $(CH_3)_4NCl$. The precipitate which forms is separated and it is crystallized from water to obtain

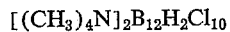

$[(CH_3)_4N]_2B_{12}H_2Cl_{10}$

The infrared absorption spectrum shows characterizing absorption bands at $4.0\mu$ (weak), $9.4$–$9.8\mu$ (strong), and $11.4\mu$ (strong).

(F) The solution remaining from the reaction of Part E is divided into two equal parts. Each portion is charged into a silver-lined pressure vessel (400 ml. capacity) and 50 g. of chlorine is added to each vessel. The reaction mixtures are heated for 2 hours at 150° C. under autogenous pressure. The vessels are cooled and vented to remove volatile products. The residual liquids are filtered and the combined filtrates are subjected to low pressure (water pump vacuum) to remove dissolved chlorine. The liquid is neutralized with about 120 ml. of 10 N potassium hydroxide and it is filtered again. A concentrated aqueous cesium fluoride solution is added to the filtrate with stirring. The precipitate which forms is separated by filtration to obtain $Cs_2B_{12}Cl_{12}$ as a white crystalline solid. The compound is crystallized from about 2.8 parts of hot water to obtain 117.5 g. of product, i.e., dicesium dodecachlorododecaborate(2−) as the monohydrate.

*Analysis.*—Calc'd for $Cs_2B_{12}Cl_{12}\cdot H_2O$ (percent): Cs, 31.68; B, 15.47; Cl, 50.70. Found (percent): Cs, 31.20; B, 15.58; Cl, 50.42.

(G) A reaction vessel is charged with 120 ml. of water and 20 g. of the monohydrate of $Na_2B_{12}H_{12}$. The solution is cooled in a mixture of ice and water and chlorine gas is bubbled through the solution until no further absorption of chlorine is evident. The solution is warmed to about 30° C. and passage of chlorine gas is continued until no further uptake of chlorine occurs. The reaction mixture and 50 g. of chlorine is now charged into a corrosion-resistant pressure vessel and the mixture is heated under autogenous pressure at 150° C. for 2 hours. The vessel is cooled, vented to the air and the reaction mixture is washed out with water. Some corrosion of the reaction vessel occurs and the mixture contains iron and other heavy metals as salts. The solution is neutralized with $NH_4OH$ and the precipitated metal hydroxides are separated by filtration. The filtrate is divided into three equal parts which are treated as follows:

(1) Aqueous CsF solution is added to one part and the white precipitate which forms is separated. The precipitate is crystallized several times from hot water to yield pure dicesium dodecachlorododecaborate(2−). This salt is moderately soluble in water. The infrared absorption spectrum of a Nujol mull of the compound shows the following bands (expressed as cm.$^{-1}$): 1040, very strong; 1005, weak; 725, weak, broad.

*Analysis.*—Calc'd for $Cs_2B_{12}Cl_{12}$ (percent): Cs, 32.4; B, 15.7; Cl, 51.8. Found (percent): Cs, 30.2; B, 15.8; Cl, 51.2.

(2) A second part is mixed with an aqueous solution of RbCl and the white precipitate, which is dirubidium dodecachlorododecaborate(2−), is separated by filtration. The salt is very water-soluble and it is purified by crystallization from water. The infrared absorption spectrum of a Nujol mull of the compound shows the following bands (expressed as cm.$^{-1}$): 1050, very strong; 1005, weak; 950 and 970, very weak; 890, very weak; 725, weak, broad.

*Analysis.*—Calc'd for $Rb_2B_{12}Cl_{12}$ (percent): B, 17.7; Cl, 58.7. Found (percent): B, 18.1; Cl, 59.7.

(3) The third part is mixed with an aqueous solution of $(CH_3)_4NCl$. The precipitate is treated as described above to obtain bis(tetramethylammonium) dodecachlorododecaborate(2−) as a white, crystalline product which has very low solubility in water. The infrared absorption spectrum of a Nujol mull of the compound shows the following bands (expressed as cm.$^{-1}$): 1040, very strong; 1005, weak; 950, strong; 725, weak, broad.

*Analysis.*—Calc'd for $[(CH_3)_4N]_2B_{12}Cl_{12}$ (percent): C, 13.9; H, 3.48; N, 4.03; B, 18.8; Cl, 61.2. Found (percent): C, 13.9; H, 3.97; N, 4.07; B, 18.1; Cl, 61.1.

The above compound is crystallized from solution in aqueous 1,2-dimethoxyethane to yield the monoetherate.

*Analysis.*—Calc'd for

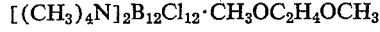

$[(CH_3)_4N]_2B_{12}Cl_{12}\cdot CH_3OC_2H_4OCH_3$ (percent): C, 18.2; H, 4.60; B, 16.6; Cl, 53.6. Found (percent): C, 18.0; H, 4.35; B, 16.2; Cl, 52.5.

(H) A portion of the product $[(CH_3)_4N]_2B_{12}Cl_{12}$, obtained in Part G, is dissolved in water and the aqueous solution is passed through a column packed with an acidic ion-exchange resin. The eluate is evaporated under reduced pressure at 25° C. to obtain the hydrate of the free acid, $H_2B_{12}Cl_{12}$, as a crystalline hygroscopic white solid.

*Analysis.*—Calc'd for $(H_3O)_2B_{12}Cl_{12}\cdot 6H_2O$ (percent): B, 18.5; Cl, 60.6; N.E., 350.8. Found (percent): B, 18.0; Cl, 59.9; N.E., 342.

A solution of 80 g. of $Cs_2B_{12}Cl_{12}\cdot H_2O$, obtained as described in Part F, is dissolved in 800 ml. of water and the warm solution is passed through a column, containing 753.5 g. of an acidic ion-exchange resin. The eluate is evaporated under reduced pressure to obtain $H_2B_{12}Cl_{12}$ containing 7.5 moles of water.

*Analysis.*—Calc'd for $(H_3O)_2B_{12}Cl_{12} \cdot 5\frac{1}{2}H_2O$ (percent): B, 18.75; Cl, 61.44. Found (percent): B, 18.73; Cl, 61.10.

The above hydrated acid is further dried under reduced pressure at 100° C. over $P_2O_5$ in an Abderholden unit for 22 hours to remove 5 moles of water of hydration.

*Analysis.*—Calc'd for $(H_3O)_2B_{12}Cl_{12} \cdot \frac{1}{2}H_2O$ (percent): B, 21.56; Cl, 70.63. Found (percent): B, 21.19; Cl, 70.99.

The infrared absorption spectrum of a Nujol mull of each of the above acidic compounds shows strong absorption at $9.7\mu$ with a "sharp" shoulder at $10.0\mu$ and no absorption at $4.0\mu$.

(I) An aqueous 0.086 M solution of $H_2B_{12}Cl_{12}$, prepared as described in Part H, is neutralized to a pH value of 7 with 1 N sodium hydroxide solution. The solution is evaporated under reduced pressure at 25° C. to obtain the disodium salt as a white crystalline solid.

*Analysis.*—Calc'd for $Na_2B_{12}Cl_{12} \cdot 2\frac{1}{2}H_2O$ (percent): Na, 7.11; B, 20.09; Cl, 65.83. Found (percent): Na, 7.60; B, 19.60; Cl, 65.97.

(J) An aqueous 0.086 M solution of $H_2B_{12}Cl_{12}$, prepared as described in Part H, is stirred about 18 hours with excess nickel carbonate. The solution is filtered to remove unreacted nickel carbonate and the filtrate is processed as described in Part I. The nickel salt is obtained as a pale green crystalline solid.

Analysis.—Calc'd for $NiB_{12}Cl_{12} \cdot 8H_2O$ (percent): Ni, 7.74; B, 17.13; Cl, 56.12. Found (percent): Ni, 7.81, 7.85; B, 16.82; Cl, 58.32.

The above salt is dried under reduced pressure over $P_2O_5$ at 100° C. for 31 hours to obtain the nickel salt as a tetrahydrate, a yellow crystalline product which dissolves readily in water.

*Analysis.*—Calc'd for $NiB_{12}Cl_{12} \cdot 4H_2O$ (percent): Ni, 8.55; B, 18.93; Cl, 62.02; $H_2O$, 10.50. Found (percent): Ni, 8.55, 8.45; B, 18.89; Cl, 62.81; $H_2O$, 9.72, 9.67.

The nickel salt is further dried 42 hours at 148° C. in the manner described above to obtain $NiB_{12}Cl_{12} \cdot 2H_2O$. Continued drying at 207.5° C. under reduced pressure yields the anhydrous salt, $NiB_{12}Cl_{12}$.

(K) An aqueous 0.086 M solution of $H_2B_{12}Cl_{12}$ is swirled with $Ag_2O$ until reaction is complete. The mixture is filtered and the filtrate is evaporated under reduced pressure at 25° C. to obtain the silver salt. The product is white and water-soluble.

*Analysis.*—Calc'd for $Ag_2B_{12}Cl_{12}$ (percent): Ag, 27.98; Cl, 55.18; B, 16.84. Found (percent): Ag, 27.72; Cl, 54.61; B, 16.51.

(L) An aqueous solution of the silver salt of Part K is mixed with $NH_4OH$. The white precipitate which forms is separated to obtain $[Ag(NH_3)_2]_2B_{12}Cl_{12}$ as a crystalline solid.

(M) Excess cerium carbonate is stirred overnight with an aqueous solution of $H_2B_{12}Cl_{12}$ (0.0841 mole). The solution is filtered and the filtrate is evaporated under reduced pressure at less than 50° C. to obtain hydrated $Ce_2(B_{12}Cl_{12})_3$ as a colorless, water-soluble salt.

*Analysis.*—Calc'd for $Ce_2(B_{12}Cl_{12})_3 \cdot 22H_2O$ (percent): Ce, 12.0; B, 16.7; Cl, 54.5. Found (percent): Ce, 11.0; B, 18.7; Cl, 54.8.

(N) An aqueous solution of $H_2B_{12}Cl_{12}$ (0.1035 mole) is stirred overnight with excess europium oxide. The reaction mixture is filtered and the filtrate is evaporated in a rotary drier under reduced pressure at less than 40° C. It is further dried under reduced pressure at about 25° C. over $P_2O_5$ to obtain a hydrate of $Eu_2(B_{12}Cl_{12})_3$ as a yellow-green solid.

*Analysis.*—Calc'd for $Eu_2(B_{12}Cl_{12})_3 \cdot 18H_2O$ (percent): Eu, 13.3; Cl, 55.6. Found (percent): Eu, 14.0; Cl, 55.9.

EXAMPLE 3

(A) A mixture consisting of 9 g. of hydrated $H_2B_{12}H_{12}$ (crystalline) and 36 g. of anhydrous HBr is heated in a corrosion-resistant pressure vessel under autogenous pressure for 4 hours at 100–105° C. The reaction vessel is cooled, vented and the reaction mixture is neutralized with $(CH_3)_4NOH$. The solid product is separated and recrystallized twice from water to obtain a compound which is principally the acid salt, $(CH_3)_4NHB_{12}H_{11}Br$.

*Analysis.*—Calc'd for $(CH_3)_4NHB_{12}H_{11}Br$ (percent): C, 16.3; H, 8.2; Br, 27.0. Found (percent): C, 19.9; H, 8.4; Br, 25.4.

The tetramethylammonium acid salt, obtained above, is dissolved in water and the solution is passed through a column filled with a sodium ion-exchange resin. The aqueous effluent is a solution of $Na_2B_{12}H_{11}Br$. Sufficient CsOH is added to the effluent to precipitate the compound as the cesium salt. It is separated, washed and crystallized twice from water to obtain the cesium salt as a dihydrate.

*Analysis.*—Calc'd for $Cs_2B_{12}H_{11}Br \cdot 2H_2O$ (percent): B, 24.9; Br, 15.3. Found (percent): B, 24.2; Br, 14.0.

(B) A solution of 8.4 g. of an etherate (glyme) of disodium dodecahydrododecaborate(2−) in aqueous methanol is chilled to 0–10° C. Bromine is added dropwise until it is no longer rapidly absorbed. Approximately 6.5 ml. of bromine is used. Bromine addition is continued until a total of 8.5 ml. is used. A small amount of solid forms and it is separated by filtration and discarded. The filtrate is evaporated to dryness at 10 mm. and 80° C. to leave a white solid suspended in an oil. This residue is taken up in a little water, made alkaline with sodium hydroxide and evaporated again to dryness at 10 mm. and 80° C. to leave a white solid. This residue is extracted with warm tetrahydrofuran. The insoluble portion, sodium bromide, is discarded. The tetrahydrofuran solution, clarified by filtration, is diluted with dioxane to precipitate while solid disodium hexabromohexahydrododecaborate(2−) which is washed with dioxane and dried.

*Analysis.*—Calc'd for $Na_2B_{12}H_6Br_6 \cdot 1\frac{2}{3}C_4H_8O_2 \cdot 2H_2O$ (percent): C, 16.17; H, 3.53; B, 13.15; Na, 4.66; Br, 48.56. Found (percent): C, 16.61; H, 3.86; B, 13.43; Na, 4.3; Br, 47.56.

(C) A solution is prepared consisting of 200 ml. of 50% aqueous methanol and 22 g. of $Na_2B_{12}H_{12} \cdot 2H_2O$. The solution is cooled to about 5° C. and it is brominated as described in Part B, employing 32.2 ml. of liquid bromine. The reaction mixture is processed as described in Part B to obtain a solution of $Na_2B_{12}H_6Br_6$ in tetrahydrofuran. The solution is evaporated to dryness, leaving 91 g. of a syrup-like residue which contains tetrahydrofuran as solvent of crystallization. The residue is dissolved in 250 ml. of water and the solution is evaporated to dryness to remove the tetrahydrofuran. The residue solidifies at prevailing atmospheric temperature to yield the sodium salt containing about 6 moles of water of hydration, i.e. $Na_2B_{12}H_6Br_6 \cdot 6H_2O$.

(D) An aqueous methanolic solution containing 0.25 g. of disodium dodecahydrododecaborate(2−) is cooled to 0° C. and liquid bromine is added dropwise with vigorous stirring until the color of bromine persists in the solution. Aqueous tetramethylammonium chloride is added with stirring to the solution and the white solid which forms is separated by filtration. It is recrystallized from aqueous methanol to obtain 0.32 g. of product in the first crop. A second crop of 0.23 g. of crystals is obtained from the filtrate. The crystals are a mixture of bis(tetramethylammonium) hexabromohexahydrododecaborate-(2−), i.e., $[(CH_3)_4N]_2B_{12}H_6Br_6$, and bis(tetramethylammonium) pentabromoheptahydrododecaborate(2−), i.e., $[(CH_3)_4N]_2B_{12}H_7Br_5$.

Elemental analyses of the two crops of crystals are as follows:

First crop

Analysis.—Calc'd for $(C_4H_{12}N)_2B_{12}H_{6.5}Br_{5.5}$ (percent): C, 13.26; H, 4.24; B, 17.92; N, 3.87; Br, 60.66. Found (percent): C, 14.14; B, 4.55; B, 17.69; N, 3.83; Br, 59.65.

Second crop

Analysis.—Calc'd for $(C_4H_{12}N)_2B_{12}H_{6.4}Br_{5.6}$ (percent): C, 13.12; H, 4.19; B, 17.73; N, 3.83; Br, 61.13. Found (percent): C, 12.69; H, 3.98; B, 17.50; N, 3.95; Br, 60.5.

These brominated polyhydrododecaborates are characterized by infrared absorption bands at $3.9\mu$, sharp, strong; $11.9\mu$, $12.4\mu$, $12.7\mu$, and $13.0\mu$, broad, strong; $9.6\mu$, medium sharp, medium; and $10.5\mu$, sharp, strong [for the $(CH_3)_4N^+$ ion].

(E) A portion (3.3 g.) of $Na_2Br_{12}H_6Br_6 \cdot 6H_2O$, obtained in Part C, is dissolved in about 5 ml. of water. The solution is mixed with a concentrated solution containing 3.3 g. of CsCl. The white crystals which form are separated and they are recrystallized twice from hot water. The product is dried to obtain the dicesium salt as a monohydrate.

Analysis.—Calc'd for $Cs_2B_{12}H_6Br_6 \cdot H_2O$ (percent): B, 14.45; Br, 53.3; H, 0.9; Cs, 29.55. Found (percent): B, 14.54; Br, 52.64; H, 1.25, 1.07; Cs, 29.4.

(F) A portion (9.2 g.) of the compound of Part C, i.e., $Na_2B_{12}H_6Br_6 \cdot 6H_2O$, is dissolved in a minimum quantity of water. The solution is passed through a column packed with an acidic ion exchange resin and the column is flushed with water. The washings and eluate are combined to yield a solution of the acid $H_2B_{12}H_6Br_6$ which, in solvated form, is also written as $(H_3O)_2B_{12}H_6Br_6$.

The process is repeated employing 5.2 g. of hydrated $Na_2B_{12}H_6Br_6$. The acid effluent is evaporated to dryness and the white residue is held under reduced pressure at 70–80° C. until the vapor pressure is less than 1 micron. The dried product, $H_2B_{12}H_6Br_6$, is a tough amber glass at atmospheric temperature. It is soluble in water, 1,2-dimethoxyethane, ethanol, benzenemethanol mixtures, and cold tetrahydrofuran. It is insoluble in benzene, chloroform, ether, dioxan and hot tetrahydrofuran. The titration curve, employing NaOH, shows a sharp break at pH=7.

(G) About 25 ml. of the acid solution, obtained in Part F, is neutralized with an aqueous solution of

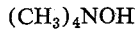

(CH$_3$)$_4$NOH

The white tetramethylammonium salt precipitates but it is not isolated. The crude aqueous reaction mixture is heated to boiling and it is diluted with water to a volume of about 40 ml. to obtain a clear solution. The solution is chilled and white crystals form which are separated by filtration. The crystals are further purified by two crystallizations from boiling water to obtain 0.44 g. of anhydrous $[(CH_3)_4N]_2B_{12}H_6Br_6$.

Analysis.—Calc'd for above compound (percent): B, 17.0; Br, 62.8; C, 12.58; H, 3.96; N, 3.67. Found (percent): B, 18.57; Br, 62.84; C, 12.71, 12.99; H, 4.13, 4.06; N, 3.75, 3.77.

The infrared absorption spectrum of a Nujol mull of the compound shows the following bands characteristic for the anion: $3.95\mu$, strong; $9.65\mu$, strong; $10.6\mu$, strong; $11.8\mu$, strong; $12.75\mu$, strong with shoulders at $12.4\mu$ and $13.0\mu$; and the following bands characteristic for the cation: $7.1\mu$, weak; $7.8\mu$, weak; and $10.55\mu$, strong.

(H) About 50 ml. of the acid solution, obtained in Part F, is neutralized with aqueous NaOH solution. Excess aqueous $(CH_3)_3SI$ solution is added and the reaction mixture in which a white precipitate is present, is heated to boiling and diluted with water to a total volume of about 100 ml. to yield a clear solution. The hot solution is cooled and the white crystals which form are separated. They are recrystallized twice from hot water to yield 1.04 g. of bis(trimethylsulfonium) hexabromohexahydrododecaborate(2−).

Analysis.—Calc'd for $[(CH_3)_3S]_2B_{12}H_6Br_6$ (percent): B, 16.88; Br, 62.3; C, 9.36; H, 3.14; S, 8.32. Found (percent): B, 16.73; Br, 62.21; C, 10.07, 10.25; H, 3.34, 3.31; S, 8.35.

(I) The process of Part H is repeated, employing an aqueous solution of $(C_2H_5)_3NHCl$ in place of an aqueous solution of the sulfonium iodide. There is obtained 0.69 g. of the triethylammonium salt.

Analysis.—Calc'd for $[(C_2H_5)_3NH]_2B_{12}H_6Br_6$ (percent): B, 15.9; Br, 58.7; C, 16.65; H, 4.44; N, 3.43. Found (percent): B, 14.78, 16.70; Br, 59.99; C, 17.16, 17.14; H, 4.65, 4.65; N, 3.34, 3.36.

(J) About 50 ml. of the acid solution, obtained in Part F, is neutralized with aqueous NaOH solution. Concentrated $NH_4OH$ (about 10 ml.) is then added to the solution with stirring after which an excess of an ammoniacal solution of $ZnCl_2$ is added. The white precipitate which forms is separated and it is recrystallized twice from boiling water. There is obtained 0.24 g. of tetraaminozinc hexabromohexahydrododecarborate(2−).

Analysis.—Calc'd for $Zn(NH_3)_4B_{12}H_6Br_6$ (percent): B, 17.32; Br, 64.1; H, 2.42; N, 7.48. Found (percent): B, 17.82; Br, 65.0; H, 2.62; N, 7.31, 7.17.

(K) The process of Part J is repeated employing ammoniacal $CuCl_2$ in place of the ammoniacal $ZnCl_2$ solution. The deep blue precipitate which forms is separated and it is crystallized twice from dilute $NH_4OH$. The product is tetraaminocopper(II) hexabromohexahydrododecaborate(2−).

Analysis.—Calc'd for $Cu(NH_3)_4B_{12}H_6Br_6$ (percent): B, 17.4; Br, 64.2; H, 2.43; N, 7.51; Cu, 8.52. Found (percent): B, 17.11; Br, 63.32; H, 3.11, 2.86; N, 7.52, 7.56; Cu, 8.53.

(L) A solution is prepared containing 10 g. of $(H_3O)_2B_{12}H_{12} \cdot 8H_2O$ in 150 ml. of water. Liquid bromine is added dropwise to the solution with stirring and the temperature rises rapidly to 90–100° C. The rate of addition of bromine is adjusted to maintain this temperature. After 59 g. of bromine is added, the rate of bromine uptake decreases sharply. An additional 20 g. of bromine is added and the mixture is held at 80–90° C. for 1 hour. The reaction mixture is concentrated to a small volume under reduced pressure and it is separated into two portions. To one part an aqueous solution of CsF is added and to the second part an aqueous solution of $(CH_3)_4NCl$ is added. The white precipitates in each reaction are separated by filtration and they are recrystallized from hot water. The compounds are dicesium and bis(tetramethylammonium) decabromodihydrododecarborates(2−).

Analysis.—Calc'd for $Cs_2B_{12}H_2Br_{10} \cdot 4H_2O$ (percent): B, 10.2; Br, 63.1; Cs, 21.0. Found (percent): B, 10.3; Br, 62.5; Cs, 22.1. Calc'd for $[(CH_3)_4N]_2B_{12}H_2BR_{10}$ (percent): C, 8.88; H, 2.23; B, 12.0; Br, 74.1. Found (percent): C, 8.89; H, 2.36; B, 11.6; Br, 74.4.

(M) A solution is prepared containing 20 g. of $Na_2B_{12}H_{12} \cdot 2H_2O$, 100 ml. of water and 100 ml. of methanol. It is cooled to 5–15° C. and bromine is added dropwise with stirring. After 30 ml. is added, the bromine uptake decreases sharply and an additional 30 ml. of bromine is added in one portion. A fast stream of chlorine gas is passed into the solution. The temperature of the reaction mass rises to 50° C. during this step. The solution is placed in a vessel equipped with a water aspirator and the solution is evaporated until excess bromine and the hydrogen chloride and hydrogen bromide formed in the reaction are removed, as shown by the absence of color due to chlorine or bromine. The solution is neutralized with $NH_4OH$ and it is divided into two portions.

To one part an aqueous solution of CsF is added with stirring and the precipitate is separated by filtration. The salt, dicesium dodecabromododecaborate(2−), is purified by crystallization from water.

*Analysis.*—Calc'd for $Cs_2B_{12}Br_{12}$ (percent): Cs, 19.6; B, 9.56; Br, 70.8. Found (percent): Cs, 18.1; B, 9.57; Br, 71.3.

The compound is also obtained readily as a monohydrate by crystallization from water.

*Analysis.*—Calc'd for $Cs_2B_{12}Br_{12} \cdot H_2O$ (percent): Cs, 19.4; B, 9.46; Br, 69.9. Found (percent): Cs, 18.5; B, 9.58; Br, 70.1.

To a second part of the neutralized solution an aqueous solution of $(CH_3)_4NCl$ is added with stirring. The precipitate is processed as described earlier to obtain bis(tetramethylammonium) dodecabromododecaborate(2−).

*Analysis.*—Calc'd for $[(CH_3)_4N]_2B_{12}Br_{12}$ (percent): C, 7.77; H, 1.94; B, 10.5; Br, 77.6. Found (percent): C, 8.29; H, 2.66; B, 10.6; Br, 77.7.

The infrared absorption spectrum of the $B_{12}Br_{12}^{-2}$ salts shows a band which is a doublet centered at 990 cm.$^{-1}$.

(N) A portion of the cesium salt obtained in Part M is dissolved in water and the solution is passed through a column packed with an acidic ion-exchange resin. The acidic eluate is evaporated under reduced pressure at 25° C. to give a hydrate of dihydrogen dodecarbromododecarborate(2−) as a white crystalline solid.

*Analysis.*—Calc'd for $(H_3O)_2B_{12}Br_{12} \cdot 6H_2O$ (percent): B, 10.5; Br, 77.6 (N.E., 617.8). Found (percent): B, 10.3; Br, 77.9 (N.E., 613).

(O) Operating in a photographic dark room, a solution of $AgNO_3$ (0.006 mole) in water (25 ml.) is added with stirring to a solution of $Cs_2B_{12}Br_{12} \cdot H_2O$ (0.003 mole) in water (200 ml.). The compound, $Ag_2B_{12}Br_{12}$, is precipitated in almost quantitative yield as a white solid which is separated, washed and dried. The infrared spectrum of the compound shows strong absorption bands at 10.05 and 10.17μ with a feeble spur at 10μ.

*Analysis.*—Calc'd for $Ag_2B_{12}Br_{12}$ (percent): B, 9.95. Found (percent): B, 9.92.

The acid, obtained in Part N, can be reacted in aqueous solution with salts, e.g., carbonates, chlorides, nitrates and the like, to obtain a wide range of products. To illustrate, $ZnCl_2$ reacts with the acid to form $ZnB_{12}Br_{12}$; $CuCl_2$ reacts with the acid to form the copper salt as a pale green hydrate, $Cu(H_2O)_4B_{12}Br_{12}$ which upon dehydration at 90° C. under low pressure becomes purple.

EXAMPLE 4

(A) A reaction vessel is charged with 22.4 g. of $Na_2B_{12}H_{12} \cdot 2H_2O$, 50 ml. of water and 150 ml. of methanol. The solution is stirred and a solution of 25.4 g. of iodine in 200 ml. of methanol is added gradually. The iodine color disappears immediately and a slight rise in temperature occurs. The solution is neutralized with $NH_4OH$ and an aqueous solution of $(CH_3)_4NCl$ is added with stirring. The precipitate which forms is separated and it is crystallized several times from water. The product is bis(tetramethylammonium) iodoundecahydrododecaborate(2−).

*Analysis.*—Calc'd for $[(CH_3)_4N]_2B_{12}H_{11}I$ (percent): C, 23.1; H, 8.42; B, 31.3; I, 30.5. Found (percent): C, 23.6; H, 8.73; B, 30.8; I, 30.4.

The infrared absorption spectrum shows the following characteristic bands (expressed as cm.$^{-1}$); 1280, weak; 1050, strong; 950, strong; ca. 800, strong, broad; and 720, weak.

(B) A solution containing 10 g. of $Na_2B_{12}H_{12} \cdot 2H_2O$ in a minimum amount of water is passed through a column packed with an acidic ion-exchange column. The column is washed to remove all of the acid and 200 ml. of an acidic eluate is obtained. There is added to this solution 200 ml. of $C_2H_5OH$ and 11.34 g. of iodine. The mixture is permitted to stand 2 hours at about 25° C. at which time the iodine color is gone. Tetramethylammonium chloride (15 g.) is added to the solution with stirring and the precipitate which forms is processed as described in Part A to obtain $[CH_3)_4N]_2B_{12}H_{11}I$. Analysis of the compound shows 22.2% C, 8.23% H, 29.1% B and 23.6% I.

Passage of an aqueous solution of $[(CH_3)_4N]_2B_{12}H_{11}I$ through a column filled with a commercial acid ion-exchange resin yields an aqueous solution of the acid $H_2B_{12}H_{11}I$. Evaporation of the solution yields a hydrate of the crystalline acid which is viewed as $(H_3O)_2B_{12}H_{11}I$. Optionally, the acid effluent from the ion-exchange column is neutralized with an aqueous solution of NaOH and the neutral solution is evaporated to dryness to obtain $Na_2B_{12}H_{11}I$ as a crystalline compound.

(C) The procedure of Part A is repeated except that 50.8 g. of iodine is employed and cesium fluoride is used instead of the tetramethylammonium chloride. The product obtained is mixed salt containing CsI and

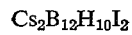

in equimolar proportions.

*Analysis.*—Calc'd for $Cs_2B_{12}H_{10}I_2 \cdot CsI$ (percent): Cs, 43.7; B, 14.1; I, 41.4. Found (percent): Cs, 42.9; B, 14.0; I, 41.8.

The infrared absorption spectrum shows the following characteristic bands (expressed as cm.$^{-1}$): 1060, weak; 1045, medium; 955, strong, slightly broad; 835, weak; 815, medium; 785, strong; 760, weak; 738, medium and 720, weak.

(D) An aqueous solution of $H_2B_{12}H_{12}$ is prepared as described in Part B from 50 g. of $Na_2B_{12}H_{12} \cdot 2H_2O$. The acidic eluate is mixed with 114 g. of iodine and the mixture is allowed to stand at about 25° C. until reaction is complete. An aqueous solution of CsOH is added with stirring and the precipitate is processed as described in previous parts.

*Analysis.*—Calc'd for $Cs_2B_{12}H_{10}I_2$ (percent): B, 19.7; I, 38.5; H, 1.52; Cs, 40.3. Found (percent): B, 16.2; I, 38.1; H, 1.48; Cs, 41.2.

(E) A solution is prepared which consists of 25 ml. of water and 2.1 g. of $Na_2B_{12}H_{12} \cdot H_2O$. The solution is swirled at atmospheric temperature (about 25° C.) while portions of a solution of 6 g. of iodine in 100 ml. of ethyl alcohol are added. Decolorization occurs fairly rapidly unitl 40 ml. of the iodine solution is added. Another 40 ml. is added and the dark mixture is allowed to stand at atmospheric temperature for 1 hour. The mixture is then evaporated under reduced pressure and a tacky light yellow solid is obtained as a residue. The solid, which is the sodium salt of diiododecahydrododecaborate, is dissolved in 15 ml. of water and excess aqueous 50% cesium fluoride solution is added with stirring. The precipitate which forms is separated by filtration and it is recrystallized from 10 ml. of water. Large white crystals are obtained which are dried at 65° C. at 0.1 mm. pressure for 3 hours. The product is dicesium diiododecahydrododecaborate(2−), i.e., $Cs_2B_{12}H_{10}I_2$. The identity of the compound is confirmed by its infrared absorption spectrum and by elemental analysis. The infrared spectrum shows strong bands at 10.5μ, 12.3μ, 12.7μ, 13.6μ and 13.8μ, in addition to the characteristic B—H and $B_{12}$ skeletal bands at 4.0μ and 9.7μ, respectively.

*Analysis.*—Calc'd for $Cs_2B_{12}H_{10}I_2$ (percent): B, 19.68; I, 38.49. Found (percent): B, 19.33; I, 39.00.

(F) One-half of the quantity of $Cs_2B_{12}H_{10}I_2 \cdot CsI$ obtained in Part C is added to a solution of 115 g. of ICl in 150 ml. of $CCl_4$. The mixture is heated at 80° C. for 8 hours with stirring. It is filtered and the solid product is extracted with $CS_2$ to remove free iodine and unreacted ICl. The solid residue is dissolved in water and an aqueous solution of CsCl is added to form a cream-colored precipitate. The product is separated and crystallized twice from water to yield dicesium dodecaiododecaborate(2−).

*Analysis.*—Calc'd for $Cs_2B_{12}I_{12}$ (percent): Cs, 13.8; B, 6.76; I, 79.4. Found (percent): Cs, 13.2; B, 6.67; I, 78.7.

Passage of an aqueous solution of $Cs_2B_{12}I_{12}$ through a column filled with a commercial ion-exchange resin yields an aqueous solution of $H_2B_{12}I_{12}$. Neutralization of this solution with an aqueous solution of NaOH and evaporation of the reaction mixture yields $Na_2B_{12}I_{12}$, generally as the dihydrate or hexahydrate, i.e, $Na_2B_{12}I_{12} \cdot 2H_2O$ or $Na_2B_{12}I_{12} \cdot 6H_2O$.

(G) Operating in a photographic dark room, a solution of $AgNO_3$ (0.68 g.) in water (20 ml.) is added to a stirred solution of $Na_2B_{12}I_{12} \cdot 6H_2O$ (3.61 g.) in water (100 ml.). The precipitate which forms is separated, washed and dried to obtain $Ag_2B_{12}I_{12}$ as an off-white product weighing 3.63 g.

*Analysis.*—Calc'd for $Ag_2B_{12}I_{12}$ (percent): Ag, 11.6; B, 6.95; I, 81.5. Found (percent): Ag, 10.7; B, 7.03; I, 76.7.

The similarity in chemical behavior of the dodecaborate moiety and a benzene nucleus, previously referred to as "aromaticity," is shown by the dehalogenation of the iodine-substituted dodecaborates to yield the parent dodecahydrododecaborate. To illustrate, 5.0 g. of

[(CH$_3$)$_4$N]$_2$B$_{12}$H$_{11}$I prepared as described in Example 4, Part A, is mixed with 200 ml. of liquid ammonia and potassium metal (ca. 0.5 g.) is added in small pieces until the blue color of free potassium persists. The liquid ammonia is evaporated and the white residue is crystallized from water to obtain [(CH$_3$)$_4$N]$_2$B$_{12}$H$_{12}$. In like manner, 4.55 g. of $Cs_2B_{12}H_{10}I_2$, obtained as described in Example 4, Part D, is dissolved in 25 ml. of liquid ammonia and treated with 1.2 g. of potassium to obtain $Cs_2B_{12}H_{12}$.

EXAMPLE 5

A) A solution is prepared containing 6 g. of the hydrate of $Na_2B_{12}H_6Br_6$ (see Example 3, Part C) in 50 ml. of water. The solution is cooled to about −30° C. and chlorine gas is passed into it until the gas is no longer absorbed. The solution is neutralized with $NH_4OH$ and a concentrated solution of CsCl is added. A precipitate forms and the mixture is heated until a clear solution is obtained. The solution is cooled and the crystals which form are collected. They are recrystallized from water to yield dicesium hexabromotrichlorotrihydrododecaborate(2−) as a dihydrate.

*Analysis.*—Calc'd for $Cs_2B_{12}H_3Br_6Cl_3 \cdot 2H_2O$ (percent): B, 12.7; Br, 47.0; Cl, 10.4. Found (percent): B, 12.7; Br, 46.7; Cl, 10.1.

The infrared absorption spectrum of the compound shows the following characteristic bands (expressed as cm.$^{-1}$): 2560, medium; 1630, medium; 1040, very sharp; 860, strong, broad; and 730–705, medium, broad.

(B) A solution is prepared containing 10 g. of $Cs_2B_{12}H_8F_4$ (see Example 1, Part C) in 30 ml. of water. The solution is heated almost to boiling and 8 ml. of bromine is added dropwise and with stirring. The solution is now heated to boiling, chlorine is passed into the mixture and four portions of 2 ml. each of bromine are added gradually. The solution is cooled and the solid which precipitates is separated. It is redissolved in hot water, a small quantity of aqueous CsOH is added to assure that the solution is basic and the mixture is cooled. The crystals which form are separated and recrystallized from hot water to obtain dicesium octabromotetrafluorododecaborate(2−).

*Analysis.*—Calc'd for $Cs_2B_{12}Br_8F_4$ (percent): B, 11.8; F, 6.8; Br, 57.0. Found (percent): B, 12.9; F, 6.74; Br, 57.6.

(C) A reaction mixture consisting of 14 g. of hydrated $(H_3O)_2B_{12}H_{11}I$ and 30 g. of anhydrous HF is heated with agitation under autogenous pressure at 90° C. for 4 hours. The reaction vessel is cooled, vented and swept with a stream of nitrogen gas. The reaction mixture is neutralized with CsOH and the cesium salt which precipitates is purified as described in earlier examples by crystallization from water to obtain a product which is principally $Cs_2B_{12}H_8F_3I$.

*Analysis.*—Calc'd for $Cs_2B_{12}H_8F_3I$ (percent): I, 21.5; F, 9.7. Found (percent): I, 20.9; F, 10.1.

Examples 1 through 5 illustrate compounds of the invention in which X is halogen and methods for their preparation. The processes are generic to the preparation of halogen-bearing compounds and can be employed to obtain compounds having a wide range of halogen substituents, both as to number and kind. To illustrate, the processes can be employed to obtain compounds having combinations of F, Cl, Br, and I substituents, e.g., $(NH_4)_2B_{12}Cl_5I_7$, $[Zn(NH_3)_4]B_{12}F_3Br_3I_6$, $Na_2B_{12}F_4Cl_3Br_2I_3$ and the like. In examples given later, it is shown that dodecaborates bearing X groups other than halogens can be employed as reactants to obtain compounds having mixed substitutents, e.g., $CaB_{12}H_5Cl_5(C_2H_4C_6H_5)_2$,
[(CH$_3$)$_3$S]$_2$B$_{12}$H$_6$Cl$_4$(SO$_2$C$_6$H$_5$)$_2$,
(pyridinium)$_2$B$_{12}$H$_5$Cl$_6$C(O)C$_6$H$_5$ and the like.

EXAMPLE 6

(A) A small portion of the compound obtained as described in Example A, i.e., disodium dodecahydrododecaborate(2−), is dissolved in a few cc. of water and the solution is added carefully to a few cc. of ice-cold concentrated nitric acid to form a clear amber solution. The solution is allowed to warm to about 25° C. and it is made alkaline with aqueous sodium hydroxide. An aqueous solution of tetramethylammonium chloride is added and a white precipitate forms which is the tetramethylammonium salt of a nitrated dodecaborate anion. The infrared absorption spectrum of the product, which is bis(tetramethylammonium) nitroundecahydrododecaborate(2−), shows absorption bands at 6.35μ and 7.74μ (characteristic for the nitro group) and at 3.9μ and at 9.25μ.

*Analysis.*—Calc'd for [(CH$_3$)$_4$N]$_2$B$_{12}$H$_{11}$NO$_2 \cdot$H$_2$O (percent): C, 26.52; H, 10.30; B, 35.84; N, 14.08. Found (percent): C, 26.3; H, 10.34; B, 37.99; N, 11.02.

(B) A solution consisting of about 5 g. of $Na_2B_{12}H_{12}$ (containing water of hydration) in 5 ml. of water is added dropwise with stirring to 10 ml. of 70% $HNO_3$, cooled in an ice-salt bath. The temperature is kept at 20–25° C. during the addition. The dark green solution is cooler and neutralized slowly with 8 ml. of aqueous 50% NaOH. The mixture is extracted with tetrahydrofuran several times. The extracts are combined and blown with air to remove the tetrahydrofuran. An oil (3.5 g.) remains to which 2 ml. of aqueous 50% CsF solution is added. A precipitate forms which is separated and recrystallized from water twice to give brownish-yellow crystals of dicesium nitroundecahydrododecaborate. The crystals ignite readily on a hot plate but they do not explode when struck with a hammer.

*Analysis.*—Calc'd for $Cs_2B_{12}H_{11}NO_2$ (percent): Cs, 58.7; B, 28.7; H, 3.4; N, 3.1. Found (percent): Cs, 51.5; B, 28.25; H, 3.10; N, 3.37.

(C) A solution is prepared which contains 3 ml. of water and 1.65 g. of disodium dodecahydrododecaborate. The solution is added dropwise and with stirring to 15 ml. of concentrated nitric acid which is cooled in ice. The reaction mixture is allowed to warm to atmospheric temperature (about 25° C.) and it is then made basic by adding 23 ml. of a 30% aqueous sodium hydroxide solution. The reaction mixture is evaporated to dryness under reduced pressure to obtain a solid yellow residue. The solid is extracted with tetrahydrofuran to dissolve the nitrated polyhydropolyborate. The solution is filtered and dioxane is added to the filtrate. The filtrate is concentrated under reduced pressure until a yellow solid precipitates. The solid is collected on a filter; it is washed with dioxane and dried at low pressure at 90° C. to give 0.47 g. of disodium nitroundecahydrododecaborate containing two moles of dioxane of solvation. The identity of the compound, which has the formula, $$Na_2B_{12}H_{11}NO_2 \cdot 2C_4H_8O_2$$

is confirmed by its infrared absorption spectrum and by elemental analysis. The infrared absorption spectrum shows bands at 4.0μ and 9.3μ, characteristic of the polyhydrododecaborate anion, and bands at 6.35μ and 7.75μ, characteristic of the nitro group. This compound is not shock-sensitive.

*Analysis.*—Cal'd for $Na_2C_8H_{27}B_{12}NO_6$ (percent): Na, 11.2; C, 23.5; H, 6.65; B, 31.75; N, 3.32. Found (percent): Na, 10.3; C, 22.6; H, 6.23; B, 31.1; N, 3.46.

Example 6 illustrates compounds of the invention in which X is a nitro group.

Compounds having a plurality of nitro groups on the dodecaborate ion, e.g., 2, 3, 4, or more nitro groups, can be obtained by employing a higher concentration of nitric acid in the reaction and by operating at temperatures higher than atmospheric, e.g., at 40° C. or higher. Nitration can also be conducted in several steps to obtain a higher degree of substitution.

The compounds of Example 6 can be converted by simple metathetic reactions to a broad range of compounds, e.g., $Na_2B_{12}H_{11}NO_2$,
$[(C_2H_5)_2NH_2]_2B_{12}H_{11}NO_2$,
$(C_6H_5NHNH_3)_2B_{12}H_{11}NO_2$,
$CsHB_{12}H_{11}NO_2$,
$Ag_2B_{12}H_{11}NO_2$,
$Al_2(B_{12}H_{11}NO_2)_3$, and
$SnB_{12}H_{11}NO_2$ The process of Example 6 illustrates broadly the preparation of nitro-substituted dodecaborates. The process can be used with dodecaborates bearing substituents other than —NO² groups to obtain compounds of the invention having both —NO₂ groups and other groups. The broad process can be used to prepare, for example, $Na_2B_{12}H_9(NO_2)_3$,
$K_2B_{12}H_7(NO_2)_5$,
$Cr_2[B_{12}H_9(NO_2)_3]_3$,
$Fe_2(B_{12}H_{11}NO_2)_3$,
$[(C_6H_5CH_2)(CH_3)_3N]_2B_{12}H_{11}NO_2$, and the like.

It can be used to prepare $Cs_2B_{12}H_9(C_6H_{11})(NO_2)_2$ from $Cs_2B_{12}H_{11}(C_6H_{11})$; $Na_2B_{12}H_4(C_{10}H_{21})_6(NO_2)_2$ from $$(H_3O)_2B_{12}H_6(C_{10}H_{21})_6$$

and $$[(CH_3)_4N]_2B_{12}H_{10}(OC_4H_9)NO_2$$

from $Cs_2B_{12}H_{11}OC_4H_9$. The halogen-bearing compounds obtained by the processes of Examples 1–5 can be nitrated by the process of Example 6 to obtain halogenated nitro-substituted compounds, e.g., $(NH_4)_2B_{12}H_6Cl_6NO_2$,
$Na_2B_{12}H_3Cl_7(NO_2)_2$,
$Cs_2B_{12}H_7Br_3(NO_2)_2$,
$CaB_{12}H_2Br_9NO_2$,
$Li_2B_{12}H_8I_2(NO_2)_2$,
$CaB_{12}H_{10}FNO_2$, and the like.

A solution is prepared which contains 1.8 g. of the solvated sodium polyhydropolyborate obtained as described in Example A (i.e., disodium dodecahydrododecaborate), 25 ml. of water and 0.54 g. of sodium nitrite (NaNO₂). The solution is chilled to below 5° C. and it is acidified with dilute sulfuric acid. The solution is clear yellow in color at low temperatures and it becomes deep green or warming to atmospheric temperature (about 25° C.). An aqueous solution of cesium hydroxide is added to the green solution with stirring and a yellow solid precipitates which is separated by filtration. The solid is recrystallized twice from water, and it is dried at about 25° C. under very low pressure (less than 0.01 mm.). There is obtained 1.0 g. of dicesium nitrosoundecahydrododecaborate (2−), i.e., $Cs_2B_{12}H_{11}NO$. The infrared absorption spectrum of the compound shows bands at 4.0μ, 7.3μ and 9.5μ.

Example 7 illustrates compounds of the invention in which the substituent X is nitroso and their preparation. The process is broadly operable for introducing —NO groups into dodecaborates. It can be used to prepare, for example, $SrB_{12}H_{10}(NO)_2$,
$CaB_{12}H_{10}(NO)_2$,
$[(CH_3)_4N]_2B_{12}H_{11}NO$,
$(NH_2NH_3)_2B_{12}H_{11}NO$, and the like.

Dedecaborates can be employed as reactants which bear substituents other than —NO groups. To illustrate, $$(NH_4)_2B_{12}H_{10}(OC_6H_{11})NO$$

can be obtained from $Cs_2B_{12}H_{11}OC_6H_{11}$;

$$Na_2B_{12}H_{10}(SO_2C_6H_5)NO$$

can be obtained from $Cs_2B_{12}H_{11}SO_2C_6H_5$, and the like.

EXAMPLE 8

(A) A reaction vessel is charged with a solution consisting of 20 g. of $Na_2B_{12}H_{12} \cdot 2H_2O$ and 200 ml. of N-methyl-2-pyrrolidone. The solution is stirred and 25 ml. of hydrochloric acid is added. The mixture is filtered and the filtrate is distilled until the pot temperature reaches 180° C. The mixture is held at this temperature for 3 hours and it is then poured into 600 ml. of alcohol. The resulting clear solution is mixed with a solution of 15 g. of CsOH in 200 ml. of alcohol. A white precipitate forms which is separated by filtration. The solid is crystallized from water to obtain 5.7 g. of product (designated as Product A). A portion (4.5 g.) of the solid is added to 25 ml. of 2.5% aqueous NaOH solution and the mixture is refluxed for 2 hours. The mixture is filtered and a solution of CsOH in ethanol is added with stirring. The precipitate which forms is separated and crystallized from water to yield dicesium monohydroxyundecahydrododecaborate (2−).

*Analysis.*—Calc'd for $Cs_2B_{12}H_{11}OH$ (percent): B, 30.6; H, 2.8; Cs, 62.8. Found (percent): B, 30.1; H, 2.8; Cs, 61.8.

Crystallization of the compound from aqueous cesium bromide solution yields the double salt $$Cs_2B_{12}H_{11}OH \cdot CsBr$$

(B) A pressure vessel is charged with a solution of 5 g. of the hydrate of $H_2B_{12}H_{12}$ in 25 ml. of water. The vessel is closed and the solution is heated under autogenous pressure for 5 hours at 200° C. The vessel is opened and aqueous cesium fluoride is added to the reaction mixture. The precipitate which forms is processed as described in Part A to yield $Cs_2B_{12}H_{11}OH$.

(C) Hydrated $H_2B_{12}H_{12}$ (29 g.; N.E., 194) is added slowly and with stirring to 100 ml. of acetone which is cooled with ice to keep the temperature at 20–25° C. The reaction mixture is stirred for 15 minutes at 25° C., 15 ml. of 50% aqueous NaOH solution is added, followed by 60 g. of aqueous 50% CsF solution. The precipitate which forms is separated to obtain 29 g. of $Cs_2B_{12}H_{11}OH$. The compound is purified by recrystallization from water.

(D) A mixture of 5 g. of $Cs_2B_{12}H_{11}OCH(CH_3)_2$, prepared as described in Example 13, Part B, and 25 ml. of 48% hydrogen bromide is refluxed for a short time. Excess hydrogen bromide is removed by blowing the mixture with air and sufficient 50% NaOH is added to make the solution basic. The precipitate which forms is processed as described in Part A to yield the double salt, $Cs_2B_{12}H_{11}OH \cdot CsBr$.

An aqueous solution of the double salt $$Cs_2B_{12}H_{11}OH \cdot CsBr$$

is passed through a column packed with an acid ion-exchange resin to obtain the acid $H_2B_{12}H_{11}OH$ in solution. The acidic eluate is neutralized with NaOH and the solution is evaporated to obtain $NaB_{12}H_{11}OH \cdot NaBr$. An aqueous solution of this sodium salt is mixed with an aqueous solution of $(CH_3)_4NCl$ to precipitate the tetramethylammonium salt in pure form.

*Analysis.*—Calc'd for $[(CH_3)_4N]_2B_{12}H_{11}OH$ (percent): B, 42.5; C, 31.47; H, 11.8; N, 9.1. Found (percent): B, 43.7; C, 27.8; H, 11.4; N, 8.2.

(E) A reaction vessel is charged with 3.0 g. of hydrated $H_2B_{12}H_{12}$ (N.E., 154) and 1.75 g. of oxalic acid. The vessel is placed in a boiling water bath and the mixture is stirred for 5 minutes. An exothermic reaction sets in and the temperature rises to a maximum of 120° C. with vigorous bubbling. The mixture is cooled to about 25° C. and 5 ml. of water is added. The solution is neutralized with aqueous CsOH solution to phenolphthalein end point. A precipitate forms and the reaction mixture is heated to boiling with addition of the minimum amount of water needed to dissolve the precipitate at the boiling point. The solution is cooled in an ice-water bath and the crystals which form are separated. They are crystallized from hot water to obtain 1.6 g. of $Cs_2B_{12}H_{11}OH$.

(F) A mixture of 8.75 g. of oxalic acid and 3.0 g. of hydrated $H_2B_{12}H_{12}$ is heated at 150° C. for 15 minutes. The reaction mixture is processed as described in Part E to obtain $Cs_2B_{12}H_{10}(OH)_2$.

(G) A reaction vessel is charged with a solution consisting of 20 g. of $Na_2B_{12}H_{12} \cdot 2H_2O$ and about 200 ml. of N-methyl-2-pyrrolidone. The solution is stirred and 25 ml. of hydrochloric acid is added. The mixture is filtered and the filtrate is distilled until a pot temperature of 205° C. is reached. The mixture is held at this temperature for 4 hours and it is then poured into 600 ml. of ethyl alcohol. The precipitate which forms is separated by filtration. It is purified by dissolving in acetonitrile and reprecipitating with ethanol. The product (7.8 g.) so obtained (which is

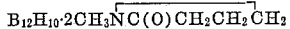

and is designated as Product B) is mixed with 50 ml. of 6% aqueous NaOH solution, the mixture is refluxed for 4 hours and then allowed to cool.

A portion of the above reaction mixture is added with stirring to a solution of 6 g. of $(CH_3)_4NOH$ in 400 ml. of ethyl alcohol. The mixture is evaporated to dryness, leaving a syrupy residue. The residue is mixed with 150 ml. of isopropyl alcohol and forms an oil. The oil is crystallized from solution in aqueous ethyl alcohol to yield bis(tetramethylammonium) dihydroxydecahydrododecaborate(2−).

*Analysis.*—Calc'd for $[(CH_3)_4N]_2B_{12}H_{10}(OH)_2$ percent): B, 40.3; C, 29.8; H, 11.2. Found (percent): B, 40.4; C, 26.1; H, 10.8.

The remaining portion of the reaction mixture is evaporated to a small volume and a concentrated solution of CsOH is added. The precipitate which forms is separated, recrystallized twice from water and dried 15 hours at 56° C. under very low pressure.

*Analysis.*—Calc'd for $Cs_2B_{12}H_{10}(OH)_2$ (percent): B, 28.4; H, 3.1; Cs, 58.1. Found (percent): B, 28.23, 28.31; H, 3.38; Cs, 58.25.

(H) A concentrated aqueous solution of $$Na_2B_{12}H_{12} \cdot 2H_2O$$

is passed through a column filled with an acidic ion exchange resin. The eluate is an aqueous solution of $H_2B_{12}H_{12}$. A portion of this solution containing 0.12 mole of the acid is reacted with the exact equivalent quantity of aluminum metal. The reaction proceeds rapidly with evolution of hydrogen and an aqueous solution of $Al_2(B_{12}H_{12})_3$ forms. The solution is evaporated to dryness and the residue is dried intensively over $P_2O_5$ at 25° C. to obtain the salt with sixteen moles of water of hydration.

*Analysis.*—Calc'd for $Al_2(B_{12}H_{12})_3 \cdot 16H_2O$ (percent): Al, 6.86; B, 49.56; H, 8.97. Found (percent): Al, 6.61; B, 50.6; H, 9.36

A portion of the above hydrated aluminum salt is heated at very low pressure for 44.5 hours at 148° C. over $P_2O_5$. A portion of the dry residue (8.58 g.) is mixed with 100 ml. of water and 80 ml. of 0.912 N aqueous CsOH solution is added with stirring. The mixture is filtered to remove insoluble $Al(OH)_3$ and the filtrate is evaporated to dryness to obtain the solid dicesium trihydroxynonahydrododecaborate(2−).

*Analysis.*—Calc'd for $Cs_2B_{12}H_9(OH)_3$ (percent): B, 28.49; H, 2.65; Cs, 58.32. Found (percent): B, 31.4; H, 3.08, 2.93; Cs, 57.63, 55.2.

A second portion (18.5 g.) of the above hydrated aluminum salt is heated at very low pressure for 83 hours at 148° C over $P_2O_5$. Water and hydrogen are released and a 20.9% loss in weight is noted. The residue (14.7 g.) is dissolved in 100 ml. of 1.44 N hydrochloric acid and the solution is diluted to a volume of 720 ml. The diluted solution is passed through a column filled with an acidic ion exchange resin and the eluate is neutralized with $(CH_3)_4NOH$ to obtain an aqueous solution of

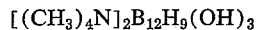

Neutralization of the eluate with $NH_4OH$ yields

(I) An aqueous solution of $H_2B_{12}H_{12}$ is neutralized with the exact quantity of $Be(OH)_2$ to provide a neutral solution of $BeB_{12}H_{12}$. The solution is evaporated to dryness and the residue is dried intensively over $P_2O_5$ to obtain the tetrahydrate of the beryllium salt.

*Analysis.*—Calc'd for $BeB_{12}H_{12} \cdot 4H_2O$ (percent): B, 58.22; Be, 4.04; H, 6.04. Found (percent):B, 60.26; Be, 4.12, 3.94; H, 8.73.

A quantity (9.93 g.) of the above beryllium salt is heated under very low pressure over $P_2O_5$ for 52 hours at 148° C. The dried product, which shows a weight loss of 9.83%, is suspended in 100 ml. of water, 90 ml. of 1 N $NH_4OH$ is added with stirring, and the mixture is filtered to remove $Be(OH)_2$. The filtrate is evaporated to dryness to yield the solid $(NH_4)_2B_{12}H_9(OH)_3$.

(J) A reaction vessel is charged with 70 ml. of tert.-butanol and 6 g. of $(H_3O)_2B_{12}H_{12} \cdot 6H_2O$. The mixture is refluxed for 2 hours and water is added. The solution is boiled to remove the butanol as an azeotrope with water. The remaining solution contains the acid $$H_2B_{12}H_8(OH)_4$$

A portion of the above solution is neutralized with ammonia hydroxide to obtain $(NH_4)_2B_{12}H_8(OH)_4$ in solution and an aqueous solution of CsF is added. The solution is concentrated to a small volume from which the cesium salt crystallizes on cooling. The compound, which is very water-soluble, is purified by recrystallization from water.

*Analysis.*—Calc'd for $Cs_2B_{12}H_8(OH)_4 \cdot 2H_2O$ (percent): B, 25.0; H, 3.16; Cs, 51.6. Found (percent): B, 25.0; H, 3.10; Cs, 55.8.

The infrared absorption spectrum of a Nujol mull of the compound shows the following principal bands (expressed as cm.$^{-1}$): 3580, strong; 3330, medium; 1630, medium; 1015, very strong, broad; 1025, very strong; 985, weak; 882, strong; and 740–725, very strong, broad.

A portion of the above solution is neutralized with ammonium hydroxide and there is then added an aqueous solution of $(CH_3)_4NCl$ to obtain the tetramethylammonium salt of $B_{12}H_8(OH)_4^{-2}$. The compound is recrystallized from water.

*Analysis.*—Calc'd for $[(CH_3)_4N]_2B_{12}H_8(OH)_4$ (percent): B, 36.7; H, 10.3; C, 27.1; N, 7.92. Found (percent): B, 37.8; H, 10.5; C, 27.1; N, 8.90.

The infrared absorption spectrum of a Nujol mull of the compound shows the following principal bands, expressed as cm.$^{-1}$: 3330, medium 1140, medium; 1070, weak; 1050, weak; 1025, strong; 980, medium; 950, strong; 900, weak; and 725, strong, broad.

(K) Compounds bearing —OH substituents are also obtained by heating a hydrate of $H_2B_{12}H_{12}$ with $SO_2$. Thus, a mixture consisting of 20 g. of crystalline hydrated $H_2B_{12}H_{12}$ and 50 g. of sulfur dioxide is heated in a stainless steel pressure vessel with agitation under autogenous pressure at 60° C. for 5 hours. The vessel is cooled and vented to remove unreacted sulfur dioxide. The process is repeated three more times and the four crude reaction products are combined. The mixture is neutralized with $(CH_3)_4NOH$ and the precipitate which forms is separated, washed and dried to obtain 43 g. of

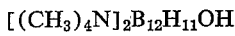

$[(CH_3)_4N]_2B_{12}H_{11}OH$

The compound is further purified by recrystallization from water. Its infrared spectrum shows absorption bands at 2.8, 4.0, 7.8, 8.8, 9.2, 9.5, 9.7, 10.55, 11.1, 12.5, and 13.9$\mu$.

(L) A solution is prepared which consists of 1.8 g. of $H_2B_{12}H_{12}$ (calculated on an anhydrous basis from hydrated $H_2B_{12}H_{12}$) in 110 ml. of water. To this solution at room temperature (ca. 25° C.) 30.8 ml. of 30% aqueous $H_2O_2$ is added with stirring. The mixture is allowed to stand at room temperature for 4 days and the solution is then evaporated to dryness under reduced pressure at about 25° C. in a rotating evaporation unit. This operation is conducted behind suitable protective shielding. The residue is dried 18 hours over $P_2O_5$ and there is obtained 3.08 g. of $H_2B_{12}H_6(OH)_6$. Titration of an aqueous solution of this acid shows that it is a strong acid, i.e., an acid in the class of strong mineral acids. The infrared absorption spectrum of the acid in a mineral oil mull show the following absorption bands: 2.8, 4.0, 9.0, and 10.6$\mu$.

*Analysis.*—Calc'd for $H_2B_{12}H_6(OH)_6$ (percent): B, 54.2; H, 5.83 (N.E., 120). Found (percent): B, 54.8; H, 6.14 (N.E., 125).

(M) An aqueous solution of the acid of part L is mixed with thallium carbonate and the precipitate which forms is separated. It is recrystallized from water, washed and dried to obtain the diethallium salt.

*Analysis.*—Calc'd for $Tl_2B_{12}H_6(OH)_6$ (percent): Tl, 63.2; B, 20.0; H, 1.85. Found (percent): Tl, 62.1; B, 19.5; H, 2.23.

(N) An aqueous solution of the acid of Part L is reacted with CsF to obtain a salt which is very soluble in water. The product is a hydrated double salt of $Cs_2B_{12}H_6(OH)_6$ and CsF whose infrared absorption spectrum shows the following bands: 4.1, 6.1, 8.8, 10.25, and 11.35$\mu$.

*Analysis.*—Calc'd for $Cs_2B_{12}H_6(OH)_6 \cdot CsF \cdot 4H_2O$ (percent): Cs, 54.8; B, 17.86; H, 2.75. Found (percent): Cs, 55.2; B, 17.41; H, 2.45.

(O) Irradiation equipment employed in this process consists of a quartz tube (about 3 cm. x 30 cm.) surrounded by a mercury vapor coil. The tube is charged with 60 ml. of an aqueous solution (0.1035 molar) of $H_2B_{12}Cl_{12}$. The solution is irradiated for 24 hours and the blue suspension which forms is filtered. The solids are set aside and the filtrate is irradiated again for 68 hours. The suspension is filtered and the solids from both filtrations are combined to obtain 1.45 g. of hydrated $H_2B_{12}(OH)_{12}$ containing some unreacted $H_2B_{12}Cl_{12}$. In the operation of the process, 90 ml. of hydrogen is evolved and substantially all of the chlorine is recovered as chloride ion (AgCl) in the filtrate.

The above process is repeated employing 100 ml. of a 0.1035 molar solution of $H_2B_{12}Cl_{12}$. There is obtained 3.19 g. of hydrated $H_2B_{12}(OH)_{12}$ containing some unreacted starting compound.

The product, as isolated in several runs, ranged in color from white to blue. The product is insoluble in water and conventional organic solvents. It is washed repeatedly with water and ethanol and dried under reduced pressure over $P_2O_5$. The product is hydrated $H_2B_{12}(OH)_{12}$, also written as $(H_3O)_2B_{12}(OH)_{12}$, containing a minor quantity of product which vears chlorine bonded to boron. The composition of the product can be represented as $(H_3O)_2B_{12}(OH)_{11.3}Cl_{0.7}$.

*Analysis.*—Calc'd for the above mixture (percent): B, 33.7; Cl, 6.47; H, 4.49; O, 55.2. Found (percent): B, 33.6, 33.7; Cl, 6.36, 6.49; H, 4.82, 4.78; O, 51.1.

The acid is insoluble in concentrated sulfuric acid at 25° C. but it dissolves on warming the acid to 90° C. On cooling the sulfuric acid solution, no precipitation occurs. The product in sulfuric acid solution is a compound bearing —OH and —OSO$_3$H groups, i.e., it can be represented as $H_2B_{12}(OH)_n(OSO_3H)_{12-n}$ where $n$ has a value of 1-12.

The free acid, dihydrogen dodechaydroxydodecaborate, which is usually obtained in hydrated form, is a white solid that is unchanged by heating up to 310° C. The acid is substantially insoluble in water, methanol, ethanol and other lower alkanols, dimethylformamide, dimethylsulfone, benzene, 1,2-dimethoxyethane, acetic acid and pyridine. It dissolves in basic solvents upon the addition of water and it also dissolves in dilute solutions of inorganic bases. Although substantially insoluble in water, sufficient acid does dissolve to give a strongly acid reaction to the water, as determined by pH test papers.

(P) A solution of 5.0 g. of $Cs_2B_{12}Br_{12}$ in 200 ml. of water is irradiated for 20 hours in the unit described in Part O. The solid is separated by filtration to obtain 0.764 g. of $(H_3O)_2B_{12}(OH)_{12}$. The product is suspended in water and aqueous CsOH solution is added until the solution is neutral. The acid dissolved during this step in the process. The solution is concentrated by evaporation until crystals of $Cs_2B_{12}(OH)_{12}$ appear. The solid crystals are separated and recrystallized twice from water. Some $Cs_2B_{12}Br_{12}$ is present as an impurity.

*Analysis.*—Calc'd for $Cs_2B_{12}(OH)_{12}$ (percent): Cs, 44.3; B, 21.7; H, 2.00. Found (percent): Cs, 38.2; B, 20.36; H, 2.21; Br, 3.75.

The process of Part P is repeated employing 10 g. of $Cs_2B_{12}Br_{12}$ in 200 ml. of water and 1.36 g. of product is isolated. The products obtained in these runs are combined to obtain 20 g. of $Cs_2B_{12}(OH)_{12}$. The combined product is purified by dissolving it in water and irradiating the solution for 4 hours. The amount of bromine present in the compound is substantially reduced to obtain a product of the following analysis: Cs, 40.9; B, 20.4; H, 3.16; Br, 0.62.

(Q) Salts of the $B_{12}(OH)_{12}^{-2}$ anion are obtained by neutralization of the acid obtained in Part P, employing the appropriate base and an aqueous suspension of the acid. The ammonium, methylammonium, and tert-butylammonium salts are prepared by this method. The ammonium salt is purified by crystallization from water, the methylammonium and tert-butylammonium salts by crystalization from aqueous ethanol.

*Analysis.*—Calc'd for $(NH_4)_2B_{12}(OH)_{12}$ (percent): H, 5.41; B, 35.1; N, 7.58; O, 51.9. Found (percent): H, 5.80; B, 34.5; N, 6.58; O, 46.2.

*Analysis.*—Calc'd for $(CH_3NH_3)_2B_{12}(OH)_{12}$ (percent): H, 6.04; B, 32.7; N, 7.04; O, 48.2; C, 6.04. Found (percent): H, 6.54; B, 32.7; N, 6.04; O, 35.5; C, 5.86.

*Analysis.*—Calc'd for $[(CH_3)_3CNH_3]_2B_{12}(OH)_{12}$ (percent): H, 7.48; B, 27.0; N, 5.83; O, 39.9; C, 20.0. Found (percent): H, 7.79; B, 27.6; N, 5.96; O, 31.1; C, 19.6.

The cesium, ammonium and tert-butylammonium salts are moderately soluble in water. The cesium salt turns yellow at surfaces exposed to light.

Neutralization of an aquous suspensions of

$H_2B_{12}(OH)_{12}$ with $(CH_3)_4NOH$ yields $[(CH_3)_4N]_2B_{12}(OH)_{12}$. The salt is very soluble in water and it is not readily isolated in solid form.

Example 8 illustrates the compounds of the invention in which X is hydroxyl and methods for their preparation. The processes of Example 8 are generic to the preparation of hydroxyl-bearing dodecaborates and these processes are operable with reactants bearing substituents other than hydroxyl. To illustrate, compounds can be obtained of the formulas $BaB_{12}H_{10}(OCH_3)(OH)$, $CuB_{12}H_9(C_6H_{11})(OH)_2$, $K_2B_{12}H_8[C(CH_3)_3](OH)_3$, and the like by employing as reactants dodecaborates having as substituents $-OCH_3$, $-C_6H_{13}$ and $-C(CH_3)_3$, respectively.

EXAMPLE 9

A reaction vessel is charged with 2.0 g. of $$[(CH_3)_4N]_2B_{12}H_{10}(OH)_2$$

prepared as described in Example 8, Part G, and 10 ml. of glacial formic acid. The mixture is heated at 90–100° C. for 3 minutes and it is then poured into water. The solution is filtered and the filtrate is mixed with an aqueous solution of $(n-C_3H_7)_4NI$. The precipitate which forms is separated and it is recrystallized from 50% aqueous ethyl alcohol. The product is bis(tetra-n-propylammonium) diformyloxydecahydrododecaborate(2−).

*Analysis.*—Calc'd for $[(C_3H_7)_4N]_2B_{12}H_{10}(O_2CH)_2$ (percent): B, 21.6; C, 51.8; H, 11.4; N, 4.6. Found (percent: B, 21.6; C, 49.6; H, 11.1; N, 4.56.

(B) A reaction vessel is charged with 25 ml. of formic acid (98–100% purity) and 0.63 g. of $Cs_2B_{12}F_{11}OH$. The solid dissolves and the solution is heated at steam bath temperatures for 15 minutes. It is then allowed to stand at atmospheric temperature (ca. 25° C.) for about 18 hours. The reaction mixture is evaporated in a Rinco rotary drier under reduced presure at 60° C. or less. There is obtained 0.67 g. of dicesium formyloxyundecafluorododecaborate(2−), i.e., $Cs_2B_{12}F_{11}OC(O)H$. The infrared spectrum of the compound contains bands as follows (expressed as microns): 5.8 (strong), 10.22 (weak), 12.0 (weak), and 15.45 (moderately strong).

(C) A small platinum tube is charged with 1 g. of $Cs_2B_{12}F_{11}OH$ and the vessel and contents are cooled in liquid nitrogen. Pressure in the tube is reduced to a low value and 1.0 g. of carbonyl fluoride ($COF_2$) is added. The tube is sealed, placed in a pressure reactor and heated under 400 atmospheres pressure at 150° C. for 16 hours. It is cooled, opened and allowed to warm to atmospheric temperature. Unreacted $COF_2$ escapes during this stage of the processing. A white solid, weighing 1.07 g., remains which is dicesium fluoroformyloxyundecafluorododecaborate(2−), i.e., $Cs_2B_{12}F_{11}OC(O)F$. The infrared spectrum of the compound displays very strong bands at 5.5 (=O) and 10.3μ [—C(O)F].

The compound hydrolyzes readily in water, releasing $CO_2$.

EXAMPLE 10

A solution consisting of 5 g. of hydrated $H_2B_{12}H_{12}$ and 25 ml. of glacial acetic acid is stirred for 3 hours at about 25° C. It is then heated for 24 hours at steam bath temperatures (90–100° C.) The solution is cooled and it is mixed with an aqueous 50% solution of CsF. The precipitate which forms is separated by filtration and it is recrystallized from water to obtain 6.4 g. of dicesium monoacetoxyundecahydrododecaborate(2−), i.e., $$Cs_2B_{12}H_{11}(O_2CCH_3)$$

Examples 9 and 10 illustrate the compounds of the invention in which X is an ester group, i.e., —OC(O)R. Two generic processes are exemplified which are as follows: (1) reaction of hydroxyl-substituted dodecaborates with anhydrous organic acids or their equivalents (acid anhydrides and acid halides), and (2) reaction of polyhydrododecaborates with an anhydrous organic acid. In either process any organic acid can be employed. For example, $H_2B_{12}H_9(OH)_3$ can be reacted with butyric acid to yield $H_2B_{12}H_9(O_2CC_3H_7)_3$; $H_2B_{12}H_{11}OH$ can be reacted with methacrylic acid to yield $$H_2B_{12}H_{11}O_2C-C(CH_3)=CH_2$$

$H_2B_{12}H_{10}(OH)_2$ can be reacted with benzoyl chloride to yield $H_2B_{12}H_{10}(O_2CC_6H_5)_2$; $H_2B_{12}H_{10}(OH)_2$ can be reacted with octadecanoyl chloride to yield $$H_2B_{12}H_{10}(O_2CC_{17}H_{35})_2$$

$H_2B_{12}H_{10}(OH)_2$ can be reacted with propiolic acid to yield $H_2B_{12}H_{10}(O_2CC_2H)_2$. Similarly, $H_2B_{12}H_{12}$ can be reacted with propionic acid to yield $H_2B_{12}H_{11}(O_2CC_2H_5)$, with hexahydrobenzoic acid to yield $$H_2B_{12}H_{11}(O_2CC_6H_{11})$$

and with dodecanoic acid to yield $H_2B_{12}H_{11}(O_2CC_{11}H_{23})$.

In the processes of Examples 9 and 10, dodecaborates can be employed as reactants which bear not only —OH groups but other substituent groups as well. To illustrate, $H_2B_{12}H_{10}(C_2H_4C_6H_5)OH$ can be reacted with propionic acid to yield $H_2B_{12}H_{10}(C_2H_4C_6H_5)(O_2CCH_2CH_3)$; $H_2B_{12}Cl_8(OH)_4$ can be reacted with acetic acid to yield $H_2B_{12}Cl_8(O_2CCH_3)_4$; $H_2B_{12}H_8(OCH_3)_2(OH)_2$ can be reacted with formic acid to yield $$H_2B_{12}H_8(OCH_3)_2(O_2CH)_2$$

and $H_2B_{12}Br_9(OH)_3$ can be reacted with trifluoroacetic acid to yield $H_2B_{12}Br_9(O_2CCF_3)_3$. Further, $$H_2B_{12}H_{11}C(CH_3)_3$$

can be reacted with formic acid to yield $$H_2B_{12}H_{10}[C(CH_3)_3](O_2CH)$$

$H_2B_{12}H_{10}(SO_2C_6H_5)_2$ can be reacted with acetic acid to yield $H_2B_{12}H_9(SO_2C_6H_5)_2(O_2CCH_3)$, and the like.

The dodecaborate acids can be neutralized with organic and inorganic bases to yield a wide range of salts and the compounds are usually isolated in this manner, as illustrated in the examples.

EXAMPLE 11

(A) A solution of 7.5 g. of $Na_2B_{12}H_{12}\cdot H_2O$ in 50 ml. of water is passed through a column packed with an acid ion-exchange resin, as described in Example C. The acidic eluate and washings are collected and heated under reduced pressure until the volume is about 50 ml. The solution contains the acid $H_2B_{12}H_{12}$.

The acid solution obtained above is mixed with 10 ml. of 37% formaldehyde solution. The mixture becomes slightly warm but no color change occurs. The mixture is heated on a steam bath for about 1 hour and the solution becomes pink in color. The solution is cooled and it is evaporated under reduced pressure to yield a faintly pink tacky solid.

The solid obtained above is mixed with a solution of 5.0 g. of $NaHCO_3$ in about 25 ml. of hot water. The solution is cooled and filtered. An aqueous solution of cesium fluoride is added with stirring to the filtrate to form a white precipitate. The precipitate is separated and dried. Elemental analysis of the compound shows that it has the formula $Cs_2B_{12}H_{11}X$, where X consists of one oxygen, one carbon and three hydrogens. The infrared absorption spectrum shows that X is —$OCH_3$ and that the compound is, therefore, $Cs_2B_{12}H_{11}OCH_3$.

*Analysis.*—Calc'd for $Cs_2CH_{14}B_{12}O$ (percent): C, 2.74; H, 3.22. Found (percent): C, 3.16; H, 2.20.

(B) Crystalline hydrated $H_2B_{12}H_{12}$ (5.0 g.) is added slowly to 15 ml. of 37% formaldehyde with stirring and cooling to keep the temperature at about 25° C. The solution is stirred for a few minutes after addition of the acid is completed and 10 ml. of aqueous 50% CsF solution is added. The precipitate which forms is separated by filtration and it is recrystallized from hot water to obtain $Cs_2B_{12}H_{11}OCH_3$.

*Analysis.*—Calc'd for $Cs_2CH_{14}B_{12}O$ (percent): Cs, 60.6; B, 29.7; C, 2.74; H, 3.22. Found (percent): Cs, 55.3; B, 26.4; C, 2.6; H, 3.1.

(C) A portion (5 g.) of the crystalline hydrate of $H_2B_{12}H_{12}$ is dissolved in 25 ml. of 99% formic acid. The solution is heated on a steam bath for 3 hours, cooled and an aqueous 50% solution of CsF is added. The precipitate is processed as described in Part B to obtain 3.4 g. of $Cs_2B_{12}H_{11}OCH_3$.

(D) A mixture of 2.0 g. of the crystalline hydrate of $H_2B_{12}H_{12}$ (N.E., 174) and 10 ml. of $CH_3OH$ is heated in a pressure vessel under autogenous pressure for 15 hours at steam bath temperatures. Volatile products formed in the reaction consist of $H_2$ and $CH_4$. The liquid reaction product is mixed with aqueous 50% CsF solution and the precipitate is processed as described in Part B to obtain the methoxy-substituted compound.

*Analysis.*—Calc'd for $Cs_2B_{12}H_{11}OCH_3$ (percent): B, 29.6; C, 2.7; H, 3.2. Found (percent): B, 25.6; C, 3.1; H, 3.1.

(E) A mixture of 20 g. of $CH_3OCH_3$ and 12 g. of the crystalline hydrate of $H_2B_{12}H_{12}$ is heated in a pressure vessel under autogenous pressure at 90° C. for 2 hours. The reaction mixture is divided into two equal parts.

To one part an aqueous solution of CsOH is added until the mixture is neutral. The precipitate is processed as described in Part B to obtain a crystalline product which is a compound of about 40% $Cs_2B_{12}H_{11}OCH_3$ and 60% $Cs_2B_{12}H_{10}(OCH_3)_2$.

*Analysis.*—Calc'd for above product (percent): Cs, 59.0; B, 28.8; C, 3.7; H, 3.3. Found (percent): Cs, 56.9; B, 29.0; C, 3.6; H, 3.6.

To the second part, aqueous $(CH_3)_4NOH$ is added until the solution is neutral and the precipitate is processed as described in Part B to obtain a crystalline product which is about 40% $[(CH_3)_4N]_2B_{12}H_{11}OCH_3$ and 60%

$[(CH_3)_4N]_2B_{12}H_{10}(OCH_3)_2$

*Analysis.*—Calc'd for above product (percent): C, 25.1; H, 10.7; N, 5.4. Found (percent): C, 25.6; H, 11.0; N, 5.4.

(F) A mixture of 50 g. of $CH_3OCH_3$ and 15 g. of the crystalline hydrate of $H_2B_{12}H_{12}$ is heated in a pressure vessel under autogenous pressure at 110° C. for 1 hour. The reaction mixture is neutralized with aqueous CsOH solution and the precipitate is processed as described in Part B to obtain a dodecaborate bearing two methoxy groups.

*Analysis.*—Calc'd for $Cs_2B_{12}H_{10}(OCH_3)_2$ (percent): B, 27.7; C, 5.1; H, 3.4. Found (percent): B, 27.1; C, 4.8; H, 3.5.

EXAMPLE 12

(A) A mixture of 5 g. of the crystalline hydrate of $H_2B_{12}H_{12}$ and 25 ml. of $C_2H_5OC_2H_5$ is heated in a pressure vessel under autogenous pressure at 60° C. for 10 hours. The reaction mixture, so obtained, is stirred with 10 ml. of aqueous 50% CsF solution. The crystalline Cs salt (1.9 g.) which precipitates is processed as described in Example 11, Part B to obtain cesium hydrogen ethoxyundecahydrododecaborate(2−) with one mole of ethanol as solvent of crystallization.

*Analysis.*—Calc'd for $CsHB_{12}H_{11}OC_2H_5 \cdot C_2H_5OH$ (percent): Cs, 32.6; B, 35.5; C, 13.2. Found (percent): Cs, 39.6; B, 36.8; C, 13.2.

(B) A mixture of 5 g. of the crystalline hydrate of $H_2B_{12}H_{12}$ and 25 ml. of ethanol is heated in a pressure vessel under autogenous pressure for 4 hours at 100° C. Volatile products formed in the reaction contain 83 ml. of hydrogen and 160 ml. of ethane. The non-volatile reaction product is neutralized with aqueous NaOH solution following which an aqueous solution of CsF is added. The precipitate is processed as described in Example 11, Part B, to obtain $Cs_2B_{12}H_{11}OC_2H_5$. The identity of the compound is confirmed by its infrared absorption spectrum.

(C) Acetaldehyde (25 ml.) is cooled in an ice bath and 5 g. of crystalline hydrated $H_2B_{12}H_{12}$ is slowly added with stirring. After addition is completed, the solution is stirred a short period and 10 ml. of 50% aqueous CsF is added. The precipitate is processed as described earlier to obtain the monoethoxy derivative.

*Analysis.*—Calc'd for $Cs_2B_{12}H_{11}OC_2H_5$ (percent): Cs, 58.7; B, 28.7; C, 5.3; H, 3.5. Found (percent): Cs, 55.2; B, 23.9; C, 5.3; H, 3.5.

(D) A solution of 10 g. of crystalline hydrated $H_2B_{12}H_{12}$ (N.E., 222) in 20 ml. of glacial acetic acid is heated for 15 hours at steam bath temperatures. Excess acid is removed in a rotary evaporator and the syrupy residue is diluted with 25 ml. of water. The solution is neutralized with aqueous 50% sodium hydroxide and 30 ml. of aqueous 50% CsF is added. The precipitate is separated and crystallized repeatedly to obtain $Cs_2B_{12}H_{11}OC_2H_5$ A second product isolated from the reaction mixture is $Cs_2B_{12}H_{11}OH$.

(E) Acetaldehyde (25 ml.) is cooled in an ice bath and 5 g. of crystalline hydrated $H_2B_{12}H_{12}$ is added with stirring. An exothermic reaction sets in and subsides in a short time. Aqueous 50% CsF solution (10 ml.) is added to the mixture and the precipitate which forms is processed as described in Example 11 Part B to obtain the diethoxy-substituted derivative.

*Analysis.*—Calc'd for $Cs_2B_{12}H_{10}(OC_2H_5)_2$ (percent): Cs, 53.5; B, 26.2; C, 9.7; H, 4.0. Found (percent): Cs, 49.1; B, 29.3; C, 8.1; H, 4.4.

EXAMPLE 13

(A) A mixture of 2.0 g. of crystalline hydrated $H_2B_{12}H_{12}$ (N.E., 174) and 10 ml. of n-propyl alcohol is heated in a pressure vessel under autogenous pressure at steam bath temperature (90–100° C.) for 15 hours. The vessel is cooled to about −196° C. and it is opened. Volatile products which are collected are hydrogen and, by warming to 0° C., propane. The liquid residue is mixed with aqueous 50% CsF solution and the $Cs_2B_{12}H_{11}OCH_2CH_2CH_3$ (3.7 g.) which precipitates is purified by processes described earlier.

*Analysis.*—Calc'd for $Cs_2B_{12}H_{11}OC_3H_7$ (percent): B, 27.8; C, 7.7; H, 3.9. Found (percent): B, 27.5; C, 7.8; H, 4.1.

(B) A solution of 28 g. of crystalline hydrated $H_2B_{12}H_{12}$ (N.E., 160) in 100 ml. of isopropyl alcohol is allowed to stand 18–20 hours at about 25° C. The solution is then refluxed at steam bath temperature for about 100 hours. It is neutralized with 50% aqueous NaOH solution and 60 g. of aqueous 50% CsF solution is added. The precipitate is separated and crystallized from water to yield 33.6 g. of $Cs_2B_{12}H_{11}OCH(CH_3)_2$. The infrared absorption spectrum of the compounds shows a broad peak with three fingers at 8.55, 8.70, and 8.95µ, a large peak at 9.6µ with a shoulder at 9.4µ, small peaks at 10.5 and 11.1µ and a very small peak at 12µ.

*Analysis.*—Calc'd for $Cs_2B_{12}H_{11}OCH(CH_3)_2$ (percent): Cs, 57.0; B, 27.8; C, 7.7; H, 3.9. Found (percent): Cs, 55.4; B, 29.0; C, 7.1; H, 3.6.

The reaction is repeated employing 26.4 g. of hydrated $H_2B_{12}H_{12}$ (N.E., 163) and 100 ml. of isopropyl alcohol. The mixture is refluxed 98 hours, neutralized with 50% NaOH solution, evaporated and mixed with a solution of 40 g. of $(CH_3)_4NCl$ in 20 ml. of water. The precipitate is separated and dried at 100° C. in vacuo to yield 44 g. of the bis(tetramethylammonium) salt.

*Analysis.*—Calc'd for $[(CH_3)_4N]_2B_{12}H_{11}OCH(CH_3)_2$ (percent): B, 37.3; C, 38.0; H, 12.1; N, 8.0. Found (percent): B, 37.8; C, 32.6; H, 11.3; N, 6.6.

(C) A mixture consisting of 11 g. of di(tertbutly)peroxide and 2 g. of $Na_2B_{12}H_{12} \cdot 2H_2O$ is heated in an oil bath at 105° C. for 18 hours. The disodium salt does not dissolve appreciably in the liquid. The reaction mixture is dissolved in water and aqueous 50% CsF solution is added. The precipitate is separated, washed and redissolved in water from which it is again crystallized. These crystals are $Cs_2B_{12}H_{12}$. The mother liquor from this crystallization is concentrated and more crystals separate. These crystals, obtained in low yield, are $$Cs_2B_{12}H_{11}OC(CH_3)_3$$

The infrared spectrum of this compound shows strong absorption in the 8.5–8.9μ wavelengths.

*Analysis.*—Calc'd for $Cs_2B_{12}H_{11}OC(CH_3)_3$ (percent): C, 10.0; H, 4.2. Found (percent): C, 9.'2; H, 4.5.

(D) A pressure vessel is charged with 2 g. of a hydrate of $H_2B_{12}H_{12}$ (N.E., 174) and 10 ml. of 2,2,2-trifluoroethanol. The mixture is heated under autogenous pressure for 15 hours at 100° C. The reaction mixture is processed as described in Part B to obtain 3.4 g. of dicesium (2,2,2-trifluoroethoxy)undecahydrododecaborate(2−). The compound is recrystallized from solution in 3.3 ml. of hot water to obtain 2.0 g. of pure product. The identity of the compound is confirmed by its infrared absorption spectrum. It has the formula $Cs_2B_{12}H_{11}OCH_2CF_3$.

(E) The reaction described in Part D is repeated employing 2 g. of the hydrate of $H_2B_{12}H_{12}$ and 10 ml. of 2H-hexafluoropropanol-2. There is obtained 2.2 g. of dicesium 2H - hexafluoroisopropoxyundecahydrododecaborate(2−). The compound is crystallized from water and it has the formula $Cs_2B_{12}H_{11}OCH(CF_3)_2$.

EXAMPLE 14

(A) A mixture of 2.0 g. of hydrated $H_2B_{12}H_{12}$ (N.E., 174) and 10 ml. of n-$C_4H_9OH$ is heated in a pressure vessel under autogenous pressure at steam bath temperature for 15 hours. The vessel is cooled to −196° C. and opened. Volatile products obtained are hydrogen and, on warming to 0° C., n-butane. The liquid residue is mixed with 5 ml. of aqueous 50% CsF solution and the precipitate which forms is processed as described in previous examples to obtain 3.6 g. of $Cs_2B_{12}H_{11}X$, where X is —$OCH_2CH_2CH_2CH_3$.

*Analysis.*—Calc'd for $Cs_2B_{12}H_{11}OC_4H_9$ (percent): B, 27.1; C, 10.0; H, 4.2. Found: B, 26.9; C, 9.8; H, 4.3.

(B) A mixture of 210 g. of hydrated $H_2B_{12}H_{12}$ (N.E., 174) and 10 ml. of (n-$C_4H_9)_2O$ is heated and processed as described in Part A. The product obtained is $Cs_2B_{12}H_{11}OC_4H_9$ with $Cs_2B_{12}H_{11}OH$ as a by-product.

EXAMPLE 15

(A) A portion (5 g.) of crystalline hydrated $H_2B_{12}H_{12}$ is added slowly to 15 ml. of diethyl ketone. The temperature of the reaction mixture is maintained at 20–25° C. during this step. When addition is complete, the mixture is stirred and 10 ml. of aqueous CsF solution is added. The precipitate is separated and purified as described earlier to obtain 4.7 g. of the compound $Cs_2B_{12}H_{11}X$, where X is —$OCH(C_2H_5)_2$.

*Analysis.*—Calc'd for $Cs_2B_{12}H_{11}OC_5H_{11}$ (percent): Cs, 53.8; B, 26.3; H, 4.5. Found (percent): Cs, 57.2; B, 27.1; H, 3.9.

(B) The procedure of Part A is repeated employing 5 g. of crystalline hydrated $H_2B_{12}H_{12}$ and 15 ml. of cyclohexanone. The product obtained consists of 4.9 g. of dicesium cyclohexyloxyundecahydrododecaborate(2−).

*Analysis.*—Calc'd for $Cs_2B_{12}H_{11}OC_6H_{11}$ (percent): Cs, 52.5; B, 25.6; H, 4.3. Found (percent): Cs, 54.3; B, 24.5; H, 3.8.

EXAMPLE 16

(A) Crystalline hydrated $H_2B_{12}H_{12}$ (10.0 g.) and 150 ml. of 1,2-dimethoxyethane are stirred to form a solution. Ethyl acetoacetate (7.23 g.) is added to the solution and the mixture is stirred for 17 hours at about 25° C. The solution is evaporated and the oil which remains is dissolved in 50 ml. of water. The solution is made basic with 20 g. of $(CH_3)_4NOH$ and the solution is poured into a large excess of ethyl alcohol. The alcohol solution is evaporated to dryness and the remaining white solid is crystallized from a 20:1 mixture of $CH_3OH$ and water. The product is $[(CH_3)_4N]_2B_{12}H_{11}OCH_2CH_2OCH_3$. Reaction in the process occurs between $H_2B_{12}H_{12}$ and 1,2-dimethoxyethane.

The infrared spectrum of the compound shows absorption at the following characteristic wavelengths (expressed as microns): 4.1, very strong; 6.8, strong; 7.1, shoulder; 7.4, shoulder; 7.8, medium; 8.1, weak; 8.5, shoulder; 8.65, shoulder; 9.0, strong; 9.35, strong; 9.6, shoulder; 9.8, strong; 10.55, strong; 10.8, shoulder; 11.5, weak; 11.6 weak; 11.8, weak; 13.4, very weak; 13.9, strong.

*Analysis.*—Calc'd for $$[(CH_3)_4N]_2B_{12}H_{11}OCH_2CH_2OCH_3$$

percent: B, 35.64; N, 7.69; C, 36.26; H, 11.62. Found (percent): B, 36.61; N, 7.48, 7.64; C, 35.85; H, 11.57, 11.81.

(B) A solution consisting of 6.34 g. of hydrated $H_2B_{12}H_{12}$ in 100 ml. of 1,2-dimethoxyethane is stirred at about 25° C. for 96 hours and at 80° C. for 12 hours. The clear solution is evaporated to dryness in a rotary evaporator, the residue is dissolved in 50 ml. of water and 9.0 g. of CsF is added to the solution. The precipitate which forms is crystallized from aqueous ethanol to obtain dicesium bis(2-methoxyethoxy)decahydrododecaborate(2−) as a white solid.

The infrared spectrum of the compound shows absorption at the following characteristic wavelengths (expressed as microns): 2.8, weak; 4.1, very strong; 6.2, weak; 7.2, very weak; 7.4, medium; 7.5, very weak; 7.85, weak; 8.1, weak; 8.35, shoulder; 8.5, shoulder; 8.65, strong; 9.0, strong; 9.4, strong; 9.75, strong; 10.05, medium; 10.8, weak; 11.3, weak; 11.65, weak; 11.9, weak; 13.7, broad.

*Analysis.*—Calc'd for $Cs_2B_{12}H_{10}(OCH_2CH_2OCH_3)_2$ (percent): Cs, 46.32; B, 22.62; C, 12.56; H, 4.57. Found (percent): Cs, 45.20; B, 22.77; C, 12.96; H, 4.59.

(C) A mixture consisting of 10 g. of hydrated crystalline $(H_3O)_2B_{12}H_{12}$ and 40 ml. of $HOCH_2CH_2Cl$ is heated at steam bath temperatures (90–100° C.) for 20 hours. The mixture is cooled and concentrated by evaporation (employing a Rinko unit). The residue is neutralized with aqueous cesium hydroxide solution and the cesium salt which precipitates is separated. It is recrystallized from water to obtain $Cs_2B_{12}H_{11}OCH_2CH_2Cl$.

*Analysis.*—Calc'd for $Cs_2B_{12}H_{11}OCH_2CH_2Cl$ (percent): Cl, 7.8; C, 4.9; H, 3.1. Found (percent): Cl, 8.1; C, 4.5; H, 3.1.

EXAMPLE 17

(A) A solution of 2.9 g. (0.013 mole) of $$Na_2B_{12}H_{12} \cdot 2H_2O$$

in 10 ml. of water is passed through a column filled with a commercial acid ion-exchange resin. The aqueous effluent, which is a solution of $H_2B_{12}H_{12}$, or written in the hydronium form $(H_3O)_2B_{12}H_{12}$, is evaporated under reduced pressure at less than 25° C. to obtain a solid residue. The residue is dissolved in 20 ml. of 1,2-dimethoxyethane (glyme), the solution is cooled in an ice bath, and a solution of 2.4 g. of epichlorohydrin (0.026 mole) is added to it dropwise. The solvent is then removed under reduced pressure and the residue is dissolved in ethanol. To this solution there is added a solution of 3.9 g. (0.026 mole) of CsF in 10 ml. of a 1:1 mixture of absolute ethanol and glyme. The precipitate which forms is separated, washed and dried to obtain a compound of Formula 1 bearing a chloropropyloxy and a methoxyethoxy substituent.

*Analysis.*—Calc'd for $$Cs_2B_{12}H_{10}(OCH_2CH_2CH_2Cl)(OCH_2CH_2OCH_3)$$

(percent): C, 12.5; H, 4.0; B, 22.7; Cl, 6.2. Found (percent): C, 11.27; H, 3.86; B, 20.67; Cl, 6.67.

(B) The procedure of Part A is repeated employing styrene oxide as the oxirane reactant. The product which is obtained is $Cs_2B_{12}H_{10}(OCH_2CH_2C_6H_5)_2$.

*Analysis.*—Calc'd for above compound (percent): C, 29.6; H, 4.5; B, 20.0. Found (percent): C, 27.22; H, 4.70; B, 18.49.

(C) The procedure of Part A is repeated employing dicyclopentadiene dioxide as the reactant. The product which is obtained is a tetracesium salt of the formula

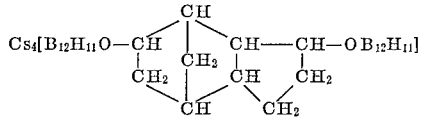

This compound can be viewed as a product of Formula 1 in which the X group carries a negative charge of −2 (inherent in the second $B_{12}H_{11}$ cage) and two of the four cesium ions are, therefore, part of the X group.

(D) Employing the process of Part A up to the addition of CsF, an oxirane of the formula

is reacted with $H_2B_{12}H_{12}$ to obtain

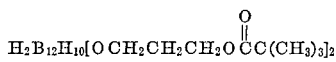

in solution. The compound is hydrolyzed in acid solution by conventional methods to obtain a solution of $$H_2B_{12}H_{10}[OCH_2CH_2CH_2OH]_2$$

This solution is mixed with an aqueous solution of CsF to obtain $Cs_2B_{12}H_{10}[OCH_2CH_2CH_2OH]_2$. The product is purified as described in Part A.

*Analysis.*—Calc'd for $Cs_2B_{12}H_{10}[OCH_2CH_2CH_2OH]_2$ (percent): C, 7.5; H, 3.7; B, 27.0. Found (percent): C, 9.05; H, 3.79; B, 22.87.

(E) A solution of 22.4 g. of $Na_2B_{12}H_{12}\cdot 2H_2O$ (0.1 mole) in 40 ml. of water is passed through a column filled with an acid ion-exchange resin. The effluent is evaporated under reduced pressure at 20° C. to obtain a hydrate of $H_2B_{12}H_{12}$ as a solid residue. The hydrated acid is dissolved in 60 ml. of glyme and 22.8 g. (0.2 mole) of 3,4-epoxy-4-methyl-2-pentanone is added dropwise and with stirring. The solvent (glyme) is evaporated from the reaction mixture under reduced pressure to obtain the solvated acid $$H_2B_{12}H_{10}[OC(CH_3)_2CH_2C(O)CH_3]_2$$

A solution of 30.4 g. (0.2 mole) of CsF in 30 ml. of ethanol is added to the residue and the precipitate which forms is separated and recrystallized from ethanol-water mixture to obtain a compound of the formula

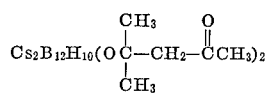

By employing the procedure of Example 17, hydrated $H_2B_{12}H_{12}$ is reacted with the oxiranes shown in Table I at the indicated temperature to obtain, as cesium salts, the products shown in the last column of the table:

TABLE I

| Oxirane | Temperature, °C. | Product |
|---|---|---|
| 3,4-epoxycyclohexane carbonitrile | <30 | $Cs_2B_{12}H_{10}\left[\begin{array}{c}O-CH\ CH_2\\H_2C\ CH_2\\CH\\CN\end{array}\right]_2$ |
| 3,4-epoxy-tetrahydrothiophene-1,1-dioxide | <30 | $Cs_2B_{12}H_{10}\left(\begin{array}{c}O-CH-CH_2\\H_2C\ CH_2\\SO_2\end{array}\right)_2$ |
| 1,2-epoxy-3-phenoxypropane | <30 | $Cs_2B_{12}H_{10}(OCH_2CH_2CH_2OC_6H_5)_2$ |
| Dipentene monoxide | <0 | $Cs_2B_{12}H_{10}\left[\begin{array}{c}CH_3\\CH\\-O-HC\ CH_2\\H_2C\ CH_2\\CH\\C\\H_3C\ CH_2\end{array}\right]_2$ |
| 1,2-epoxy-3-(4-chlorophenoxy)propane | <30 | $Cs_2B_{12}H_{10}(OCH_2CH_2CH_2OC_6H_4Cl)_2$ |
| 1,2-epoxy-3-methoxypropane | <30 | $Cs_2B_{12}H_{10}(OCH_2CH_2CH_2OCH_3)_2$ |
| Methyl phenylglycidate | <30 | $Cs_2B_{12}H_{10}(OCHCH_2C_6H_5)_2$ with $CO_2CH_3$ |
| $CH_3CH-CH_2$ (epoxide) | 30 | $Cs_2B_{12}H_{10}(OC_3H_7)_2$ |
| (hydroxy glycidate structure) | 30 | $Cs_2B_{12}H_{10}\left[-O-C\cdots CH-CH-CO_2C_2H_5\right]_2$ |
| $CH_3(CH_2)_9CH-CH_2$ (epoxide) | 55 | $Cs_2B_{12}H_{10}[O(CH_2)_{11}CH_3]_2$ |

Examples 11–17, inclusive, illustrate compounds of the invention in which X is an —OR group and their preparation. The processes which employ, as one reactant, an acid of a polyhydrododecaborate and, as a second reactant, a member of the group consisting of aldehydes, ketones, alcohols, ethers, and oxiranes, are generic to the preparation of compounds bearing —OR groups. Optionally, in the process for preparing compounds having —$OCH_3$ groups, formic acid can be used in place of formaldehyde. The generic process is illustrated further as follows: $H_2B_{12}H_{12}$ can be reacted with butyraldehyde to yield $H_2B_{12}H_{11}OC_4H_9$, with dioctyl ether to yield $H_2B_{12}H_{10}(OC_8H_{17})_2$, with 2,2'-dichlorodiethyl ether to yield $H_2B_{12}H_{11}OCH_2CH_2Cl$, and with 2-phenylethanol to yield $H_2B_{12}H_{11}OCH_2CH_2C_6H_5$. Dodecaborates which bear other substituents can be employed as reactants. To illustrate, $H_2B_{12}H_{10}(SO_2C_6H_5)_2$ can be reacted with diproply ether to yield $$H_2B_{12}H_8(OC_3H_7)_2(SO_2C_6H_5)_2$$

$H_2B_{12}H_{11}C_6H_{11}$ can be reacted with heptyl alcohol to yield $H_2B_{12}H_{10}(C_6H_{11})(OC_7H_{15})$, $H_2B_{12}H_{11}CH(CH_3)_2$ can be reacted with 1,2-dimethoxyethane to yield $$H_2B_{12}H_{10}CH(CH_3)_2(OCH_2CH_2OCH_3)$$

$H_2B_{12}H_{10}(SCH_3)_2$ can be reacted with diethyl ether to yield $H_2B_{12}H_8(SCH_3)_2(OC_2H_5)_2$; and $$H_2B_{12}H_4Cl_7CH(CH_3)_2$$

can be reacted with 1,2-diethoxyethane to yield $$H_2B_{12}H_3Cl_7[CH(CH_3)_2](OCH_2CH_2OC_2H_5)$$

The dodecaborate acids are customarily neutralized with bases and the compounds are isolated as salts.

EXAMPLE 18

(A) A mixture of 10 g. of crystalline hydrated $$H_2B_{12}H_{12}$$

and 20 g. of $CH_3SSCH_3$ is stirred at 25–35° C. until it becomes homogeneous (ca. 0.5 hour). It is then stirred an additional 18 hours at prevailing atmospheric temperature (ca. 25° C.). Methyl mercaptan is evolved in the process and the mercaptan is preferably collected in a cooled trap. The reaction mixture is neutralized with aqueous 10% NaOH solution and the resulting solution is steam distilled to remove the last portions of methyl mercaptan. The liquid is evaporated to a mushy solid which is mixed with aqueous 50% CsF solution. The precipitated material is crystallized repeatedly from water to form two main fractions which are $Cs_2B_{12}H_{11}SCH_3$ (referred to as Fraction 1) and $Cs_2B_{12}H_{10}(SCH_3)_2$ (referred to as Fraction 2).

The infrared spectrum of Fraction 1 shows characterizing absorption bands (wavelengths expressed as microns) at 4, 9.3, 10.2, 10.4, 11.5, 11.8, and 12.1. The infrared spectrum for Fraction 2 is similar although there are intensity differences. In perchlorobutadiene mulls, the infrared spectra of both fractions showed a characterizing band at 3.4μ (saturated C—H).

*Analysis.*—Calc'd for $Cs_2B_{12}H_{11}SCH_3$ (percent): C, 2.70; H, 3.1. Found (percent): C, 3.12; T, 3.60. Calc'd for $Cs_2B_{12}H_{10}(SCH_3)_2$ (percent): C, 4.80; H, 3.20; S, 12.8. Found (percent): C, 4.29; H, 3.36; S, 10.06.

(B) The reaction of Part A is repeated except that the mixture is heated 8 hours at 35° C. and it is then allowed to stand about 18 hours at atmospheric temperature with nitrogen gas bubbling through it. The mixture is processed as described in Part A. The disubstituted compound $$Cs_2B_{12}H_{10}(SCH_3)_2$$

which is more soluble than the monosubstituted compound, is obtained in larger amount. Analysis: C, 4.83; H, 3.65; S, 13.53; B, 25.20.

Example 18 illustrates the compounds of Formula 1 in which X is a —SR group. The process described is generic to the preparation of these compounds and it can be employed to prepare a wide range of compounds by use of the appropriate disulfide reactant. To illustrate, $H_2B_{12}H_{12}$ can be reacted with dibenzyl disulfide to yield $H_2B_{12}H_{10}(SCH_2C_6H_5)_2$, with dioctyl disulfide to yield $$H_2B_{12}H_{11}SC_8H_{17}$$

and with diallyl disulfide to yield $H_2B_{12}H_{10}(SC_3H_5)_2$. Substituted dodecaborates can be employed as reactants as described for other procedures. For example, dimethyl disulfide can be reacted with $H_2B_{12}H_{11}C_6H_{11}$ to yield $$H_2B_{12}H_9C_6H_{11}(SCR_3)_2$$

with $H_2B_{12}H_8F_4$ to obtain $H_2B_{12}H_7F_4(SCH_3)$, with $$H_2B_{12}H_6(C_{10}H_{21})_6$$

to yield $H_2B_{12}H_4(C_{10}H_{21})_6(SCH_3)_2$. Any disulfide can be employed in the process and dimethyl disulfide is used above solely by way of illustration. The dodecaborate acids are customarily converted to salts, as described earlier.

EXAMPLE 19

(A) A reaction vessel is charged with a mixture of 18 g. of the crystalline hydrate of $H_2B_{12}H_{12}$ and 12 g. of benzenesulfonyl chloride. Nitrogen is bubbled through the mixture to provide agitation. Within a few minutes an exothermic reaction sets in and the mixture forms a uniformly soft solid. The reaction mixture is neutralized with an aqueous solution of CsOH and the precipitate which forms is separated. The precipitate is boiled with water and the mixture of solid and liquid is filtered. The filtrate is cooled and the crystals which form are collected. The crystals are a mixture of about 30% of $$Cs_2B_{12}H_{11}SO_2C_6H_5$$

and 70% of $Cs_2B_{12}H_{10}(SO_2C_6H_5)_2$. The infrared absorption spectrum of a Nujol mull of the product shows the following characteristic bands (expressed as microns): 4.0, 6.3, 7.6, 8.5, 8.9, 9.3, 9.7, 9.9, 10.4, 12.6, and 13.7.

*Analysis.*—Calc'd for the above mixture (percent): C, 15.90; H, 2.90; S, 7.05. Found (percent): C, 15.56; H, 3.53; S, 7.01.

(B) A mixture consisting of 20 g. of benzenesulfonyl chloride and 10 g. of hydrated crystalline $(H_3O)_2B_{12}H_{12}$ is stirred at 35° C. for 24 hours in a current of nitrogen. The reaction mixture is processed as described in Part A and the product, which is recrystallized three or four times from water, is substantially pure $Cs_2B_{12}H_{11}SO_2C_6H_5$.

*Analysis.*—Calc'd for $Cs_2B_{12}H_{11}SO_2C_6H_5$ (percent): S, 5.8; C, 13.1; H, 2.9; B, 23.6. Found (percent): S, 5.7; C, 13.3; H, 3.8; B, 24.3.

Example 19 illustrates compounds of the invention in which the substituent is an $RSO_2^-$ group. The process is generic to the preparation of this class of compounds. It employs as one reactant a sulfonyl halide (preferably a chloride) and, as the second reactant, a dodecaborate acid, i.e., $H_2B_{12}H_{12}$ or derivatives thereof having substituents bonded to boron. The process proceeds readily and heating is not required, although heat can be applied if needed to speed the process. It can be used to prepare a wide range of compounds by appropriate choice of reactants. Table II which follows illustrates products (shown in column 3) which can be obtained by reacting $H_2B_{12}H_{12}$ with the sulfonyl chlorides shown in column 1, employing the reaction conditions of Example 19. A reagent to supply an appropriate cation is shown in column 2.

TABLE II

| Sulfonyl chloride | Cation reactant | Product |
| --- | --- | --- |
| Cyclohexylbenzene-$SO_2Cl$ | $NaOH_3$ | $Na_2B_{12}H_{11}SO_2C_6H_4C_6H_{11}$ |
| Diphenyl-$SO_2Cl$ | Pyridine | $(C_6H_5NH)_2B_{12}H_{11}SO_2C_6H_4C_6H_5$ |
| Naphthalene-$SO_2Cl$ | Aniline | $(C_6H_5NH_3)_2B_{12}H_{10}(SO_2C_{10}H_7)_2$ |
| Anthracene-$SO_2Cl$ | $(CH_3)_4NOH$ | $[(CH_3)_4N]_2B_{12}H_{10}(SO_2C_{14}H_9)_2$ |
| Phenanthrene-$SO_2Cl$ | CsOH | $Cs_2B_{12}H_{11}SO_2C_{14}H_9$ |
| $C_4H_9SO_2Cl$ | TlOH | $Tl_2B_{12}H_{10}(SO_2C_4H_9)_2$ |
| $C_{12}H_{25}SO_2Cl$ | $(CH_3)_3SOH$ | $[(CH_3)_3S]_2B_{12}H_{11}SO_2C_{12}H_{25}$ |
| Cyclohexane-$SO_2Cl$ | $(C_3H_7)_4POH$ | $[(C_3H_7)_4P]_2B_{12}H_{10}(SO_2C_6H_{11})_2$ |
| Decahydronaphthalene-$SO_2Cl$ | | $Zn(NH_3)_6B_{12}H_{11}SO_2C_{10}H_{17}$ |

The free acids are, of course, obtained in the process prior to the neutralization step and the acids can, if desired, be isolated directly. To illustrate briefly, $$H_2B_{12}H_{10}(SO_2C_6H_4CH_3)_2$$

can be obtained from $H_2B_{12}H_{12}$ and $CH_3C_6H_4SO_2Cl$, $H_2B_{12}H_{11}(SO_2C_6H_4OC_6H_5)$ can be obtained from $$H_2B_{12}H_{12}$$

and $C_6H_5OC_6H_4SO_2Cl$;

$$H_2B_{12}H_9(C_6H_{11})[SO_2C_6H_3(CH_3)_2]_2$$

can be obtained from $H_2B_{12}H_{11}C_6H_{11}$ and $$(CH_3)_2C_6H_3SO_2Cl$$

and the like.

Compounds of Formula 1 in which one or more X groups are carbacyl [RC(O)—] are obtained conveniently by (1) reaction of $B_{12}H_{10}\cdot 2CO$ or $$B_{12}H_{10-m}X_m\cdot 2CO$$

(where X is defined as in Formula 1 and $m$ is 1–10) with substituted aryl compounds as described and illustrated in Example 42, or (2) reaction of $B_{12}H_{10}\cdot 2CO$ with organomercurials as described in Examples 43–44.

EXAMPLE 20

(A) A solution of 4.4 g. of p-methoxybenzenediazonium tetrafluoroborate is prepared in 50 ml. of water and it is filtered to remove insoluble material. The filtrate is cooled in an ice bath and a solution of 1.0 g. of the monohydrate of disodium dodecahydrododecaborate is added with stirring. A heavy white precipitate forms which is separated by filtration. A portion of the precipitated material is dried on a porous plate and its infrared absorption spectrum is determined. The infrared spectrum shows the characteristic B—H and $B_{12}$ skeletal bands at 4.0μ and 9.4μ, a band at 4.4μ which is due to the diazonium function and bands at 6.3μ, 9.1μ, and 11.9μ, which are due to the aromatic system. The compound is bis(p-methoxybenzenediazonium) dodecahydrododecaborate(2−), i.e., a salt of the formula $$(p\text{-}CH_3OC_6H_4N_2)_2B_{12}H_{12}$$

The salt is dried at 25° C. and 0.02 mm. for 20 hours. When placed on a metal block and struck with a hammer, it detonates with a flash of light and forms much black ash. It also detonates in a combustion chamber used for elemental analysis.

*Analysis.*—Calc'd for $C_{14}H_{26}B_{12}N_4O_2$ (percent): C, 40.79; H, 6.36. Found (percent): C, 38.86; H, 6.26.

(B) A suspension of the diazonium salt obtained in Part A in 2 ml. of ethanol is warmed on a steam bath to form a violet solution. The solution is evaporated to yield a tacky, purple solid which is slightly soluble in water to form a strongly acid solution. The compound is the dihydrate of dihydrogen bis(p-methoxyphenylazo)-decahydrododecaborate(2−), i.e., $$(H_3O)_2B_{12}H_{10}(N_2\text{—}C_6H_4OCH_3)_2$$

The identity of the compound is confirmed by its infrared absorption spectrum which shows bands at 3.2μ, 6.25μ, 4.0μ, and 9.25μ.

Example 20 illustrates compounds of Formula 1 in which X is an arylazo group, i.e., ArN=N—, and a method for their preparation. The process is generic to the preparation of this class of compounds and it is usually conducted in two steps. In the first step an aryldiazonium salt of $B_{12}H_{12}^{-2}$ is prepared and, in the second step, the salt is rearranged to form the arylazosubstituted dodecaborate acid. A wide range of products can be obtained by employing the appropriate diazonium tetrafluoroborate and the appropriate dodecaborate which can contain substituents. By way of illustration, the following compounds can be obtained: $H_2B_{12}H_{11}(N_2\text{—}C_6H_5)$, $$Na_2B_{12}H_{10}(N_2\text{—}C_6H_4CH_3)_2$$

$$BaB_{12}H_{10}[N_2C_6H_3(CH_3)_2]_2, \quad CaB_{12}H_6F_4(N_2C_6H_5)_2,$$

$$[(CH_3)_3S]_2B_{12}H_9(OCH_3)(N_2C_6H_5OCH_3)_2$$

and the like.

EXAMPLE 21

A mixture of 25 g. of crystalline hydrated $H_2B_{12}H_{12}$ and 30 g. of propylene is agitated in a pressure vessel under autogenous pressure at 24–25° C. for 2.5 days. The vessel is vented to remove unreacted propylene and the nonvolatile residue is neutralized with aqueous CsOH solution. The precipitate which forms is separated. On attempted recrystallization from water, it forms a gel which is broken by addition of methanol. The product is crystallized a second time from water to obtain pure dicesium isopropylundecahydrododecaborate(2−).

*Analysis.*—Calc'd for $Cs_2B_{12}H_{11}CH(CH_3)_2$ (percent): C, 8.00; H, 4.00; B, 28.8. Found (percent): C, 8.39; H, 4.35; B, 28.01.

The above process is repeated at 35° C. and at 45° C. to obtain the isopropyl-substituted dicesium salt.

EXAMPLE 22

(A) A suspension is prepared by stirring 0.3 g. of $H_2B_{12}H_{12}\cdot 2H_2O$, or $(H_3O)_2B_{12}H_{12}$, in 40 ml. of 1,2-dimethoxyethane. Isobutylene is bubbled through the suspension at about 25° C. for 40 minutes at a rate of about 50 ml./minute. The temperature rises rapidly to 31° C. and remains at this point for 30 minutes. The temperature then drops to about 28° C. and the solution becomes clear. The solution is concentrated under reduced pressure to yield an oily residue which contains the free alkylated acid. The residue is dissolved in a small quantity of water and 1 ml. of aqueous 50% cesium fluoride solution is added with stirring. A white crystalline solid forms which is separated by filtration. The infrared absorption spectrum and elemental analysis show that the product is the monohydrate of cesium hydrogen tert.-butylundecahydrododecaborate(2−), i.e., $CsHB_{12}H_{11}C(CH_3)_3\cdot H_2O$ or, as an optional method of representation, $$Cs(H_3O)B_{12}H_{11}C(CH_3)_3$$

*Analysis.*—Calc'd for $C_4H_{23}B_{12}CsO$ (percent): C, 13.70; H, 6.57; B, 37.1. Found (percent): C, 13.75; H, 5.73; B, 34.07.

Solubility of the product in water is limited and its aqueous solution is strongly acidic, showing the presence of the hydrogen cation.

(B) A mixture of 2.5 g. of $(H_3O)_2B_{12}H_{12}$ and 3.1 g. of isobutylene is charged into a pressure vessel and agitated under autogenous pressure for 2.5 days at about 25° C. A portion of the reaction mixture is processed as described in Part A to obtain $Cs_2B_{12}H_{11}C(CH_3)_3$ as a colloidal salt. A second portion is reacted with aqueous $TlNO_3$ solution to obtain the very insoluble $Tl_2B_{12}H_{11}C(CH_3)_3$ as a double salt with thallium nitrate.

EXAMPLE 23

A mixture of 5 g. of crystalline hydrated $H_2B_{12}H_{12}$ and 25 g. of decene-1 is agitated in a pressure vessel under autogenous pressure at atmospheric temperature for 4.5 days. The mixture, which originally forms two phases, is a substantially homogeneous oil at the end of this period. It is washed with aqueous 2% NaOH solution in which the mixture is insoluble. The oily layer is dissolved in ether and washed with water. The ether solution is dried and the solvent is removed by evaporation to obtain the hydrate of dihydrogen hexa(decyl)hexahydrododecaborate(2−) in substantially pure form. The compound is an oil at ordinary temperatures.

*Analysis.*—Calc'd for $(H_3O)_2B_{12}H_6(C_{10}H_{21})_6$ (percent): C, 70.60; H, 13.50; B, 12.70. Found (percent): C, 69.99; H, 12.84; B, 10.85.

EXAMPLE 24

(A) An aqueous solution containing 6.1 g. of disodium polyhydropolyborate of Example A is passed through a column (1" x 40") packed with an ion-exchange resin, "Amberlite" IR-120-H, to obtain the free acid in solution. The acidic solution is evaporated under reduced pressure to yield the free acid in the form of a hydrate as a white crystalline solid.

(B) The acid hydrate of Part A is mixed with 5 ml. of cyclohexene and 5 ml. of 1,2-dimethoxyethane. The mixture is heated to boiling under a reflux condenser for 20 hours to form a colorless homogeneous solution. The solution is evaporated under reduced pressure and there is obtained a solvated dihydrogen monocyclohexyl-undecahydrododecaborate. The compound is a colorless, viscous liquid whose structure is confirmed by the infrared absorption spectrum and by elementary analysis to be $H_2B_{12}H_{11}(C_6H_{11}) \cdot (H_2O)_5 \cdot C_4H_{10}O_2$.

*Analysis.*—Calc'd for $C_{10}H_{44}B_{12}O_7$ (percent): C, 29.56; B, 31.96; H, 10.92; O (by difference), 27.56. Found (percent): C, 30.73; B, 30.73; H, 8.8; O (by difference), 29.88.

(C) A portion of the acid from Part B is dissolved in 20 ml. of aqueous 5% potassium hydroxide solution. To this solution, which contains $K_2B_{12}H_{11}(C_6H_{11})$, there is added with stirring 10 ml. of aqueous 50% cesium fluoride solution. A white sticky precipitate forms which is separated by filtration and dried under reduced pressure to yield a cesium salt of a cyclohexyl-substituted polyhydropolyborate. The infrared absorption spectrum of the compound shows the characteristic bands for $B_{12}H_{12}$ anion ($4.0\mu$ and $9.3\mu$) and bands for cycloaliphatic C—H, methyl groups and ether functions. Data from the infrared absorption spectrum and elemental analysis show that the compound is dicesium monocyclohexyl-undecahydrododecaborate with 1 mole of 1,2-dimethoxyethane as solvent of crystallization, i.e., $$Cs_2B_{12}H_{11}C_6H_{11} \cdot CH_3OCH_2CH_2OCH_3$$

*Analysis.*—Calc'd for $C_{10}H_{32}B_{12}Cs_2O_2$ (percent): C, 20.70; H, 5.70; B, 22.40. Found (percent): C, 19.71; H, 5.27; B, 20.52.

The salt is soluble in water and it forms a neutral solution, i.e., the pH of the solution is 7.

(D) A mixture of the hydrate of $H_2B_{12}H_{12}$ (about 0.08 mole) and cyclohexene (0.16 mole) in 100 ml. of 1,2-dimethoxyethane is refluxed for 2 hours. The mixture is cooled to atmospheric temperature, neutralized with concentrated aqueous NaOH solution and evaporated to dryness. The solid is dissolved in tetrahydrofuran, the solution is filtered and the filtrate is again evaporated to dryness. The yellow syrup which remains is dissolved in water and the solution is steam-distilled. The aqueous solution is mixed with aqueous 50% CsF solution to precipitate $Cs_2B_{12}H_{11}C_6H_{11}$. The white solid is crystallized from water to obtain the pure product as fine white crystals.

The infrared absorption spectrum shows characteristic bands at wavelengths (expressed as microns) of 4.05, 3.45 and 6.9.

*Analysis.*—Calc'd for $Cs_2B_{12}H_{11}C_6H_{11}$ (percent): C, 14.71; H, 4.53. Found (percent): C, 14.16; H, 3.75.

EXAMPLE 25

(A) A homogeneous solution is prepared consisting of 5.0 g. of the hydrate of $H_2B_{12}H_{12}$ and 5 g. of styrene in 2-propanol. The solution is held at 0–5° C. for 18 hours and at atmospheric temperature (about 25° C.) for 5 hours. The reaction mixture is neutralized with aqueous CsOH solution and the precipitate which forms is separated. It is crystallized from aqueous 50% isopropyl alcohol to obtain a product which is a mixture of compounds having from one to four $C_6H_5C_2H_4$— groups as substituents. These compounds, which are not separated by crystallization, have the formula $Cs_2B_{12}H_{12-n}(C_2H_4C_6H_5)_n$, where n is 1–4.

*Analysis.*—Calc'd for $Cs_2B_{12}H_{8.8}(C_2H_4C_6H_5)_{3.2}$ (percent): C, 41.30; H, 5.10; B, 17.50. Found (percent): C, 41.62; H, 5.26; B, 17.56.

(B) The process of Part A is repeated employing 29 g. of the hydrate of $H_2B_{12}H_{12}$ and 15 g. of styrene. There is obtained a product whose average composition is $Cs_2B_{12}H_{10.6}(C_2H_4C_6H_5)_{1.4}$.

*Analysis.*—Calc'd for above composition (percent): C, 24.30; H, 4.20; B, 23.40; Cs, 37.90. Found (percent): C, 24.33; H, 4.65; B, 23.34; Cs, 45.10.

(C) A reaction vessel is charged with 21 g. of 2-propanol and cooled to 0–5° C. Hydrated crystalline $$(H_3O)_2B_{12}H_{12}$$

(12 g.) is added with stirring. The solution is maintained at 0–5° C. and 10 g. of p-chlorostyrene is added dropwise with stirring. The reaction mixture is allowed to warm to atmospheric temperature (about 25° C.) and then heated to 35° C. for 20 hours with stirring. The solution becomes clear. It is cooled to atmospheric temperature and then poured onto a small amount of chopped ice. The mixture is neutralized with aqueous CsOH solution and the cesium salt which precipitates is separated and recrystallized from water to obtain $$Cs_2B_{12}H_{11}CH(CH_3)C_6H_4Cl$$

The infrared spectrum shows absorption at 2.8, 4.0, 6.3, 8.6, 8.9, 9.4, and 9.7$\mu$.

*Analysis.*—Calc'd for $Cs_2B_{12}H_{11}CH(CH_3)C_6H_4Cl$ (percent): C, 17.6; H, 3.5; B, 23.8; Cl, 6.5. Found (percent): C, 15.7; H, 4.1; B, 24.9; Cl, 5.0.

Fluoroalkyl-substituted dodecaborates are obtained by reacting a dodecahydrododecaborate salt with a fluoroolefin. To illustrate, 2 g. of a trihydrate of $Na_2B_{12}H_{12}$, 10 g. of tetrafluoroethylene, 40 ml. of deoxygenated water and 0.5 g. of potassium persulfate are charged into a pressure vessel and the mixture is heated gradually from 31°–82° C. under 605–800 p.s.i. pressure for 4.5 hours. The reaction mixture thus obtained is mixed with an excess of aqueous 50% CsF solution and the precipitate which forms is separated. It is a mixture of $Cs_2B_{12}H_{12}$ (i.e., unreacted $B_{12}H_{12}^{-2}$ anion) and $Cs_2B_{12}H_{11}CF_2$—$CF_2H$. Elementary analysis of the mixture shows 2.42% C, 3.15% H, and 7.87% F. The infrared absorption spectrum shows characterizing bands at 4.0, 8.6, 9.0 and 9.4$\mu$. The fluoroalkyl-substituted compound can be obtained in pure form by repeated crystallization from hydroxylated solvents.

EXAMPLE 26

(A) A pressure vessel is charged with 5.0 g. of hydrated dihydrogen dodecahydrododecaborate, i.e., hydrated $(H_3O)_2B_{12}H_{12}$, and 50 ml. of 1,2-dimethoxyethane containing a small quantity of water. The vessel is flushed with nitrogen, closed and cooled in a solid carbon dioxide bath to −80° C. Pressure in the vessel is reduced to less than 10 mm. of mercury by means of a vacuum pump and 1.8 g. (0.05 mole) of acetylene is injected into the vessel. The reaction mixture is heated with agitation under autogeneous pressure (45 p.s.i.) at 80° C. for 4 hours. The vessel is cooled to atmospheric temperature and the reaction mixture is poured into a glass container. The mixture, which is homogeneous, is evaporated under reduced pressure (20–30 mm.) at about 40° C. to yield 6.5 g. of reaction product. The infrared absorption spectrum of the product shows that it is a mixture of dihydrogen polyhydrododecaborates bearing substituents which are saturated and unsaturated hydrocarbon groups of at most 2 carbons and monooxahydrocarbyloxy groups of the type —$OCH_2CH_2OCH_3$. The elemental analysis is as follows: C, 26.92; H, 8.74.

(B) The acid, obtained as described in Part A, is neutralized with aqueous potassium hydroxide to form the dipotassium salt in aqueous solution. This solution is reacted with aqueous cesium fluoride to precipitate the dicesium compound which is separated by filteration. The compound is dried and its elemental analysis is as follows: C, 9.80; H, 3.97.

EXAMPLE 27

(A) A reaction vessel is charged with 5.0 g. of the hydrate of dihydrogen dodecahydrododecaborate, i.e., hydrated $H_2B_{12}H_{12}$, and 50 ml. of 1,2-dimethoxyethane containing a small quantity of water. The reaction vessel is fitted with a reflux condenser and means of introducing nitrogen to provide an inert atmosphere. Phenylacetylene (2.5 g.) is added to the reaction mixture which is then heated to mild refluxing for 1 hour in the nitrogen atmosphere. The mixture is cooled and the solvent is removed by heating the mixture under about 1 mm. pressure at 35–40° C. There is obtained 8.1 g. of a viscous residue which is shown by elemental analysis and the infrared absorption spectrum to be dihydrogen monostyrylundecahydrododecaborate dihydrate.

*Analysis.*—Calc'd for $(H_3O)_2B_{12}H_{11}(C_2H_2C_6H_5)$ (percent): C, 34.10; H, 8.5. Found (percent): C, 34.09; H, 9.96.

(B) The product of Part A is neutralized with aqueous potassium hydroxide to form an aqueous solution of $K_2B_{12}H_{11}(C_2H_2C_6H_5)$. The solution is reacted with aqueous cesium fluoride to precipitate the dicesium salt. The salt is separated by filtration and dried. The identity of the compound, which is dicesium monostyrylundecahydrododecaborate, is confirmed by elemental analysis.

*Analysis.*—Calc'd for $Cs_2B_{12}H_{11}(C_2H_2C_6H_5)$ (percent): C, 18.70; H, 3.60. Found (percent): C, 18.27; H, 3.97.

(C) A reaction vessel is charged with 4.0 g. of the crystalline hydrate of $H_2B_{12}H_{12}$ and 4 g. of cold $CH_3OH$. The solution is chilled to 0° C. and 2 g. of phenylacetylene is added with agitation. The mixture is maintained at 0° C. for 1 hour and then at about 25° C. for 16 hours. A portion is neutralized with CsOH solution to form the insoluble cesium salt which gels in water. A second portion is neutralized with aqueous TlOH to precipitate the very insoluble thallium salt. The thallium compound is extracted with water in a Soxhlet extractor and the product is dried to obtain $Tl_2B_{12}H_{11}(C_2H_2C_6H_5)$ as a white crystalline product. The infrared absorption spectrum shows that the product contains some $Tl_2B_{12}H_{11}CH(CH_3)C_6H_5$.

*Analysis.*—Calc'd for $Tl_2B_{12}H_{11}(C_2H_2C_5H_5)$ (percent): C, 14.7; H, 2.8; B, 19.8. Found (percent): C, 14.9; H, 3.4; B, 19.2.

(D) The process of Part C is repeated, employing five times the quantities of reactants by weight. The reaction mixture is neutralized with aqueous CsOH and the gel which forms is broken up with methanol. The white crystalline product is a mixture of mono- and di-substituted dicesium polyhydrododecaborates having an average composition of 1.3 phenylacetylene units per dodecarborate anion, e.g., 70% of $Cs_2B_{12}H_{11}C_2H_2C_6H_5$ and 30% of $Cs_2B_{12}H_{10}(C_2H_2C_6H_5)_2$.

*Analysis.*—Calc'd for above composition (percent): C, 23.20– H, 3.70; B, 23.90. Found (percent): C, 23.51; H, 4.14; B, 22.76.

EXAMPLE 28

A reaction vessel is charged with 10 g. of the crystalline hydrate of $H_2B_{12}H_{12}$ and 11.7 g. of propiolic acid is added to it slowly over a period of 2 hours with stirring. The temperature of the reaction mass is maintained at 35–40° C. The mixture is neutralized with aqueous NaOH solution and an excess of aqueous 50% CsF solution is added. The precipitate which forms is separated and recrystallized three times from water to obtain $$Cs_2B_{12}H_{11}(C_2H_2COOH)$$

as a white crystalline salt. The compound contains a carboxyl group which can also form a cesium salt and the compound contains a small quantity of this tricesium salt.

*Analysis.*—Calc'd for $Cs_2B_{12}H_{11}(C_2H_2COOH)$ (percent): Cs, 55.5; H, 2.96; C, 7.55. Found (percent): Cs, 56.7; H, 3.40; C, 4.20.

Examples 21 through 28 illustrate the compounds of Formula 1 in which X is a substituted or unsubstituted hydrocarbon group. The substituent X can be saturated or unsaturated, open-chain or cyclic. The process, which is generic to the preparation of this class of compounds, employs (1) a reactant which has olefinic or acetylenic bonds

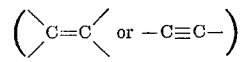

and (2) an acid of a dodecaborate which can have substituents. The unsaturated reactant preferably has at most two unsaturated bonds, i.e., at most two olefinic or two acetylenic bonds. The number of carbons in this reactant is not critical but, in general, unsaturated reactants of up to 18 carbons are preferred. Examples of compounds which can be obtained by the process are:

$H_2B_{12}H_{10}(C_6H_{13})_2$ from hexene-1 and
$H_2B_{12}H_{12}$, $H_2B_{12}H_{11}(C_2H_4COOH)$ from acrylic acid and
$H_2B_{12}H_{12}$, $H_2B_{12}H_{10}C(CH_3)_3(C_6H_{11})$ from cyclohexene
and $H_2B_{12}H_{11}C(CH_3)_3$, and $$H_2B_{12}H_9(SCH_3)_2[CH(CH_3)_2]$$

from propylene and $H_2B_{12}H_{10}(SCH_3)_2$.

Compounds of Formula 1 in which at least one X group is alkynyl can be obtained from derivatives bearing open chain acyl groups by reaction with a halogenating agent followed by dehydrohalogenation. To illustrate, $$(NH_4)_2B_{12}H_{11}C(O)CH_3$$

can be reacted with $PCl_5$ to obtain $$(NH_4)_2B_{12}H_{11}CCl_2CH_3$$

This compound can then be dehydrohalogenated with, e.g., aqueous KOH solution, to obtain $(NH_4)_2B_{12}H_{11}C{\equiv}CH$.

Compounds of Formula 1 in which at least one X group is methyl are obtained by treating $B_{12}H_{10} \cdot 2CO$ with a reducing agent, e.g., lithium aluminum hydride. To illustrate, $B_{12}H_{10} \cdot 2CO$ is dissolved in diethyl ether and this solution is added slowly and with stirring to a solution of $LiAlH_4$ in ether. After addition is complete, the mixture is gently refluxed for a few hours and then allowed to cool. Excess $LiAlH_4$ is destroyed by adding ether saturated with water slowly to the solution and finally water is added. The ether layer separates and is removed by decantation. The water layer is filtered and the filtrate is acidified with hydrochloric acid. The filtrate can, if desired, be divided into separate portions. To one portion an aqueous solution of CsF can be added to precipitate $Cs_2B_{12}H_{10}(CH_3)_2$; to a second portion $(C_3H_7)_4NOH$ can be added to precipitate $[C_3H_7)_4N]_2B_{12}H_{10}(CH_3)_2$, and to a third portion $TlNO_3$ can be added to precipitate $Tl_2B_{12}H_{10}(CH_3)_2$. The precipitated compounds can be isolated and purified by recrystallization as described in previous examples. Optionally, the acidified filtrate obtained from the reaction can be subjected to further purification to obtain hydrated $H_2B_{12}H_{10}(CH_3)_2$ or it can be neutralized with a wide range of basic compounds, e.g., $NH_2NH_2$, $NH_4OH$, pyridine, dicyclohexylamine, dimethylaniline, and the like to obtain, e.g., $$(NH_2NH_3)_2B_{12}H_{10}(CH_3)_2$$

$$(NH_4)_2B_{12}H_{10}(CH_3)_2,\ C_5H_5NH)_2B_{12}H_{10}(CH_3)_2,$$

$$[(C_6H_{11})_2NH_3]_2B_{12}H_{10}(CH_3)_2,\ \text{and}$$

$$[C_6H_5NH(CH_3)_2]_2B_{12}H_{10}(CH_3)_2$$

Compounds of Formula 1 in which at least one X group is hydroxymethyl can be obtained by reducing $B_{12}H_{10} \cdot 2CO$ with a borohydride, e.g., $LiBH_4$. To illustrate, a solution is prepared of $LiBH_4$ in 1,2-dimethoxyethane (glyme). The solution is stirred under an inert atmosphere, e.g., nitrogen, and to it there is added dropwise a solution of $B_{12}H_{10} \cdot 2CO$ in 1,2-dimethoxyethane. After addition is completed the mixture is refluxed gently for about 30 minutes. The mixture is cooled and the glyme is removed by evaporation or, in the event two layers are present, by decantation. The residue is dissolved in water and the solution can be divided, if desired, into several portions. These portions are mixed with a salt or base having the desired cation M to obtain salts of the anion $B_{12}H_{10}(CH_2OH)_2^{-2}$. For example, one portion can be mixed with an aqueous solution of TlOH to obtain $Tl_2B_{12}H_{10}(CH_2OH)_2$, a second portion can be mixed with RbCl to obtain $Rb_2B_{12}H_{10}(CH_2OH)_2$, and a third portion can be mixed with CsCl to obtain $$Cs_2B_{12}H_{10}(CH_2OH)_2$$

Aqueous solutions of these salts can be contacted with an acid ion-exchange resin to obtain a pure aqueous solution of $H_2B_{12}H_{10}(CH_2OH)_2$. The acid solution can be neutralized with any desired organic or inorganic base to obtain a compound of Formula 1 bearing —$CH_2OH$ groups.

The compounds described above in which at least one X is —$CH_2OH$ can be reacted with hydrohalogenic acids to obtain compounds of Formula 1 in which at least one X is $CH_2Y$ (where Y is F, Cl, Br or I). To illustrate, $H_2H_{12}H_{10}(CH_2OH)_2$ can be reacted with HF to obtain $H_2B_{12}H_{10}(CH_2F)_2$, with HCl to obtain $$H_2B_{12}H_{10}(CH_2Cl)_2$$

with HBr to obtain $H_2B_{12}H_{10}(CH_2Br)_2$, and with HI to obtain $H_2B_{12}H_{10}(CH_2I)_2$. These acids can be employed, as described earlier, to prepare a wide range of salts.

Compounds bearing —$CH_2OH$ groups can be reacted with organic acids, anhydrides or acid halides to obtain products bearing —$CH_2OC(O)R$ groups, where R has the meanings defined in a previous paragraph. To illustrate, $H_2B_{12}H_{10}(CH_2OH)_2$ can be reacted with acetic anhydride to obtain $H_2B_{12}H_{10}[CH_2OC(O)CH_3]_2$, with benzoyl chloride to obtain $H_2B_{12}H_{10}[CH_2OC(O)C_6H_5]_2$, with methacrylic anhydride to obtain $$H_2B_{12}H_{10}[CH_2OC(O)C(CH_3)=CH_2]_2$$

and the like.

EXAMPLE 29

(A) A quantity (20 g.) of $[(CH_3)_4N]_2B_{12}H_{11}OH$, obtained as described in Example 8, Part D, is mixed with 50 ml. of water. The mixture is heated to refluxing and chlorine gas is passed into it for 40 minutes. The mixture is cooled and the precipitate is separated. It is recrystallized from 50% aqueous $CH_3CN$ to obtain 18 g. of a pentachloromonohydroxy derivative.

*Analysis.*—Calc'd for $[(CH_3)_4N]_2B_{12}H_6Cl_5OH$ (percent): C, 19.9; H, 6.5; Cl, 37.0; N, 5.8. Found (percent): C, 19.4; H, 6.5; Cl, 37.9; N, 5.7.

An aqueous solution of the above compound is passed through a column filled with an acid ion-exchange resin and the aqueous effluent, which contains $H_2B_{12}H_6Cl_5OH$, is neutralized with cesium hydroxide to obtain $$Cs_2B_{12}H_6Cl_5OH$$

(B) Sufficient water is added to 1 g. of $Cs_2B_{12}H_{11}OH$, prepared as described in Example 8, Part C, to form a clear solution at 90° C. Chlorine gas is bubbled through the solution at this temperature for one hour. The product which is formed is sparingly soluble and water is added as needed to maintain a clear hot solution during passage of the gas. Flow of chlorine is stopped and the solution is chilled. White crystals form which are separated, recrystallized from hot water and dried. The product is the monohydrate of $Cs_2B_{12}HCl_{10}OH$.

*Analysis.*—Calc'd for $Cs_2B_{12}HCl_{10}OH \cdot H_2O$ (percent): Cs, 33.8; B, 16.5; H, 0.5; Cl, 45.1. Found (percent): Cs, 32.5, 32.8; B, 16.5, 16.5; H, 0.7, 0.6; Cl, 45.3, 45.6.

The above process is repeated employing $$Cs_2B_{12}H_{11}OCH(CH_3)_2$$

of Example 13, Part B, and $Cs_2B_{12}H_{11}OC_6H_{11}$ of Example 15, Part C, in place of $Cs_2B_{12}H_{11}OH$. The product obtained with either reactant is $Cs_2B_{12}HCl_{10}OH$ as a hydrate.

(C) A reaction vessel is charged with 60 g. of

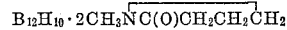

obtained as described in Example 8, Part G, and a solution of 28 g. of NaOH in 300 ml. of water. The mixture is refluxed for one hour. It is cooled and sufficient concentrated hydrochloric acid is added to form a neutral solution. The solution is heated to slow refluxing and chlorine gas is passed through it for 1.5 hours. The solution is cooled and neutralized with aqueous NaOH solution. It is stirred and 50 g. of $(CH_3)_4NOH \cdot 5H_2O$ is added. The solution is cooled in ice and the precipitate which forms is separated to obtain $[(CH_3)_4N]_2B_{12}Cl_8H_2(OH)_2$. The filtrate is set aside for further processing. The compound is further purified by recrystallization from 50% aqueous acetonitrile to obtain 27 g. of product.

*Analysis.*—Calc'd for $[(CH_3)_4N]_2B_{12}Cl_8H_2(OH)_2$ (percent): C, 15.9; H, 4.7; Cl, 47.4. Found (percent): C, 16.4; H, 4.9; Cl, 46.6.

The filtrate from the above process is allowed to evaporate for two days at atmospheric temperature. Crystals form which are separated and dried to obtain 14.5 g. of $[(CH_3)_4N]_2B_{12}Cl_7H_3(OH)_2$.

*Analysis.*—Calc'd for $[(CH_3)_4N]_2B_{12}Cl_7H_3(OH)_2$ (percent): C, 17.0; H, 5.1; Cl, 43.8. Found (percent): C, 17.5; H, 5.4; Cl, 43.6.

(D) An aqueous solution of $[(CH_3)_4N]_2B_{12}H_9(OH)_3$ is prepared as described in Example 8, Part H, and it is evaporated to a volume of 200 ml. The solution is cooled to 5° C., chlorine gas is bubbled through it and the temperature is raised gradually to 95° C. Excess chlorine is then swept from the solution with a stream of nitrogen and the solution is evaporated to dryness under reduced pressure. There is obtained 57.7 g. of a gummy residue which is mixed with 55 ml. of water. The mixture is made neutral with aqueous $(CH_3)_4NOH$ solution and it is filtered. The filtrate is added to 480 ml. of absolute ethyl alcohol and a white crystalline solid precipitates which is $[(CH_3)_4N]_2B_{12}Cl_9(OH)_3$. The crystals are separated, washed with absolute alcohol and dried under reduced pressure to yield 33.3 g. of product. The compound is further purified by dissolving in water and precipitating again with alcohol.

*Analysis.*—Calc'd for $[(CH_3)_4N]_2B_{12}Cl_9(OH)_3$ (percent): N, 4.32; C, 14.82; H, 4.20; B, 20.03; Cl, 49.22. Found (percent): N, 4.35, 4.19; C, 15.33; H, 4.60; B, 20.93; Cl, 49.45.

(D) A solution of 6.13 g. of $(NH_4)_2B_{12}H_9(OH)_3$, prepared as described in Example 8, Part I, is chlorinated as described above to obtain the trihydroxynonachlorododecaborate salt, i.e., $(NH_4)_2B_{12}Cl_9(OH)_3$.

(E) An aqueous solution of $H_2B_{12}H_8(OH)_4$, prepared as described in Example 8, Part J, is warmed to 50–60° C. and chlorine gas is bubbled through it until no further absorption of the gas is observed. The reaction mixture is cooled and neutralized with $NH_4OH$. It is divided into two portions. One portion is mixed with an aqueous solution of $(CH_3)_4NCl$ and the second portion is mixed with an aqueous solution of $(n-C_3H_7)_4NI$. In each case the white precipitate which forms is separated, recrystallized from water and dried. The compounds are salts of the tetrahydroxyoctachlorododecaborate anion.

*Analysis.*—Calc'd for $[(CH_3)_4N]_2B_{12}Cl_8(OH)_4$ (percent): B, 20.7; C, 15.2; H, 4.13; Cl, 45.2. Found (percent): B, 20.7; C, 15.3; H, 4.73; Cl, 46.2.

*Analysis.*—Calc'd for $[(C_3H_7)_4N]_2B_{12}Cl_8(OH)_4$ (percent): B, 15.2; C, 33.7; H, 7.50; Cl, 33.2. Found (percent): B, 13.3; C, 24.8; H, 6.05; Cl, 33.8.

The infrared spectrum of the tetramethylammonium salt shows characteristic absorption bands at the following wavelengths (expressed as cm.$^{-1}$): 3600, medium; 3100, medium; 1200, medium; 1080, weak; 1025, strong, broad; 940, strong; 850, strong, broad; and 720, strong, broad.

EXAMPLE 30

(A) A mixture is prepared consisting of 20 ml. of water and 1 g. of $Cs_2B_{12}H_{11}OCH(CH_3)_2$, obtained as described in Example 13, Part B. Liquid bromine is added dropwise to the solution with stirring. The reaction is exothermic and the solution refluxes. Water is added as needed during the process to maintain a clear solution. When bromine is no longer absorbed, the solution is heated to maintain refluxing and chlorine gas is bubbled through the solution while bromine is added dropwise for 5 minutes. The solution is then evaporated partially, filtered and the filtrate is cooled. A precipitate forms which is separated, washed with water and dried under reduced pressure to obtain 1.7 g. of $Cs_2B_{12}Br_{11}OH$.

*Analysis.*—Calc'd for $Cs_2B_{12}Br_{11}OH$ (percent): Cs, 20.6; B, 10.1; Br, 68.0. Found (percent): Cs, 20.3; B, 9.8; Br, 68.4.

(B) Bromination of $[(CH_3)_4N]_2B_{12}H_{11}OCH(C_2H_5)_2$, obtained as described in Example 15, is conducted as described in Part A to obtain 2.2 g. of $$[(CH_3)_4N]_2B_{12}Br_{11}OH$$

*Analysis.*—Calc'd for $[(CH_3)_4N]_2B_{12}Br_{11}OH$ (percent): B, 11.0; C, 8.2; H, 2.1; Br. 74.8. Found (percent): B, 10.9; C, 8.5; H, 2.2; Br, 74.9.

(C) Bromination of 1.0 g. of $[(CH_3)_4N]_2B_{12}H_{11}OH$ (see Example 8, Part D), as described in Part A, yields 2.2 g. of $[(CH_3)_4N]_2B_{12}Br_{11}OH$. Similarly bromination of 2.0 g. of $Cs_2B_{12}H_{11}OH$ (see Example 8, Part B) yields 2.0 g. of $Cs_2B_{12}Br_{11}OH$.

(D) A portion (5.5 g.) of product B, obtained as described in Example 8, Part G, is mixed with 30 ml. of water and 2 g. of NaOH. The mixture is refluxed for 2.5 hours and then cooled to atmospheric temperature. It is diluted with 20 ml. of water and liquid bromine is added dropwise with stirring. The reaction is exothermic and proceeds rapidly. Bromine addition is continued until the color of bromine persists for 10 minutes. The mixture is then made basic by addition of solid NaOH. Aqueous $(CH_3)_4NCl$ solution is added with stirring until precipitation of a white solid is complete. The solid is separated and crystallized from hot water to obtain 3.5 g. of white crystalline $[(CH_3)_4N]_2B_{12}Br_{10}(OH)_2$.

*Analysis.*—Calc'd for $[(CH_3)_4N]_2B_{12}Br_{10}(OH)_2$ (percent): B, 11.70; C, 8.60; H, 2.30; Br, 71.80; N, 2.50. Found (percent): B, 11.82; C, 9.21, 9.02; H, 2.76, 3.03; Br, 71.60, 72.03; N, 2.47, 2.59.

(E) A solution consisting of 100 ml. of water and 10 g. of $Cs_2B_{12}H_9(OH)_3$, prepared as described in Example 8, Part H, is cooled to about 8° C. Liquid bromine is added dropwise with stirring and the solution temperature is maintained at 8–32° C. until the rate of bromine absorption decreases. An excess of liquid bromine is added at this time and chlorine gas is bubbled through the solution as the temperature is raised from 32° to 83° C. When no further reaction is evident, addition of chlorine is stopped and nitrogen gas is passed into the mixture to sweep out excess chlorine and bromine. The solution is evaporated at 55° C. under reduced pressure to yield 25.12 g. of solids. The solids are divided into two portions.

One portion is dissolved in water and neutralized with aqueous CsOH solution. The precipitate which forms is separated and crystallized twice from water to obtain $Cs_2B_{12}Br_9(OH)_3$ as a white, crystalline solid.

*Analysis.*—Calc'd for $Cs_2B_{12}Br_9(OH)_3$ (percent): Cs, 22.82; B, 11.06; Br, 61.74. Found (percent): Cs, 22.10; B, 12.40, 12.14; Br, 63.48, 63.26.

The second portion of solids is dissolved in water and the solution is passed through a column packed with a strong acid ion-exchange resin. The effluent is neutralized with $(CH_3)_4NOH$ and evaporated under reduced pressure at 35° C. to obtain $[(CH_3)_4N]_2B_{12}Br_9(OH)_3$. The compound is further purified by crystallization from 50% aqueous alcohol.

*Analysis.*—Calc'd for $[(CH_3)_4N]_2B_{12}Br_9(OH)_3$ (percent): B, 12.39; N, 2.67; C, 9.16; H, 2.60; Br. 68.60. Found (percent): B, 12.36; N, 2.69, 2.27; C, 8.40; H, 2.82; Br, 68.65.

EXAMPLE 31

Sufficient water is added to 2.0 g. of $Cs_2B_{12}H_{11}OCH_3$, prepared as described in Example 11, Part B, to form a clear solution at 90° C. Chlorine gas is passed into the solution at this temperature and water is added as needed to maintain a clear solution. Passage of chlorine is continued until reaction is complete and the solution is then cooled. White crystals of hydrated $Cs_2B_{12}HCl_{10}OCH_3$ precipitate. The crystals are separated and crystallized from water.

*Analysis.*—Calc'd for $Cs_2B_{12}HCl_{10}OCH_3 \cdot H_2O$ (percent): Cs, 33.2; B, 16.2; C, 1.5; H, 0.75; Cl, 44.4. Found (percent): Cs, 32.9; B, 16.4; C, 1.3; H, 0.96; Cl, 44.1.

EXAMPLE 32

A suspension is prepared consisting of 150 ml. of methanol and 3.5 g. of $[(CH_3)_4N]_2B_{12}H_{11}OCH_2CH_2OCH_3$, obtained as described in Example 17, Part A. The suspension is cooled to 10° C. and this temperature is maintained while a solution of 27.8 g. of bromine in 40 ml. of methanol is added dropwise with stirring. The reaction mixture is allowed to warm to atmospheric temperature and it is stirred for 11 hours. The solution is concentrated on a rotary evaporator and $(CH_3)_4NBr$ separates. The mixture is filtered and the filtrate is evaporated to dryness. A gray solid form which is crystallized from water to obtain crystalline white $$[(CH_3)_4N]_2B_{12}H_3Br_8OCH_2CH_2OCH_3$$

*Analysis.*—Calc'd for the above product (percent): B, 13.04; Br, 64.22; C, 13.27; H, 3.44; N, 2.81. Found (percent): B, 12.62; Br, 64.39; C, 12.62; H, 3.03; N, 2.19, 2.13.

EXAMPLE 33

Chlorine gas is bubbled through a mixture of acetonitrile and $Cs_2B_{12}H_{11}CH(CH_3)_2$, obtained as described in Example 21. The temperature of the reaction mixture is maintained at 25–40° C. during the process and passage of gas is continued until no further absorption occurs. The solution is evaporated to dryness and the solid residue is recrystallized from water to obtain $$Cs_2B_{12}H_4Cl_7CH(CH_3)_2$$

*Analysis.*—Calc'd for above compound (percent): C, 5.10; H, 1.60; Cl, 36.20. Found (percent): C, 4.64; H, 1.56; Cl, 35.47.

EXAMPLE 34

A portion of the product, whose average composition is $Cs_2B_{12}H_{10.6}(C_2H_4C_6H_5)_{1.4}$, which is obtained as described in Example 25, Part B, is mixed with acetonitrile and the mixture is chlorinated as described in Example 33. The reaction mixture is processed to obtain the cesium salt which is shown by elemental analysis to have the average composition $Cs_2B_{12}Cl_{10.6}(C_2H_4C_6H_5)_{1.4}$.

*Analysis.*—Calc'd for above composition (percent): C, 16.40; H, 1.50; Cl, 46.10. Found (percent): C, 17.46; H, 1.98; Cl, 46.41.

The acid $H_2B_{12}H_{12}$ (and its hydrates) reacts with nitriles, e.g., acetonitrile, propionitrile, benzonitrile, to form dodecaborates having nitrogen-containing substituents whose structure has not been determined exactly. The substituted compounds can be reacted with halogens, e.g., bromine, to obtain dodecaborates bearing both bromine and nitrogen-containing substituents. The preparation of these compounds is illustrated in Example 35.

EXAMPLE 35

(A) A mixture of 100 ml. of $CH_3CN$ and 24 g. of hydrated $H_2B_{12}H_{12}$ (N.E., 186) is refluxed on a steam bath for about 9.5 days. The solution is divided into two equal parts.

Aqueous CsOH solution is added to one part and aqueous $(CH_3)_4NOH$ is added to the second part. The precipitates which form are separated to obtain the cesium and tetramethylammonium salts of substituted dodecaborates. The infrared absorption spectrum of the cesium salt shows a sharp band at $3.0\mu$ and a broad band at $6.3\mu$. The elemental analyses of each of the salts is as follows:

Cs salt: Cs, 48.1; B, 36.6; C, 3.20; H, 4.40; N, 3.2.
$(CH_3)_4N$ salt: B, 52.9; C, 19.0; H, 11.5; N, 9.8.

Portions of each of the salts are refluxed in concentrated aqueous HBr for a short period and the solutions are neutralized with base. The salts are separated and have the following elemental analysis:

Cs salt: Cs, 55.9; B, 25.1; C, 2.0; H, 3.2; N, 3.3.
$(CH_3)_4N$ salt: B, 55.6; C, 19.7; H, 11.2; N, 10.7.

Portions of each of the salts are boiled in concentrated aqueous HBr for a short period and they are then treated with liquid bromine as described in Example 3, Part L. The salts are isolated and they show the following elemental analyses:

Cs salt: Cs, 15.3; B, 10.8; C, 2.5; H, 0.9; Br, 67.7; N, 1.2.
$(CH_4)_3N$ salt: B, 13.3; C, 5.9; H, 2.5; Br,, 76.0; N, 2.9.

(B) A mixture of 100 ml. of propionitrile and 24.5 g. of hydrated $H_2B_{12}H_{12}$ (N.E., 190) is refluxed for about 9.5 days. The reaction mixture is processed in the manner described in Part A, including refluxing with HBr and perbromination. The infrared absorption spectrum of the cesium salt, as obtained initially, shows a characteristic double peak at $9.5\mu$. Elemental analyses of the Cs and $(CH_3)_4N$ salts are as follows:

Cs salt: Cs, 49.0; B, 34.7; C, 5.0; H, 4.5; N, 3.3.
$(CH_3)_4N$ salt: B, 45.3; C, 26.6; H, 11.3; N, 13.6.

After treatment with refluxing HBr solution, the elemental analyses are:

Cs salt: Cs, 34.7; B, 23.8; C, 2.3; H, 3.2; N, 3.3.
$(CH_3)_4N$ salt: B, 53.2; C, 21.8; H, 11.4; N, 9.1.

After treatment with refluxing HBr solution and with liquid bromine, the elemental analyses are:

Cs salt: Cs, 15.1; B, 10.8; C, 3.6; H, 1.3; Br, 67.0; N, 1.5.
$(CH_3)_4N$ salt: B, 12.9; C, 8.0; H, 2.6; Br, 74.5; N, 3.0.

EXAMPLE 36

(A) A mixture consisting of 10 g. of hydrated crystalline $(H_3O)_2B_{12}H_{12}$ and 20 g. of hydrogen sulfide is heated in a pressure vessel under autogenous pressure with agitation for 4 hours at 100° C. The vessel is cooled, vented and flushed with nitrogen. The reaction mixture is neutralized with cesium hydroxide and the precipitate which forms is separated and recrystallized twice from water. The product is $Cs_2B_{12}H_{11}SH$ whose infrared spectrum (mineral oil mull) shows slight absorption at 2.8 and $6.3\mu$; strong absorption at $4.0\mu$; moderate absorption at 9.5, 10.3, 11.9 and $13.9\mu$.

*Analysis.*—Calc'd for $Cs_2B_{12}H_{11}SH$ (percent): B, 29.7; S, 7.3; H, 2.7; Cs, 60.5. Found (percent): B, 30.1; S, 7.5; H, 2.8; Cs, 60.0.

(B) The cesium salt obtained above is dissolved in $CH_3CN$ and chlorine gas is passed into the solution at 25–32° C. for 15 minutes. The solution is evaporated and the solid residue is recrystallized from water to obtain a product whose analysis agrees fairly well for the composition $Cs_2B_{12}H_4Cl_7SH$ or the closely related disulfide $[Cs_2B_{12}H_4Cl_7S—]_2$. The infrared absorption spectrum shows bands at 2.8, 6.2 and $9.5\mu$ (strong); and weak bands at 10.5, 11.2, 11.7 and $13.8\mu$.

*Analysis.*—Calc'd for $Cs_2B_{12}H_4Cl_7SH$ (percent): Cl, 36.5; S, 4.7; B, 19.1. Found (percent): Cl, 35.5; S, 4.7; B, 19.0.

EXAMPLE 37

(A) A weighed portion (1.1 g.) of crude
$$Cs_2B_{12}H_{10}[C(O)NH_2]_2,$$
prepared as described in Example 41, is heated under very low pressure to a maximum of 410° C. for a period of one hour. The residue is cooled and is dissolved in a few milliliters of water. An equal volume of aqueous 50% CsCl is added and the solution is chilled to precipitate $Cs_2B_{12}H_{10}(CN)_2$. The precipitate is separated, washed and dried to obtain 0.3 g. of product. The infrared spectrum of the product shows major absorption bands at the following wavelengths (expressed as cm.$^{-1}$): 2500, 2190, 1260, 1040, 1020, 850 and 725.

*Analysis.*—Calc'd for $Cs_2B_{12}H_{10}(CN)_2$ (percent): C, 5.2; H, 2.2; B, 28.4; N, 6.1; Cs, 58.0. Found (percent): C, 5.1; H, 2.6; B, 27.6; N, 4.8; Cs, 55.4.

(B) A mixture consisting of 10 g. of a crystalline hydrate of $(H_3O)_2B_{12}H_{12}$ and 15 g. of cyanogen chloride (CNCl) is reacted in a pressure vessel at 225 psi. pressure and at 25–26° C. for 4 hours. The product is a friable mass. It is dissolved in dilute aqueous NaOH solution and to this solution is added an aqueous 50% CsF solution. The precipitate which forms is separated and recrystalized from water. The product is principally
$$Cs_2B_{12}H_6Cl_2(CN)_4.$$

Its infrared absorption spectrum includes the following bands: 2.75, 2.9, 3.95, 4.5, 6.2 (broad), 10.3 (shoulder at 9.9), 12.2 and $13.7\mu$ (broad).

*Analysis.*—Calc'd for $Cs_2B_{12}H_6Cl_2(CN)_4$ (percent): C, 8.3; H, 2.1; Cl, 12.2; N, 9.7. Found (percent): C, 7.5; H, 4.2; Cl, 13.7; N, 10.3.

EXAMPLE 38

(A) The crude reaction product obtained from
$$H_2B_{12}H_{12}$$
and CO, as described in Example E, is dissolved in water and aqueous CsF is added to the solution. The precipitate which forms is extracted repeatedly with water and the least water-soluble fraction is isolated. This fraction is $Cs_2B_{12}H_{11}(COOH)$. The infrared absorption spectrum shows strong absorption at $6.0\mu$, i.e., for the —C(O)OH group.

*Analysis.*—Calc'd for $Cs_2B_{12}H_{11}(COOH)$ (percent): C, 2.4; H, 2.4; B, 28.8. Found (percent): C, 2.6; H, 2.5; B, 27.6.

(B) A portion of the above salt is dissolved in excess aqueous NaOH solution to form $Na_2B_{12}H_{11}(COONa)$ in solution. This solution is added to a large excess of aqueous $TlNO_3$ solution and the precipitate which forms is isolated. It is $Tl_2B_{12}H_{11}(COOTl)$. The infrared spectrum shows absorption bands at $6.8\mu$, i.e., for the —C(O)OTl group.

(C) Sufficient $B_{12}H_{10} \cdot 2CO$ is added gradually and carefully to a quantity of water to form a solution containing about 10% by weight of the dicarbonyl compound. The $B_{12}H_{10} \cdot 2CO$ reacts vigorously with the water during addition and the compound formed in solution is dihydrogen dicarboxydecahydrododecaborate(2−), i.e.,
$$H_2B_{12}H_{10}(COOH)_2$$

In its hydronium form the compound is
$$(H_3O)_2B_{12}H_{10}(COOH)_2$$

The acid is dehydrated easily to the bis(carbonyl) compound and, for this reason, the acid is preferably kept in aqueous solution. The solutions are stable and can be stored in conventional equipment customarily used for strong inorganic acids.

The identity of the acid is confirmed by the nuclear magnetic resonance spectrum of its aqueous solution. The $B_{11}$ resonance shows two peaks, the more intense of which is displaced +39.4 p.p.m. and the weaker peak +47.4 p.p.m. from trimethyl borate.

(D) An aqueous solution of CsF is added to a portion of the solution of the acid obtained in Part C. The precipitate which forms is separated and it is recrystallized fractionally from water to obtain $Cs_2B_{12}H_{10}(COOH)_2$.

The infrared absorption spectrum of a mineral oil mull of the compound shows the following bands: 2.65, 3.9, 5.9, 7.9, 9.3, 9.6, 10.8, 13.8 (broad) and $14.4\mu$.

Analysis.—Calc'd for $Cs_2B_{12}H_{10}(COOH)_2$ (percent): C, 4.7; H, 2.9; B, 26.0; Cs, 53.6. Found (percent): C, 4.7; H, 2.9; B, 25.9; Cs, 52.7.

(E) An excess of aqueous NaOH solution is added to a second portion of the acid solution of Part C to obtain a solution of $Na_2B_{12}H_{10}(COONa)_2$. This solution is added to a large excess of an aqueous thallium nitrate solution and the precipitate which forms is separated to obtain $Tl_2B_{12}H_{10}(COOTl)_2$.

The infrared spectrum of a mineral oil mull shows absorption at 4.0, 7.5, 9.7, 10.0, 10.6, 13.2, and $13.9\mu$.

Analysis.—Calc'd for $Tl_2B_{12}H_{10}(COOTl)_2$ (percent): C, 2.3; H, 1.0; B, 12.4. Found (percent: C, 2.7; H, 1.1; B, 12.8.

EXAMPLE 39

(A) Gaseous chlorine is bubbled through a solution consisting of 0.5 g. of $B_{12}H_{10} \cdot 2CO$ and 25 ml. of water. An exothermic reaction occurs and the temperature of the solution rises to a maximum of about 50° C. before subsiding. The solution is now heated to 90-100° C. and passage of chlorine gas is continued until the solution shows the color of excess chlorine. The reaction mixture is now cooled and an excess of an aqueous solution of $(CH_3)_4NCl$ is added. A white precipitate forms which redissolves when the solution is heated. The hot solution is cooled and the crystalline solid which forms is separated by filtration to obtain 1.5 g. of $[(CH_3)_4N]_2B_{12}H_2Cl_8(COOH)_2$ The infrared spectrum of the compound shows major absorption bands at the following wavelengths (expressed as microns): 5.95; 6.05, 6.75, 7.8, 9.6, 10.55, 11.65 and 13.85.

Analysis.—Calc'd for $[(CH_3)_4N]_2B_{12}H_2Cl_8(COOH)_2$ (percent): C, 18.4; H, 4.0; N, 4.3; B, 20.0; Cl, 43.5. Found (percent): C, 17.7; H, 4.2; N, 4.4; B, 19.5; Cl, 44.7.

(B) A reaction vessel is charged with 0.5 g. of $B_{12}H_{10} \cdot 2CO$ and 25 ml. of water. A solution forms and to it 4.5 g. of iodine is added with stirring. The solution is refluxed for 2 hours, cooled to atmospheric temperature and filtered to remove undissolved iodine. The filtrate is heated to boiling and nitrogen gas is bubbled through it to remove unreacted dissolved iodine. A small quantity of mercury is added to the solution followed by a small quantity of zinc dust to remove the last traces of unreacted iodine. The solution which is nearly colorless is filtered and an aqueous solution of $(CH_3)_4NCl$ is added to the filtrate. A white solid is formed which redissolves on heating the solution to boiling. The solution is now chilled and the crystals which form are separated. The crystalline product is redissolved in a minimum amount (about 30 ml.) of hot water to form a clear solution. On cooling to atmospheric temperature a small quantity (0.2 g.) of $(CH_3)_4NI$ separates which is removed by filtration. The filtrate is chilled to about 0° C. or or less and the solid which forms is separated, washed and dried to yield a mixture of $[(CH_3)_4N_2]B_{12}H_7I_3(COOH)_2$ and $(CH_3)_4NI$ in a molar ratio of 1:2.5. The infrared spectrum shows major absorption bands (expressed as cm.$^{-1}$) at 2500, 1650, 1250, 1050, and 940.

Analysis.—Calc'd for $[(CH_3)_4N]_2B_{12}H_7I_3(COOH)_2 \cdot 2.5(CH_3)_4NI$ (percent): C, 19.1; H, 5.1; B, 10.3; N, 5.0; I, 55.5. Found (percent): C, 18.7; H, 5.1; B, 9.9; N, 4.0; I, 54.8.

EXAMPLE 40

A reaction vessel is charged with 10 ml. of methanol and 0.5 g. of $B_{12}H_{10} \cdot 2CO$ is added with stirring. The reaction is exothermic and a solution forms. The solution is warmed to incipient refluxing for about 30 minutes. A solution consisting of 1.0 g. of $(CH_3)_4NCl$ in 20 ml. of methanol is added with stirring and a solid product forms. The solid does not redissolve on heating even with the addition of more methanol. The slurry is chilled and the solid product is separated by filtration. It is washed and dried to obtain 0.9 g. of $[(CH_3)_4N]_2B_{12}H_{10}[C(O)OCH_3]_2$ The infrared spectrum of the compounds shows absorption bands at the following wavelengths (expressed as cm.$^{-1}$): 2500, 1660, 1480, 1200, 1070, 1040, 1000-1015, 950, 885, 760, and 730.

Analysis.—Calc'd for $[(CH_3)_4N]_2B_{12}H_{10}[C(O)OCH_3]_2$ (percent) C, 35.5; H, 9.9; B, 32.0; N, 6.9. Found (percent): C, 35.1; H, 10.0; B, 31.9; N, 7.0.

EXAMPLE 41

(A) A reaction vessel is charged with 1 g. of $B_{12}H_{10} \cdot 2CO$ and the vessel and contents are cooled to about $-80°$ C. Pressure in the vessel is reduced to a very low value and about 25 ml. of liquid ammonia is condensed into the vessel. A white slurry forms and it is allowed to warm gradually to permit excess ammonia to evaporate. A white solid remains which is $(NH_4)_2B_{12}H_{10}[C(O)NH_2]_2$. The solid is held under a reduced pressure of about $10^{-3}$ mm. Hg at prevailing atomspheric temperature to remove the last traces of unreacted ammonia. The infrared spectrum of the compound shows characterizing bands at the following wavelengths (expressed as cm.$^{-1}$): 3450, 3300, 3200, 2500, 1625, 1500, 1430, 1400, 1100, 1050, 1010, 865, 815, 725 and 670. The ammonium salt is very soluble in water.

Analysis.—Calc'd for $(NH_4)_2B_{12}H_{10}[C(O)NH_2]_2$ (percent): B, 49.2; N, 21.2; C, 9.1; H, 8.4. Found (percent): B, 48.8; N, 21.2; C, 9.4; H, 8.5.

The ammonium salt is dissolved in water and the aqueous solution is passed through a column filled with an acid ion-exchange resin to obtain the acid, $H_2B_{12}H_{10}[C(O)NH_2]_2$.

Aqueous solutions of this acid are reacted with CsOH, $(CH_3)_4NOH$ and $(CH_3)_3SOH$ to form, respectively, $Cs_2B_{12}H_{10}[C(O)NH_2]_2$, $[(CH_3)_4N]_2B_{12}H_{10}[C(O)NH_2]_2$ and $[(CH_3)_3S]_2B_{12}H_{10}[C(O)NH_2]_2$. The salts are white, crystalline, highly water-soluble compounds.

(B) A portion of the ammonium salt obtained in Part A is dissolved in a small quantity of water. The solution is made basic by addition of a small quantity of $NH_4OH$ and an aqueous solution of CsCl is added in excess. Crude $Cs_2B_{12}H_{10}[C(O)NH_2]_2$ precipitates and it can be separated if desired. Alternatively, the mixture is heated to boiling for a few minutes and the solution is chilled. A white crystalline product then separates which is a hydrate of $Cs_2B_{12}H_{10}[C(O)OH][C(O)NH_2]$. The compound is called dicesium monocarboxymonocarbamyldecahydrododecaborate(2$-$). Its infrared spectrum contains the following characteristics absorption bands (wavelengths expressed as cm.$^{-1}$): 3600, 3500, 3400, 1640, 1600, 1575, 1525, 1340, 1260, 1200, 1060, 1010, 910, 850, 735, and 695.

Analysis.—Calc'd for $Cs_2B_{12}H_{10}(COOH)(CONH_2 \cdot H_2O$ (percent): Cs, 51.8; B, 25.4; H, 2.9; C, 4.7; N, 2.7. Found (percent): Cs, 51.0; B, 25.8; H, 3.0; C, 5.1; N, 2.9.

(C) A reaction vessel is charged with 0.5 g. of $B_{12}H_{10} \cdot 2CO$ and 10 ml. of anhydrous benzene. The mixture is stirred and 3.0 ml. of freshly dried and distilled piperidine is added. A mildly exothermic reaction occurs and a white solid separates which does not redissolve on heating even after a further addition of 10 ml. of benzene. The mixture is now chilled, the solid is separated by filtration, washed with benzene and dried to obtain di(piperidinium) di(N-pentamethylenecarbamyl) decahydrododecaborate (2⁻). The compound is further purified by recrystallization from aqueous ethanol. The infrared spectrum of the compound shows major absorption bands at the following wavelengths (expressed as cm.⁻¹): 2500, 1610, 1480, 1250, 1160, 1035, 1025, 980, and 685.

*Analysis.*—Calc'd for

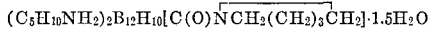

$(C_5H_{10}NH_2)_2B_{12}H_{10}[C(O)NCH_2(CH_2)_3CH_2]\cdot 1.5H_2O$ (percent): C, 46.9; H, 10.2; B, 23.0; N, 10.0. Found (percent): C, 43.5; H, 10.3; B, 23.0; N, 10.0.

EXAMPLE 42

A solution is prepared consisting of 0.5 g. of

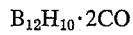

$B_{12}H_{10}\cdot 2CO$ and 10 ml. of anhydrous $CH_3CN$. To this solution is added with stirring 2 ml. of freshly dried $C_6H_5N(CH_3)_2$. This solution is warmed to incipient reflux temperature for 30 minutes and it becomes yellow, then green and finally orange in color. Acetonitrile is removed by evaporation and the oil which remains is dissolved in aqueous ethanol. A small quantity of aqueous NaOH solution is added to make the mixture strongly basic. An aqueous solution of CsF is added in excess and the solution is chilled. Tan needles of $Cs_2B_{12}H_{10}[C(O)C_6H_4N(CH_3)_2]_2$ form which are separated and recrystallized from water. The infrared spectrum of the compound shows absorption bands at the following wavelengths (expressed as cm.⁻¹): 2500, 1600, 1560, 1530, 1300, 1250, 1185, 1170, 1120, 1060, 1035, 945, 920, 845, 820, 746, and 725.

*Analysis.*—Calc'd for $Cs_2B_{12}H_{10}[C(O)C_6H_4N(CH_3)_2]_2$ (percent): Cs, 37.8; B, 18.5; H, 4.3; C, 30.8; N, 4.0. Found (percent): Cs, 35.4; B, 18.2; H, 4.8; C, 30.8; N, 4.1.

EXAMPLE 43

(A) A reaction vessel is charged with 20 ml. of dry xylene and 0.5 g. of $B_{12}H_{10}(CO)_2$. The solution is stirred and 0.53 ml. of diethyl mercury is added gradually. The clear solution which forms is heated to refluxing and a white solid, which is $(C_2H_5Hg)_2B_{12}H_{10}[C(O)C_2H_5]_2$, separates. The suspension of solid and liquid is maintained at incipient reflux temperature for 30 minutes and the mixture is then allowed to cool to about 25° C. The solid is separated and washed thoroughly with dry xylene and dry ether. The washed product is dried at very low pressure (about 10⁻³ mm. Hg) at atmospheric temperature to obtain pure $(C_2H_5Hg)_2B_{12}H_{10}[C(O)C_2H_5]_2$. The infrared spectrum of the compound shows absorption bands at the following wavelengths (expressed as cm.⁻¹): 2450, 1550, 1330, 1160, 1100, 1070, 940, and 710.

*Analysis.*—Calc'd for $(C_2H_5Hg)_2B_{12}H_{10}[C(O)C_2H_5]_2$ (percent): Hg, 56.2; B, 18.2. Found (percent): Hg, 54.0; B, 19.3.

(B) A portion of the mercury salt of Part A is suspended in aqueous alcohol and the suspension is heated to refluxing. Hydrogen sulfide is bubbled through the hot liquid and mercury sulfide precipitates. The mixture is filtered and the filtrate is partially evaporated. The residual liquid is mixed with an excess of aqueous $(CH_3)_4NCl$ solution and the solution is concentrated to a small volume. Chilling of the solution results in precipitation of  $[(CH_3)_4N]_2B_{12}H_{10}[C(O)C_2H_5]_2$. The product is separated by filtration and dried as described in Part A. The infrared spectrum of the compound shows absorption bands at the following wavelengths (expressed as cm.⁻¹): 2500, 1630, 1490, 1400, 1160, 1075, 950, and 725.

(C) A second portion of the mercury salt of Part A is suspended in about 20 ml. of ethanol. Liquid bromine is added dropwise and with stirring. The reaction is exothermic and care is exercised during the addition of the bromine. When the vigor of the reaction subsides the mixture is heated to reflux temperature and addition of bromine is continued until an excess of bromine is present as shown by the color of the solution. Chlorine gas is now bubbled through the refluxing solution for 30 minutes after which nitrogen gas is bubbled through the mixture to remove unreacted halogens. An excess of aqueous $(CH_3)_4NCl$ solution is added, the mixture is heated to boiling and portions of alcohol and water are added in sufficient amount to form a clear solution. The solution is chilled and a solid product precipitates. It is separated, dried, extracted with boiling alcohol and then with boiling water. The residue is suspended in hot aqueous alcohol and hydrogen sulfide is passed into the suspension to precipitate mercury as the sulfide. The hot solution is filtered and the filtrate is chilled to precipitate

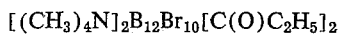

$[(CH_3)_4N]_2B_{12}Br_{10}[C(O)C_2H_5]_2$

The infrared spectrum of the compound shows absorption bands at the following wavelengths (expressed as cm.⁻¹): 1650, 1150, 1110, 1055, 990, 950, 880, 845, and 720.

EXAMPLE 44

(A) The procedure of Example 43, Part A, is repeated employing a solution of 0.5 g. of $B_{12}H_{10}(CO)_2$ in 20 ml. of dry xylene and 2.0 g. of $(C_6H_5)_2Hg$. The mercury salt which is obtained has the formula

$(C_6H_5Hg)_2B_{12}H_{10}[C(O)C_6H_5]_2$

The infrared spectrum of the compound comprises the following absorption bands (expressed as cm.⁻¹): 2500, 1590, 1525, 1250, 1180, 1025, 845, 765, and 690.

(B) The mercury salt of Part A is processed as described in Example 43, Part C to obtain

$[(CH_3)_4N]_2B_{12}Br_{10}[C(O)C_6H_5]_2$

The infrared spectrum of the compound contains absorption bands at the following wavelengths (expressed as cm.⁻¹): 1620, 1280, 1185, 990, 950, 850, 770, and 705.

The process illustrated in Examples 43 and 44 is generic for the preparation of compounds of Formula 1 in which X is a carbacyl group, i.e., RC(O). By employing the appropriate mercurials and $B_{12}H_{10}(CO)_2$, compounds such as $(NH_4)_2B_{12}H_{10}[C(O)C_6H_{11}]_2$,

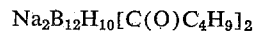

$Na_2B_{12}H_{10}[C(O)C_4H_9]_2$ $Cs_2B_{12}H_{10}[C(O)C_6H_4CH_3]_2$, and the like can be obtained. Modifications of the process can be made, e.g., other organometallics can be employed in place of the organomercurials as reactants.

EXAMPLE 45

(A) A solution is prepared consisting of 5.6 g. of $Na_2B_{12}H_{12}\cdot 2H_2O$ (.025 mole), 2.82 g. of $H_2NOSO_3H$ (0.025 mole), and 50 ml. of water. The solution is neutralized to a pH of 7 with aqueous NaOH solution, and it is then refluxed for 1.5 hours. The solution is evaporated under reduced pressure and the residue is mixed with an aqueous solution of $(CH_3)_4NCl$. A white solid forms which is separated to obtain 3 g. of crude

$(CH_3)_4NHB_{12}H_{11}NH_2$ which can also be written as $(CH_3)_4NB_{12}H_{11}NH_3$ to show the close association of the acidic proton with the —$NH_2$ substituent. The product is recrystallized four times from water and is obtained as beautiful white plates. The infrared spectrum shows characterizing absorption bands at 3240 and 1580 cm.⁻¹ as well as other characterizing bands for the dodecaborate cage.

*Analysis.*—Calc'd for $(CH_3)_4NHB_{12}H_{11}NH_2$ (percent): C, 20.8; H, 11.3; B, 55.9; N, 12.7. Found (percent): C, 20.2; H, 11.2; B, 55.2; N, 12.2.

(B) An aqueous solution $Cs_2B_{12}H_{11}COOH$ (see Example 38, Part A) is prepared and there is added to it with stirring an excess of an aqueous solution of $H_2NOSO_3H$. Gas evolves spontaneously from the reaction mixture. After gas evolution ceases, the mixture is chilled and colorless needles separate from the solution. The needles are removed by filtration, washed and dried to obtain $CsHB_{12}H_{11}NH_2$ in pure form. The infrared spectrum of the product shows characterizing absorption bands as follows (expressed as microns): 3.05, 4.0, 6.3, 7.1, 9.4, 9.8, and 13.8. The compound can also be written as $$CsB_{12}H_{11}NH_3$$

to show the close association of the acidic proton with the —$NH_2$ group.

(C) A solution of 67 g. of $Na_2B_{12}H_{12} \cdot 2H_2O$ and 100 g. of $H_2NOSO_3H$ in 250 ml. of water is neutralized by adding, at a temperature below 25° C. a solution of 36 g. of sodium hydroxide in 100 ml. of water. The solution is heated cautiously until an exothermic reaction begins (at about 70° C.). The mixture is then cooled to moderate the reaction which continues for about 30 minutes. The solution is now cooled to about 5° C. and the precipitate which forms is separated to obtain 9 g. of $H_2B_{12}H_{10}(NH_2)_2$ as a white crystalline solid. Concentration of the filtrate to about one-half of its original volume and cooling yields an additional 7 g. of product (referred to as the second fraction).

The first fraction is recrystallized twice from water to obtain a very sparingly soluble crystalline product.

*Analysis.*—Cal'd for $H_2B_{12}H_{10}(NH_2)_2$ (percent): B, 74.6; H, 9.3; N, 16.1. Found (percent): B, 74.8; H, 9.2; N, 15.8.

The second fraction of crystals are recrystallized from a relatively small volume of water to obtain a more soluble crystalline product.

*Analysis.*—Found (percent): B, 74.6; H, 8.5; N, 15.3.

The two fractions isolated and purified as described above are isomeric forms of $H_2B_{12}H_{10}(NH_2)_2$. The two isomers differ in their solubility in water. The compound can also be written as $B_{12}H_{10}(NH_3)_2$ to show the close association of the protons with the amine substituents.

(D) An aqueous solution of $H_2B_{12}H_{10}(COOH)_2$ is mixed with an aqueous solution of hydroxylamine-O-sulfonic acid. A gas ($CO_2$) is evolved and a solid precipitates which is separated by filtration. It is washed and dried to obtain $H_2B_{12}H_{10}(NH_2)_2$. The identity of the compound is confirmed by its infrared absorption spectrum which shows characterizing bands at 9.4μ and 10.5μ. The intensities of these bands are reversed from the intensities of the corresponding bands of the compounds obtained in Part C, showing a different distribution of isomers in the products made by the two methods.

Additional examples of products of the invention which can be obtained by the amination procedure of Example 45, are given in Table III. In each instance the boron-containing reactant of column 1 and the hydroxylamino-O-sulfonic acid of column 2, neutralized with the base of column 3, are reacted preferably in aqueous solution at a temperature between about 60° C. and 100° C., to give the product or products of column 4. When both monoaminated and diaminated compounds are possible products, i.e., when either one or two amino groups (NRR′) can be introduced, the major product is determined by the ratio of the reactants. The acids of the diamino-substituted anions shown in column 4 are obtained by passing the salts, bearing cations of the bases shown in column 3 through an acid ion-exchange resin, as described earlier.

TABLE III

| Column 1 | Column 2 | Column 3 | Column 4 |
|---|---|---|---|
| Boron-containing reactant | Hydroxylamine-o-sulfonic acid | Neutralizing agent | Product or products |
| $H_2B_{12}H_6Cl_6$ | $H_2NOSO_3H$ | NaOH | $NaHB_{12}H_5Cl_6NH_2$ <br> $H_2B_{12}H_4Cl_6(NH_2)_2$ |
| $CaB_{12}H_{11}I$ | $CH_3NHOSO_3H$ | $Ca(OH)_2$ | $Ca(HB_{12}H_{10}INHCH_3)_2$ <br> $H_2B_{12}H_9I(NHCH_3)_2$ |
| $(NH_4)_2B_{12}H_{10}C_2H_5)_2$ | $H_2NOSO_3H$ | $NH_4OH$ | $NH_4HB_{12}H_9(C_2H_5)_2NH_2$ <br> $H_2B_{12}H_8(C_2H_5)_2(NH_2)_2$ |
| $BaB_{12}H_{11}OCH_2CH_2C_6H_5$ | $C_4H_9NHOSO_3H$ | $Ba(OH)_2$ | $Ba[HB_{12}H_{10}(OCH_2CH_2C_6H_5)NHC_4H_9]_2$ <br> $H_2B_{12}H_9(OCH_2CH_2C_6H_5)(NHC_4H_9)_2$ |
| $MgB_{12}H_{11}SC_4H_9$ | $C_2H_5NHOSO_3H$ | NaOH | $Mg[HB_{12}H_{10}(SC_4H_9)(NHC_2H_5)]_2$ <br> $NaHB_{12}H_{10}(SC_4H_9)(NHC_2H_5)$ <br> $H_2B_{12}H_9(SC_4H_9)(NHC_2H_5)_2$ |
| $Na_2B_{12}H_{11}C_{12}H_{25}$ | $H_2NOSO_3H$ | $Na_2CO_3$ | $NaHB_{12}H_{10}(C_{12}H_{25})(NH_2)$ <br> $H_2B_{12}H_9(C_{12}H_{25})(NH_2)_2$ |
| $(NH_4)_2B_{12}H_{11}OC_6H_5$ | $(C_2H_5)_2NOSO_3H$ | $NH_4OH$ | $NH_4HB_{12}H_{10}(OC_6H_5)[N(C_2H_5)_2]$ <br> $H_2B_{12}H_9(OC_6H_5)[N(C_2H_5)_2]_2$ |

The $NH_2$-substituted compounds can be N-alkylated by reaction with alkyl sulfates to obtain compounds of Formula 1 in which X is —$NR_2$. To illustrate, a mixture of $(CH_3)_4NHB_{12}H_{11}NH_2$ and water is heated to reflux temperature. Dialkyl sulfate [e.g., $(CH_3)_2SO_4$] and an aqueous NaOH solution are added to the mixture to form a slightly basic solution and the mixture is heated again to reflux temperature. Aqueous NaOH solution and dialkyl sulfate are added at intervals about every 15 minutes) during the period of refluxing. Finally, sufficient aqueous NaOH solution is added to make the solution alkaline and the the mixture is refluxed again for about one hour. The mixture is cooled and the solvent is removed for evaporation. The residue can, if desired, be divided into several portions. The portions are mixed with aqueous solution of salts, e.g. $(CH_3)_4NCl$, CsF, $TlNO_3$ and the like, to precipitate salts of the anion $B_{12}H_{11}NR_2^{-2}$. Examples of salts which can be obtained by the above procedure are $(CH_3)_4NHB_{12}H_{11}N(CH_3)_2$, $$CsHB_{12}H_{11}N(C_2H_5)_2, TlHB_{12}H_{11}N(C_2H_5)_2$$

and the like. These acid salts can be dissolved in aqueous alkaline solutions (e.g., NaOH) and the alkaline solutions can then be treated with a further quantity of the salts illustrated above to obtain normal salts.

EXAMPLE 46

(A) A mixture consisting of 10 g. of crystalline hydrated $(H_3O)_2B_{12}H_{12}$ and 25 g. of HCN is heated in a pressure vessel under autogenous pressure at 100° C. for 4 hours. The vessel is cooled, vented and the reaction mixture is blown with nitrogen to remove unreacted HCN. The viscous residue is neutralized with aqueous CsOH solution, and the cesium salt which precipitates is separated. It is recrystallized repeatedly from water to obtain a product whose elemental analysis shows that 1–2 moles of HCN have combined with each mole of $B_{12}H_{12}^{-2}$ anion. The analyses are: C, 4.31; H, 5.22; N, 4.59. The infrared spectrum of the product shows absorption at 2.8, 3.1 4.0, 6.15, 6.7 and 9.5μ.

(B) The process of part A is repeated five times, employing 15.0 g. of hydrated crystalline $(H_3O)_2B_{12}H_{12}$ and 30 g. HCN. The first batch is heated at 100° C. for 4 hours, the remaining batches at 110° C. for 4 hours.

The non-volatile residues of the five runs are combined and the combined product is processed as described in Part A to obtain 99 g. of product whose infrared spectrum shows absorption at 2.7, 3.1, 4.0, 6.1, 6.6, 7.5, 8.0, 9.5, 9.8, 11.2, 12.0 and 13.9μ. Elemental analyses are as follows; C, 5.6; H, 4.3; N, 5.3; B, 36.6. The product is a mixture containing $Cs_2B_{12}H_{10}(N=CH_2)_2$, $CsHB_{12}H_{10}(N=CH_2)(NHCH_3)$ and $CsHB_{12}H_{11}NHCH_3$ (C) A portion of the product obtained in Part A is dissolved in water and an aqueous solution of $(CH_3)_3SI$ is added with stirring. The precipitate which forms is separated and recrystallized to give a product which is predominantly $(CH_3)_3SHB_{12}H_{11}NHCH_3$. The acidic proton is closely associated with the methylamino group and the compound can also be written as $(CH_3)_3SB_{12}H_{11}NH_2CH_3$.

*Analysis.*—Calcd. for $(CH_3)_3SHB_{12}H_{11}NHCH_3$ (percent): C, 19.2; H, 10.0; S, 12.8; N, 5.7. Found (percent): C, 18.2; H, 9.5; S, 12.9; N, 6.5.

(D) A second portion of the product obtained in part A is dissolved in water and an aqueous solution of $TlNO_3$ is added with stirring. The precipitate is purified as described in part C to obtain $TlHB_{12}H_{11}NHCH_3$ or (to show the association of the acidic proton with the amine substituent) $TlB_{12}H_{11}NH_2CH_3$.

*Analysis.*—Calcd. for $TlHB_{12}H_{11}NHCH_3$ (percent): C, 3.2; H, 4.2; N, 3.8. Found (percent): C, 3.9; H, 3.6; N, 4.4.

(E) A mixture of 10 g. of hydrated crystalline $(H_3O)_2B_{12}H_{12}$ and 20 g. of HCN is heated in a pressure vessel under autogenous pressure for 4 hours at 80–83° C. The reaction mixture is processed as described in part A with the exception that it is neutralized with dilute aqueous NaOH solution. An aqueous 50% CsF solution is added to the neutralized solution and the cesium salt which separates is purified by crystallization from water. Elemental analyses suggest that the compound is principally $CsHB_{12}H_{11}N=CH_2$.

*Analysis.*—Calcd. for $CsHB_{12}H_{11}N=CH_2$ (percent): C, 4.0; H, 3.1; N, 4.6. Found (percent): C, 4.3; H, 4.4; N, 4.1.

(F) A portion of the above product is dissolved in water and the solution is passed through a column filled with a sodium ion-exchange resin. The aqueous effluent is mixed with $(CH_3)_4NCl$ and $(CH_3)_4NOH$. The precipitate is separated and purified as described earlier to obtain the tetramethylammonium acid salt.

*Analysis.*—Calcd. for $(CH_3)_4NHB_{12}H_{11}N=CH_2$ (percent): C, 25.8; H, 10.0; N, 13.5. Found (percent): C, 26.1; H, 10.9; N, 11.6.

EXAMPLE 47

(A) A solution of 1.4 g. of $B_{12}H_{10}\cdot 2CO$ in 30 ml. of acetonitrile is added with stirring to a solution of 1.5 g. of sodium azide in 50 ml. of acetonitrile. Nitrogen gas (350 ml.) is evolved rapidly. After gas evolution has ceased, the reaction mixture is filtered and the filtrate is evaporated by a stream of air until a viscous syrup remains. The syrup is diluted with water and an aqueous solution of $(CH_3)_4NCl$ is added with stirring. A white precipitate forms which is separated to obtain $[(CH_3)_4N]_2B_{12}H_{10}(NCO)_2$ The product is recrystallized from water to yield 2.3 g. of white crystalline compound of Formula 1 bearing isocyanate substituents.

*Analysis.*—Calcd. for $[(CH_3)_4N]_2B_{12}H_{10}(NCO)_2$ (percent): B, 34.88; C, 32.26; H, 9.21; N, 15.05. Found (percent): B, 34.79; C, 32.23; H, 9.14; N, 15.23.

The infrared absorption spectrum of the compound shows a strong band at 4.35 microns, characteristic of the —NCO group.

(B) Gaseous chlorine is bubbled through an aqueous solution of 0.5 g. of $B_{12}H_{10}\cdot 2CO$ as described in Example 39. After chlorination is complete, the solution is evaporated to dryness in a sublimation unit and the residue is sublimed at 0.003 mm. Hg pressure to obtain 0.92 g. of sublimate on the water cooled condenser. A portion (0.5 g.) of the sublimate is dissolved in 5 ml. of dry $CH_3CN$ and a suspension of 0.5 g. of $NaN_3$ in 5 ml. of $CH_3CN$ is added to the solution with stirring. A mild exothermic reaction occurs and a gas is evolved. The mixture is heated to incipient reflux temperature for 1 hour and it is then evaporated to dryness. The residue is dissolved in water and an aqueous solution of $(CH_3)_4NCl$ is added in excess. The precipitate which forms is separated and heated to boiling with 60 ml. of water. The solid dissolves partially and the hot mixture is filtered. The filtrate is chilled and a total of 0.45 g. of a solid precipitates. The compound, which is $[(CH_3)_4N]_2B_{12}HCl_9(NCO)_2$ is separated, washed and dried. Its infrared spectrum shows major absorption bands at the following wavelengths (expressed as cm.$^{-1}$): 2300, 1700, 1480, 1280, 1060, 945, 855, and 725.

*Analysis.*—Calcd. for $[(CH_3)_4N]B_{12}HCl_9(NCO)_2$ (percent): C, 17.6; H, 3.7; B, 19.1; Cl, 46.8; N, 8.2. Found (percent): C, 17.6; H, 4.1; B, 19.2; Cl, 45.6; N, 7.0.

EXAMPLE 48

A suspension of $[(CH_3)_4N]_2B_{12}H_{10}(NCO)_2$ in absolute ethanol is saturated with dry hydrogen chloride. Heat is evolved and the solid dissolves. After the heat of the reaction subsides, the clear solution is evaporated to dryness and the residue is dissolved in water. Sufficient aqueous solution of $(CH_3)_4NOH$ is added to the clear solution to form a neutral mixture. The mixture is evaporated to dryness and the solid residue is dissolved in hot ethanol containing a small quantity of water. The hot solution is chilled to obtain a crystalline product which is separated to yield 0.5 g. of $[(CH_3)_4N]_2B_{12}H_{10}[NHC(O)OC_2H_5]_2$ The infrared spectrum of the compound shows major absorption bands at the following wavelengths (expressed as cm.$^{-1}$): 3380, 2460, 1700, 1460, 1330, 1300, 1280, 1205, 1160, 1090, 1055, 1020, 1010, 965, 950, 890, 870, 825, 795, 780, 725 and 860.

*Analysis.*—Calcd. for $[(CH_3)_4N]_2B_{12}H_{10}[NHC(O)OC_2H_5]_2$ (percent): C, 36.2; H, 10.1; B, 27.9; N, 12.1. Found (percent): C, 36.3; H, 10.4; B, 28.2; N, 12.2.

The preceding examples illustrate broadly the substitution, replacement and metathetic reactions which the $B_{12}H_{12}^{-2}$ anion undergoes, employing techniques which are in many cases appropriate for effecting replacement of hydrogen bonded to carbon of a benzene nucleus. The substitution reactions used for carbocyclic aromatic compounds may be employed or modifications of these reactions can be used. Versatile intermediates, illustrated in the examples, are employed in many cases. Thus, dodecaborate derivatives bearing sulfo groups (—$SO_3H$) may be obtained by reacting dihydrogen dodecahydrododecaborate (2−) with a sulfonating agent, e.g., chlorosulfonic acid, liquid sulfur trioxide, fuming sulfuric acid and the like. The sulfo-substituted products, e.g., $H_2B_{12}H_{11}SO_3H$ can be neutralized with bases or basic salts (NaOH, $Na_2CO_3$, $NH_4OH$, $NH_2NH_2$, and the like) to obtain salts such as $Na_2B_{12}H_{11}SO_3Na$, $(NH_4)_2B_{12}H_{11}SO_3NH_4$, and $(NH_2NH_3)_2B_{12}H_{11}SO_3NH_3NH_2$. Compounds bearing sulfonic groups can be reacted with phosphorus halides, e.g., $PCl_5$, to obtain products bearing sulfonyl chloride groups, as illustrated by the compound $H_2B_{12}H_{11}SO_2Cl$. The sulfonyl chlorides can be reacted with ammonia or amines to obtain products bearing sulfamyl groups, e.g., $(NH_4)_2B_{12}H_{11}SO_2NH_2$ and $$[(CH_3)_2NH_2]_2B_{12}H_{11}SO_2N(CH_3)_2$$

Compounds bearing amine, hydroxyl and isocyanate groups have been described in the examples. The substituent groups in these compounds, i.e., the —$NH_2$, —OH, and —NCO groups, undergo the same or similar types of reactions as their counterparts in organic chemistry. Thus, the organic chemistry of aromatic amines, phenols and isocyanates can be applied to the corresponding boron compounds to obtain a broad range of products bearing desired substituents. To illustrate, a compound bearing —$NH_2$ groups can be reacted with (1) an isocyanate to form products having ureido or ureylene substituents, e.g., $Na_2B_{12}H_{10}(NH_2)_2$ is reacted with $C_6H_5NCO$ to form $Na_2B_{12}H_{10}[NHC(O)NHC_6H_5]_2$, (2) with isothiocyanates to obtain products bearing thioureido or thioureylene groups, $Na_2B_{12}H_{10}(NH_2)_2$ can be reacted with $C_3H_5NCS$ to obtain $Na_2B_{12}H_{10}[NHC(S)NHC_3H_5]_2$, (3) with sulfonyl chlorides to obtain products which bear sulfamino groups, e.g., $Na_2B_{12}H_{10}(NH_2)_2$ can be reacted with $$C_6H_5SO_2Cl$$

to obtain $Na_2B_{12}H_{10}(NHSO_2C_6H_5)_2$, and (4) with oxiranes to obtain hydroxyhydrocarbylamino-substituted compounds, e.g., $Na_2B_{12}H_{10}(NH_2)_2$ can be reacted with glycidol to obtain $Na_2B_{12}H_{10}[NHCH_2CH(OH)CH_2OH]_2$.

The amino-substituted dodecaborates can be reacted, as described earlier, with acid anhydrides or carbacyl halides to form compounds having amide groups bonded through the nitrogen to the dodecaborate anion. To illustrate, $H_2B_{12}H_{10}(NH_2)_2$ can be reacted with acetic anhydride to form $H_2B_{12}H_{10}[NHC(O)CH_3]_2$, with $$C_6H_5C(O)Cl$$

to form $H_2B_{12}H_{10}[NHC(O)C_6H_5]_2$ and the like.

As further illustrations, compounds of the invention which bear —OH groups can be reacted, as described above for the amine-substituted compounds, with isocyanates, isothiocyanates, carbacyl halides, carbamyl halides, sulfonyl halides and oxiranes to obtain products which bear, e.g., N-substituted carbamoyloxy groups $$[RNHC(O)O— \text{ and } R_2NC(O)O—]$$

N-substituted thiocarbamoyloxy groups $[RNHC(S)O—$ and $R_2NC(S)O—]$, hydrocarbonyloxy groups $$[RC(O)O—]$$

sulfonyloxy groups $[RS(O)_2O—]$ and hydroxyl-bearing ether groups. To illustrate, by reacting $Cs_2B_{12}H_{11}OH$ (1) with $C_2H_5NCO$, the compound $Cs_2B_{12}H_{11}OC(O)NHC_2H_5$ can be obtained, (2) with $C_6H_5NCS$, the compound $Cs_2B_{12}H_{11}OC(S)NHC_6H_5$ can be obtained, (3) with acetyl chloride, the compound $Cs_2B_{12}H_{11}OC(O)CH_3$ can be obtained (4) with $CH_3C_6H_4SO_2Cl$, the compound $$Cs_2B_{12}H_{11}OSO_2C_6H_4CH_3$$

can be obtained and (5) with ethylene oxide, the compound $Cs_2B_{12}H_{11}OCH_2CH_2OH$ can be obtained.

The preparation of compounds bearing from 1–12 hydroxyl groups was lilustrated earlier in the examples. These products provide a fertile source of reagents to obtain compounds of Formula 1 bearing from 1–12 substituents by reactions which have been described above.

Compounds of Formula 1 in which X represents one or more —NCO groups can be reacted with alcohols, mercaptans, ammonia, amines, and the like to obtain products bearing —NHC(O)OR, —NHC(O)SR, —NHC(O)$NH_2$, —NHC(O)NHR, —NHC(O)$NR_2$, and like substituents.

The nitro-substituted dodecaborate compounds can be reduced with hydrogen to amino-substituted dodecaborates, i.e., compounds of the general formula $M_a[B_{12}H_{12-y}(NH_2)_y]_b$, where M, a, b and y are defined as in Formula 1. Conventional processes employing iron and a mineral acid are satisfactory for use in the reduction step. To illustrate, by reduction of the appropriate nitro derivative, there can be obtained $$(NH_4)_2B_{12}Cl_6(NH_2)_6$$

$Na_2B_{12}H_6(NH_2)_6$, $Cs_2B_{12}H_9(NH_2)_3$, $[CCH_3)_4]_2H_{11}NH_2$, and the like.

Acids of the formula $H_2B_{12}H_{12-y}X_y$ are obtained as described earlier, most conveniently by contacting an aqueous solution of a dodecaborate (2−) salt with an acid ion-exchange resin. The hydrogen ions, i.e., $(H^+)_2$, are considered to be hydrated in aqueous solution and they are generally referred to as hydronium ions, i.e., $(H_3O^+)_2$. The terms "hydrogen ion" and "hydronium ion," are employed herein in their generic sense as defined on p. 26 of "Nomenclature of Inorganic Chemistry—International Union of Pure and Applied Chemistry" which was referred to earlier.

In the operation of this process for preparing acids, aqueous or methanol solutions of dodecaborate (2−) salts are passed through a column filled with an acid ion-exchange resin of the crosslinked polystyrenesulfonic acid type. hese resins are available commercially. The aqueous or alcoholic effluents are solutions of the free acids. Careful concentration of the solutions and intensive drying of the liquid residues under low pressures and at moderate temperatures usually yields the acids as crystalline hydrates. However, for most purposes, it is convenient to use the acid in aqueous or alcoholic solutions and the acids are preferably stored in solution. By using the process as described above, the following acids can be obtained from the named representative dodecaborate salts.

| Dodecaborate salt: | Acid obtained in aqueous solution |
|---|---|
| $[(CH_3)_4N]_2B_{12}H_3Cl_7(OH)_2$ | $H_2B_{12}H_3Cl_7(OH)_2$. |
| $[(CH_3)_4N]_2B_{12}Cl_9(OH)_3$ | $H_2B_{12}Cl_9(OH)_3$. |
| $Cs_2B_{12}H_{10}(OC_3H_7)_2$ | $H_2B_{12}H_{10}(OC_3H_7)_2$. |
| $Cs_2B_{12}H_{11}SO_2C_6H_5$ | $HB_{12}H_{11}SO_2C_6H_5$. |
| $Cs_2B_{12}H_6Cl_2(CN)_4$ | $H_2B_{12}H_6Cl_2(CN)_4$. |
| $Cs_2B_{12}H_4Cl_7SH$ | $H_2B_{12}H_4Cl_7SH$. |
| $Cs_2B_{12}H_8F_4$ | $H_2B_{12}H_8F_4$. |
| $[(CH_3)_4N]_2B_{12}H_{11}Cl$ | $H_2B_{12}H_{11}Cl$. |
| $Cs_2B_{12}Cl_{12}$ | $H_2B_{12}Cl_{12}$. |
| $[(CH_3)_3S]_2B_{12}H_6Br_6$ | $H_2B_{12}H_6Br_6$. |
| $Cs_2B_{12}Br_{11}OH$ | $H_2B_{12}Br_{11}OH$. |
| $[(CH_3)_4N]_2B_{12}Br_{12}$ | $H_2B_{12}Br_{12}$. |
| $Cs_2B_{12}I_{12}$ | $H_2B_{12}I_{12}$. |
| $Cs_2B_{12}H_{11}SCH_3$ | $H_2B_{12}H_{11}SCH_3$. |
| $Cs_2B_{12}H_{11}C_6H_{11}$ | $H_2B_{12}H_{11}C_6H_{11}$. |
| $Cs_2B_{12}H_{10}[C(O)NH_2]_2$ | $H_2B_{12}H_{10}[C(O)NH_2]_2$. |
| $[(CH_3)_4N]_2B_{12}Cl_{10}(COOH)_2$ | $H_2B_{12}Cl_{10}(COOH)_2$. |
| $[(CH_3)_4N]_2B_{12}H_{10}[C(O)OCH_3]_2$ | $H_2B_{12}H_{10}[C(O)OCH_3]_2$. |
| $Cs_2B_{12}H_{10}(CN)_2$ | $H_2B_{12}H_{10}(CN)_2$. |
| $Cs_2B_{12}H_{10}(NH_2)_2$ | $H_2B_{12}H_{10}(NH_2)_2$. |
| $Cs_2B_{12}H_{10}[N(CH_3)_2]_2$ | $H_2B_{12}H_{10}[N(CH_3)_2]_2$. |
| $Cs_2B_{12}H_2Br_{10}$ | $H_2B_{12}H_2Br_{10}$. |

Metal salts of the invention can be prepared by neutralization of the acids, obtained as described above, in aqueous or alcohol solution with an aqueous solution or suspension of an inorganic base, e.g., an alkali or alkaline earth metal hydroxide. The resulting aqueous solution of the metal salt of the $(B_{12}H_{12-y}X_y)^{-2}$ anion is concentrated by evaporation of water or alcohol until the salt crystallizes out. In many cases the salt may precipitate during its preparation and evaporation of the solution is not necessary. The crystalline salt is dried under reduced pressure, e.g., 0.1 mm. of mercury, and moderately elevated temperature, e.g., 50–100° C. The metal salts frequently contain water of hydration which can be removed by heating for several hours at a temperature of about 200° C. under low pressure, e.g., 0.1 mm. of mercury or lower.

Water-insoluble heavy metal salts of the acids can be prepared by adding a water-soluble heavy metal salt, e.g., silver nitrate or mercuric nitrate, to an aqueous solution of the boron-containing acid. Silver salts can also be obtained by shaking aqueous solutions of the acids with freshly prepared silver oxide. The heavy metal salts precipitate as white or light-colored solids. The salts thus obtained are usually anhydrous.

Nitrates, carbonates, chlorides, or oxides of metals can be used to prepare the salts by the methods described earlier. Organic bases, e.g., amines, tetra-substituted ammonium hydroxides, phosphonium hydroxides, sulfonium hydroxides, arsonium hydroxides or halides, stibonium hydroxides or halides, aryldiazonium hydroxides or halides, amino acids (e.g. glycine), esters of amino acids, and similar types of bases can be employed. Heterocyclic bases, e.g., pyridine, quinoline, α,α′-dipyridyl, piperazine, pyrrolidine, phenazine, morpholine, thiamorpholine and the like, are operable to form salts.

The following table illustrates representative salts which can be obtained by neutralizing the acids with a base or an appropriate salt in aqueous solution (Table IV):

and $$HCF_2(CF_2)_7CH_2OH$$

to obtain fluoroalkoxy substituted dodecaborates, e.g., $$H_2B_{12}H_{10}[OCH_2(CF_2)_5CF_3]_2$$
$$H_2B_{12}H_{11}OCH_2(CF_2)_3CF_2H$$
$$H_2B_{12}H_{10}[OCH_2(CF_2)_5CF_2H]_2$$

$Li_2B_{12}H_{11}CH(CH_3)C_6H_5$, $CaB_{12}H_{11}C_3H_7$, $SrB_{12}I_{12}$ and $$H_2B_{12}H_{11}OCH_2(CF_2)_7CF_2H$$

Polychloropolyfluoroalkanols can be employed in the reaction, e.g., $ClF_2CCF_2CFClCF_2CF_2CH_2OH$, to obtain $H_2B_{12}H_{11}OCH_2CF_2CF_2CFClCF_2CF_2Cl$. Mono-cyano substituted compounds can be obtained by contacting the crude reaction product obtained in Example E with liquid ammonia to prepare $Cs_2B_{12}H_{11}C(O)NH_2$ and dehydrating the monoamide, as described in Example 37, part A, to obtain $Cs_2B_{12}H_{11}CN$. Reaction of this compound with $C_6H_5CH_2SSCH_2C_6H_5$, as described in Example 8, part A, will yield $Cs_2B_{12}H_9(SCH_2C_6H_5)_2CN$, a compound which can then be brominated as described in Example 3, part C, to obtain $Cs_2B_{12}H_3Br_6(SCH_2C_6H_5)_2CN$.

TABLE IV

| Acid | Neutralizing agent | Product |
|---|---|---|
| $H_2B_{12}H_{10}(NH_2)_2$ | LiOH | $Li_2B_{12}H_{10}(NH_2)_2$ |
| $H_2B_{12}H_{10}(NH_2)_2$ | $Ba(OH)_2$ | $BaB_{12}H_{10}(NH_2)_2$ |
| $H_2B_{12}H_3Cl_7(OH)_2$ | $MgCO_3$ | $MgB_{12}H_3Cl_7(OH)_2$ |
| $H_2B_{12}Cl_9(OH)_3$ | $La_2(CO_3)_3$ | $[La(H_2O)_6]_2[B_{12}Cl_9(OH)_3]_3$ |
| $H_2B_{12}H_{10}(OC_3H_7)_2$ | $Al(OH)_3$ | $[Al(H_2O)_6]_2[B_{12}H_{10}(OC_3H_7)_2]_3$ |
| $H_2B_{12}H_{11}SO_2C_6H_5$ | $MnCl_2$ | $Mn(H_2O)_6B_{12}H_{11}SO_2C_6H_5$ |
| $H_2B_{12}H_6Cl_2(CN)_4$ | $FeCl_3$ | $[Fe(H_2O)_6]_2[B_{12}H_6Cl_2(CN)_4]_3$ |
| $H_2B_{12}H_4Cl_7SH$ | $Co(OH)_2$ | $Co(H_2O)_6B_{12}H_4Cl_7SH$ |
| $H_2B_{12}H_8F_4$ | $Ni(OH)_2$ | $NiB_{12}H_8F_4$ |
| $H_2B_{12}H_{11}Cl$ | $Ag_2O$ | $Ag_2B_{12}H_{11}Cl$ |
| $H_2B_{12}Cl_{12}$ | CuO | $Cu(H_2O)_4B_{12}Cl_{12}$ |
| $H_2B_{12}H_6Br_6$ | $ZnCl_2$ | $Zn(H_2O)_4B_{12}H_6Br_6$ |
| $H_2B_{12}Br_{11}OH$ | $HgCl_2$ | $HgB_{12}Br_{11}OH$ |
| $H_2B_{12}Br_{12}$ | $AlCl_3 \cdot 6H_2O$ | $[Al(H_2O)_6]_2(B_{12}Br_{12})_3$ |
| $H_2B_{12}I_{12}$ | $SnCl_2$ | $SnB_{12}I_{12}$ |
| $H_2B_{12}H_{11}SCH_3$ | $PbCl_2$ | $PbB_{12}H_{11}SCH_3$ |
| $H_2B_{12}H_{11}C_6H_{11}$ | $EuCl_3$ | $[Eu(H_2O)_6]_2(B_{12}H_{11}C_6H_{11})_3$ |
| $H_2B_{12}H_8F_4$ | $NH_2NH_2$ | $(NH_2NH_3)_2B_{12}H_8F_4$ |
| $H_2B_{12}H_{10}[C(O)NH_2]_2$ | $(CH_3)_2NNH_2$ | $[(CH_3)_2NNH_3]B_{12}H_{10}C(O)NH_2]_2$ |
| $H_2B_{12}Cl_{12}$ | $(C_{18}H_{37})_2NH$ | $[(C_{18}H_{37})_2NH_1]_2B_{12}Cl_{12}$ |
| $H_2B_{12}H_{10}(CN)_2$ | $(C_6H_{11})_3N$ | $[(C_6H_{11})_3NH]_2B_{12}H_{10}(CN)_2$ |
| $H_2B_{12}Cl_{12}$ | $C_9H_7N$ (quinoline) | $[C_9H_7NH]_2B_{12}Cl_{12}$ |
| $H_2B_{12}Cl_{12}$ | ZnO | $ZnB_{12}Cl_{12}$ |
| $H_2B_{12}H_{10}(CN)_2$ | $Zn(NH_3)_4Cl_2$ | $Zn(NH_3)_4B_{12}H_{10}(CN)_2$ |
| $Cs_2B_{12}H_{11}SCH_3$ | $(CH_3)_3SOH$ | $[(CH_3)_3S]_2B_{12}H_{11}SCH_3$ |
| $H_2B_{12}Cl_{10}(COOH)_2$ | $C_6H_5N=NCl$ | $(C_6H_5N_2)_2B_{12}Cl_{10}(COOH)_2$ |
| $Cs_2B_{12}Br_{11}OH$ | $(C_4H_9)_4PCl$ | $[(C_4H_9)_4P]_2B_{12}Br_{11}OH$ |
| $H_2B_{12}Cl_{12}$ | $NH_2CH_2COOH$ | $(NH_3CH_2COOH)_2B_{12}Cl_{12}$ |
| $H_2B_{12}Cl_9(OH)_3$ | $CeCl_3$ | $[Ce(H_2O)_6]_2[B_{12}Cl_9(OH)_3]_3$ |
| $H_2B_{12}I_{12}$ | $C_5H_5NCl(C_{16}H_{33})$ | $[C_5H_5N(C_{16}H_{33})]_2B_{12}I_{12}$ |
| $H_2B_{12}H_{10}(CN)_2$ | $[Co(en)_3]Cl_2$ | $Co(en)_3B_{12}H_{10}(CN)_2$* |
| $H_2B_{12}Cl_{12}$ | $(CH_3)_4AsI$ | $[(CH_3)_4As]_2B_{12}Cl_{12}$ |
| $H_2B_{12}H_2Br_{10}$ | $AgNO_3$ | $Ag_2B_{12}H_2Br_{10}$ |

*en = ethylenediamine.

The process described above and illustrated in the examples are generic for the preparation of compounds of the invention as defined by Formula 1. The processes can be used alone or in combination to obtain the desired products. For example, $H_2S$ can be reacted, as described in Example 36; with hydrated $H_{12}B_{12}H_8Cl_4$ to obtain $H_2B_{12}H_6Cl_4(SH)_2$, with $H_2B_{12}H_8(OH)_4$ to obtain a mixture of thiol-substituted compounds, e.g.

$$H_2B_{12}H_4(OH)_4(SH)_4 \text{ and } H_2B_{12}H_6(OH)_4(SH)_2$$

with $H_2B_{12}H_{11}F$ to obtain $H_2B_{12}H_8F(SH)_3$ and with $H_2B_{12}H_{10}(OCH_3)_2$ to obtain $H_2B_{12}H_8(SH)_2(OCH_3)_2$. Similarly, hydrated $H_2B_{12}H_{12}$ can be reacted as described in Example 13, parts D and E, with long chain α,α-dihydro- and ω,α,α-trihydroperfluoroalkanols, e.g.

$$CF_3(CF_2)_5CH_2OH$$

$$HCF_2(CF_2)_3CH_2OH$$

$$HCF_2(CF_2)_5CH_2OH$$

Further examples which illustrate the products obtained by the described processes are $$[(C_2H_5)_3NH]_2B_{12}H_6F_6, Ag_2B_{12}F_{12}, Cs_2B_{12}F_{12}$$

$$ZnB_{12}Cl_{12} \cdot 7H_2O, [(C_6H_{13})_4N]_2B_{12}Cl_{12}$$

$$(H_3O)_2B_{12}H_2Br_{10} \cdot 6H_2O, (H_3O)_2B_{12}H_2Br_{10} \cdot 4H_2O$$

$$Na_2B_{12}Cl_{10}(COOH)_2, K_2B_{12}Cl_{10}(COOH)_2$$

$$Rb_2B_{12}Cl_{10}(COOH)_2, Na_2B_{12}N_{10}(NCO)_2$$

$$Li_2B_{12}H_{11}CH(CH_3)C_6H_5, CaB_{12}H_{11}C_3H_7, SrB_{12}I_{12}$$

and $$HgB_{12}Br_{12}$$

The illustrations in the preceding paragraphs demonstrate the generic nature of the processes and their versatility to obtain a wide range of products which fall within the scope of the compounds of the invention.

Utility

The invention provides a broad class of new boron compounds which find applications in many fields.

The compounds of the invention are generically useful as components of fireworks compositions to impart a pleasing color and sparkle to the display.

Each compound within the scope of Formula 1 contains an anion which has boron as a common component. The presence of this element imparts a green color to a fireworks, rocket or flare display. The compounds of the invention can have a wide range of cations, designated as M, and it is thus possible to provide a broad range of colors in any display or flare by choice of the appropriate cation. The compounds of the invention can be used in combination with oxidizing agents, e.g., lithium perchlorate, sodium nitrate, potassium permanganate, strontium peroxide, manganese dioxide, and the like, to provide the desired propulsive effect and color. The following combinations, in which the boron-containing compounds can be from 5–25% by weight of the composition, are illustrative of compositions which can be used:

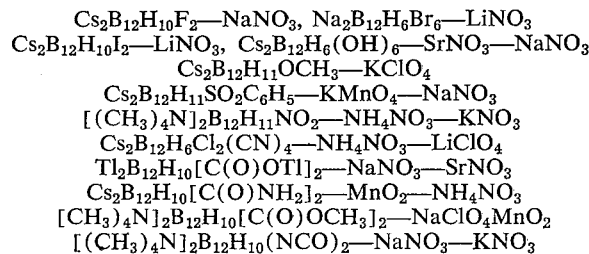

and the like. These examples are not limiting but are illustrative of types of compositions which are possible for use in the above field. Other ingredients can be and frequently are present in these combinations, e.g., carbon and sulfur.

The compounds of the invention are useful in the field of high energy fuels. For this purpose, partially substituted compounds are preferred, i.e., compounds having one to five substituents on the dodecarborate anion. The compounds can be used in combination with oxidizing agents, e.g., nitric acid, fluorine oxide and the like. They can be used in solution in hydrazine or N,N-dialkyl hydrazines, e.g., N,N-dimethylhydrazine. To illustrate, combinations which can be employed include $H_2B_{12}H_{10}[C(O)NH_2]_2$ in N,N-dimethylhydrazine, $(NH_2NH_3)_2B_{12}H_{11}OH$ in hydrazine and the like. The acids in the above examples form hydrazinium salts in solution and they are not present as the free acids. In compositions as described above the dodecaborate salt can be present in from about 5–50% by weight of the solutions.

The compounds of the invention, exclusive of the fully halogenated products, are useful as impregnating agents in the preparation of resistors. To illustrate, a section of a cotton string is immersed in a nearly saturated solution of $Na_2B_{12}H_{11}CH(CH_3)_2$ in aqueous alcohol. The string is withdrawn from the solution and the solvent is removed by drying in air. A free flame is applied to the dried impregnated string and it burns to yield a coherent ash which in size and shape resembles the original string. The residual skeleton is of sufficient coherence to permit embedding in parraffin. The section of residue, so treated, shows a resistance of about 300 ohms/cm. The residue from the control section of string is very small and shapeless and it cannot be handled.

Highly halogenated compounds, e.g., the salts of $B_{12}Br_{12}$ anion, are useful as impregnating agents for retarding the combustion of cellulosic products. To illustrate, filter paper which has been treated with an aqueous solution of $(NH_4)_2B_{12}Br_{12}$ and dried, does not burn freely when touched with a free flame.

The nitrated and nitroso-substituted compounds are useful as explosives or detonating agents.

In the group of compounds which fall within the scope of Formula 1, the component M represents a range of groups which are readily interchangeable by metathetic reactions as described earlier. All of the salts which fall within the scope of Formula 1 can be used to prepare the group of acids represented generically as $$H_2B_{12}H_{12-y}X_y$$

or, in aqueous solution, as $(H_3O)_2B_{12}H_{12-y}X_y$ by passing aqueous or alcoholic solutions of the salts through an acidic ion-exchange resin as described earlier. The acids of this group, exclusive of compounds in which X is an amine group, are strong acids and they are useful in industrial applications where it is desired to avoid contamination from sulfate, chloride, bromide, chlorate, phosphate, and like strong acid anions. Thus, the acids are useful for etching metals, such as steel, and for rust removal, for pickling, for scale removal and for similar metal processing operations.

The acids, described above, are useful as catalysts in the preparation of esters, e.g., in the reaction of alcohols and organic carboxylic acids, to improve the yields of the desired esters. The acids of the invention are employed for this purpose in the same manner as p-toluenesulfonic acid, sulfuric acid or alcoholic hydrogen chloride.

Aqueous solutions of the acids are generically useful as agents for absorbing noxious basic materials from the air, e.g., traces of ammonia, lower alkyl amines and the like. To illustrate, air contaminated with methylamines is passed through an aqueous solution of $H_2B_{12}H_{10}(OH)_2$, $H_2B_{12}H_{10}(OCH_3)_2$, $H_2B_{12}Cl_{12}$, and the like, and the amines are removed.

The acids and many of the salts, particularly the alkali metal and alkaline earth metal salts, are useful as sequestering agents for heavy metals. Thus, a mixture of hydrocarbons in the boiling range of gasoline which contains a copper salt of an organic acid (copper stearate), is thoroughly agitated with aqueous ammoniacal solutions of any of the alkali metal or alkaline earth metal salts of the anion $(B_{12}H_{12-y}X_y)^{-2}$, e.g., $Cs_2B_{12}H_{11}SO_2C_6H_5$, $$Na_2B_{12}H_{10}(OH)_2$$

The new compounds, particularly the acids, alkali and the like. The hydrocarbon layer, which is separated from the aqueous reagent, is completely free of deleterious copper salt.

The new compound, particularly the acids, alkali metal, alkaline earth metal and ammonia salts, are useful as sequestering agents for metals in aqueous media. Thus, copper, nickel, cobalt, zinc and cadmium are removed from aqueous solutions of salts containing these metals by mixing the solutions with ammoniacal solutions of the acids and alkali metal, alkaline earth metal and ammonium salts.

The substituted ammonium salts and, in general, all of the nitrogen-base salts as well as phosphonium and sulfonium salts are useful in the field of sequestering agents to remove undesirable metals from aqueous or hydrocarbon media.

To illustrate, a mixture of hydrocarbons in the boiling range of gasoline, which contains in solution a copper salt of an organic acid (copper stearate), is thoroughly agitated with an aqueous amomniacal solution of $$NaB_{12}H_2Cl_{10}$$

The hydrocarbon layer, which is separated from the aqueous reagent, is completely free of the deleterious copper salt. Similar results can be obtained employing $$[(CH_3)_4N]_2B_{12}H_{10}[OC(O)H]_2$$

$Cs_2B_{12}H_{11}OCH_2CH_2OCH_3$, and the like.

The compounds of the invention, especially in the form of salts, are useful as surface-active agents, particularly as wetting agents. To illustrate, a glass surface coated with a film of a silicone is not wetted when brought into contact with water. The addition of a small qauntity of dicesium cyclohexylundecahydrododecaborate to the water results in immediate wetting of the glass surface, i.e., the treated water spreads rapidly over the surface of the glass.

The silver salts, i.e., the compounds of Formula 1, where M is Ag, are sensitive to light and they are useful in the photographic arts. To illustrate, the cesium salt, $Cs_2B_{12}H_{11}OC(O)H$, is reacted with silver nitrate to obtain $Ag_2B_{12}H_{11}OC(O)H$. An alcoholic solution of the silver salt is prepared in subdued light and a strip of pure cellulose sheet is immersed to half its length in the solution. The strip is removed and dried in the absence of light. When exposed to light, the treated portion of the strip turns dark, while the untreated portion is not affected.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound of the formula $M_a(B_{12}H_{12-y}X_y)_b$ wherein M is a cation having a valence of 1–4; X is a monovalent element other than hydrogen, or a radical, said X being capable of bonding to the carbon of a benzene nucleus by replacement of a hydrogen bonded to said carbon; and when more than one X group is present the X's can be different; y is a positive whole number of 1 through 12, inclusive; and a and b are positive whole numbers of 1 through 3, inclusive.

2. A compound of claim 1 wherein X comprises halogen.
3. A compound of claim 1 wherein X comprises hydrocarbon.
4. A compound of claim 1 wherein X comprises acyl.
5. A compound of claim 1 wherein X comprises nitro.
6. A compound of claim 1 wherein X comprises amino.
7. A compound of claim 1 wherein X comprises hydroxyl.
8. A compound of claim 1 wherein X comprises carboxyl.
9. A compound of claim 1 wherein X comprises isocyanato.
10. A compound of claim 1 wherein X comprises hydrocarbyloxy.
11. A compound of claim 1 wherein X comprises halohydrocarbyloxy.
12. A compound of claim 1 wherein X comprises hydrocarbyloxyhydrocarbyloxy.
13. A compound of claim 1 wherein X comprises hydroxylhydrocarbyloxy.
14. A compound of claim 1 wherein X comprises hydrocarboncarbonyloxy.
15. A compound of claim 1 wherein X comprises cyano.
16. A compound of claim 1 wherein comprises hydrocarbyloxycarbonyl.
17. A compound of claim 1 wherein X comprises carbamyl.
18. A compound of claim 1 wherein X comprises thiol.
19. A compound of claim 1 wherein X comprises hydrocarbylmercapto.
20. A compound of the formula $M_2[B_{12}H_{10}(COOH)_2]$ wherein M is a cation selected from the class consisting of hydrogen, alkali metals, and tetramethylammonium.

21. A compound of the formula $M_2[B_{12}H_{10}(NH_2)_2]$ wherein M is a cation selected from the class consisting of hydrogen, alkali metals, and tetramethylammonium.

22. A compound of the formula $M_2B_{12}Cl_{12}$ wherein M is a cation selected from the class consisting of hydrogen, alkali metals, and tetramethylammonium.

23. A compound of the formula $M_2B_{12}(OH)_{12}$ wherein M is selected from the class consisting of hydrogen, alkali metals, ammonium and tetramethylammonium.

24. A compound of the formula $M_2B_{12}H_{10}(NCO)_2$ wherein M is selected from the class consisting of alkali metals and tetramethylammonium.

25. A compound selected from the class consisting of $H_2B_{12}Cl_{12}$ and hydrates thereof.

26. A compound selected from the class consisting of $H_2B_{12}Br_{12}$ and hydrates thereof.

27. A compound selected from the class consisting of $H_2B_{12}I_{12}$ and hydrates thereof.

28. The compound of the formula $Ag_2B_{12}Cl_{12}$.
29. The compound of the formula $Ag_2B_{12}Br_{12}$.
30. The compound of the formula $Ag_2B_{12}I_{12}$.
31. The compound of the formula $$Cs_2B_{12}H_{10}(OCH_2CH_2OCH_3)_2$$

32. The compound of the formula $Cs_2B_{12}H_{10}(SCH_3)_2$.
33. The compound of the formula $$(NH_4)_2B_{12}H_{10}(CONH_2)_2$$

34. The compound of the formula $$[(CH_3)_4N]_2B_{12}H_{10}(NCO)_2$$

35. A compound of the formula $M_a(B_{12}H_{12-y}X_y)_b$ wherein M is a cation having a valence of 1–4; X is a monovalent substituent selected from the group consisting of halogen, hydrocarbon, acyl, nitro, amino, hydroxyl, carboxyl, isocyanato, hydrocarbyloxy, halohydrocarbyloxy, hydrocarbyloxyhydrocarbyloxy, hydroxyhydrocarbyloxy, hydrocarboncarbonyloxy, cyano, hydrocarbyloxycarbonyl and carbamyl; and when more than one X group is present the X's can be different; y is a positive whole number of 1 through 12, inclusive; and a and b are positive whole numbers of 1 through 3, inclusive.

References Cited

UNITED STATES PATENTS

| | | | |
|---|---|---|---|
| 3,148,938 | 9/1964 | Knoth, Jr. | 23—358 |
| 3,166,514 | 1/1965 | Parshall | 23—358X |
| 3,189,580 | 6/1965 | Dawes | 23—361X |
| 3,228,814 | 1/1966 | Jenkins et al. | 23—358X |
| 3,148,939 | 9/1964 | Knoth, Jr. | 23—361X |
| 3,169,045 | 2/1965 | Miller et al. | 23—358 |
| 3,390,966 | 7/1968 | Knoth, Jr. | 23—361 |

OTHER REFERENCES

Hawthorne et al.: "Journal of the American Chemical Society," vol. 82, p. 3228 (June 1960).

Knoth, et al.: "Journal of the American Chemical Society," vol. 84, pp. 1056–1057 (Mar. 20, 1962).

OSCAR R. VERTIZ, Primary Examiner

G. O. PETERS, Assistant Examiner

U.S. Cl. X.R.

23—361; 260—606.5